US011004587B2

(12) United States Patent
Edrington et al.

(10) Patent No.: US 11,004,587 B2
(45) Date of Patent: May 11, 2021

(54) LINEAR ACTUATOR FOR VALVE CONTROL AND OPERATING SYSTEMS AND METHODS

(71) Applicant: Florida State University Research Foundation, Inc., Tallahassee, FL (US)

(72) Inventors: Christopher S. Edrington, Tallahassee, FL (US); Hesan Vahedi, Tallahassee, FL (US); David Gonsoulin, Tallahassee, FL (US); Dallas Perkins, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 16/249,320

(22) Filed: Jan. 16, 2019

(65) Prior Publication Data
US 2020/0020472 A1    Jan. 16, 2020

Related U.S. Application Data

(60) Provisional application No. 62/698,473, filed on Jul. 16, 2018.

(51) Int. Cl.
*H01F 7/16* (2006.01)
*F16K 31/06* (2006.01)
(Continued)

(52) U.S. Cl.
CPC ............. *H01F 7/1607* (2013.01); *F01L 9/20* (2021.01); *F16K 31/0675* (2013.01);
(Continued)

(58) Field of Classification Search
CPC .. F16K 31/0675; F16K 31/0679; H01F 7/066; H01F 7/081; H01F 7/086;
(Continued)

(56) References Cited

U.S. PATENT DOCUMENTS 2,637,343 A * 5/1953 Matthews ............... F23N 5/105
251/65
5,406,241 A * 4/1995 Kawamura ............... F01L 9/04
251/129.09
(Continued)

FOREIGN PATENT DOCUMENTS

JP         05044417 A  *  2/1993
JP         H0544417 A     2/1993
(Continued)

OTHER PUBLICATIONS

Kim, Jinho et al., A New Electromagnetic Linear Actuator for Quick Latching, IEEE Transactions on Magnetics, Apr. 2007, pp. 1849-1852, vol. 43, No. 4.
(Continued)

*Primary Examiner* — Matthew W Jellett
(74) *Attorney, Agent, or Firm* — Eversheds Sutherland (US) LLP

(57) ABSTRACT

Linear actuators are disclosed. The linear actuator comprises a thruster and a stator. The thruster includes a thruster winding, and the stator includes a stator winding. The stator is disposed about the thruster. The linear actuator also includes a sheath disposed about the stator and the thruster. The thruster is configured to translate within the sheath relative to the stator upon application of an electrical current to the stator winding, the thruster winding, or a combination thereof. The stator winding and the thruster winding each comprise a nonpermanent magnet.

27 Claims, 60 Drawing Sheets

(51) Int. Cl.
*F01L 9/20* (2021.01)
*F02M 51/06* (2006.01)
*H01F 7/08* (2006.01)
*H02K 33/12* (2006.01)
*H01F 7/06* (2006.01)
*F01L 9/21* (2021.01)

(52) U.S. Cl.
CPC ......... *F16K 31/0679* (2013.01); *H01F 7/066* (2013.01); *H01F 7/081* (2013.01); *H02K 33/12* (2013.01); *F01L 2009/2105* (2021.01); *F01L 2009/2107* (2021.01); *F01L 2009/2115* (2021.01); *F01L 2009/2125* (2021.01); *F02M 51/0617* (2013.01); *F02M 51/0696* (2013.01); *H01F 2007/086* (2013.01)

(58) Field of Classification Search
CPC .. H01F 7/1607; H02K 33/12; F02M 51/0617; F02M 51/0696; F01L 2009/0405; F01L 2009/0407; F01L 2009/0415; F01L 2009/0423; F01L 2009/0425; F01L 2009/0428
USPC ............... 251/129.09, 129.1; 335/256
See application file for complete search history.

(56) References Cited

U.S. PATENT DOCUMENTS

| | | | |
|---|---|---|---|
| 5,898,244 A | 4/1999 | Kotsianas et al. | |
| 5,983,847 A * | 11/1999 | Miyoshi | F01L 9/04 123/90.11 |
| 6,397,797 B1 * | 6/2002 | Kolmanovsky | F01L 9/04 123/90.11 |
| 6,737,946 B2 * | 5/2004 | Seale | F16K 31/0675 251/129.15 |
| 6,994,308 B1 * | 2/2006 | Wang | F16K 1/12 251/129.21 |
| 8,037,853 B2 * | 10/2011 | Luercho | F01L 3/085 123/90.11 |
| 9,109,714 B2 | 8/2015 | Hutchins et al. | |
| 9,390,875 B2 * | 7/2016 | Kohlhafer | H01H 50/20 |
| 9,739,229 B2 | 8/2017 | Hutchins et al. | |
| 10,601,293 B2 * | 3/2020 | Hutchins | H02K 35/06 |
| 2007/0044741 A1 | 3/2007 | Daniel | |
| 2009/0151666 A1 * | 6/2009 | Choi | F16K 11/161 123/90.11 |
| 2012/0167849 A1 | 7/2012 | Hutchins et al. | |
| 2017/0321620 A1 | 11/2017 | Hutchins | |
| 2019/0264587 A1 * | 8/2019 | Hutchins | F01L 9/04 |

FOREIGN PATENT DOCUMENTS

| | | |
|---|---|---|
| JP | 05195732 | 8/1993 |
| JP | HO5214910 A | 8/1993 |
| WO | 2019164541 A1 | 8/2019 |

OTHER PUBLICATIONS

The International Search Report and Written Opinion of PCT/US2019/039255 dated Oct. 9, 2019.

* cited by examiner

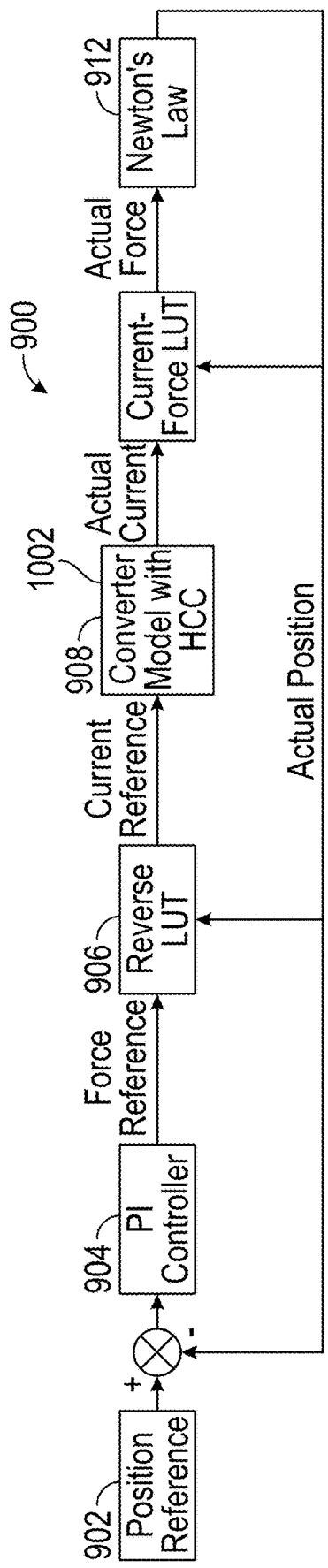
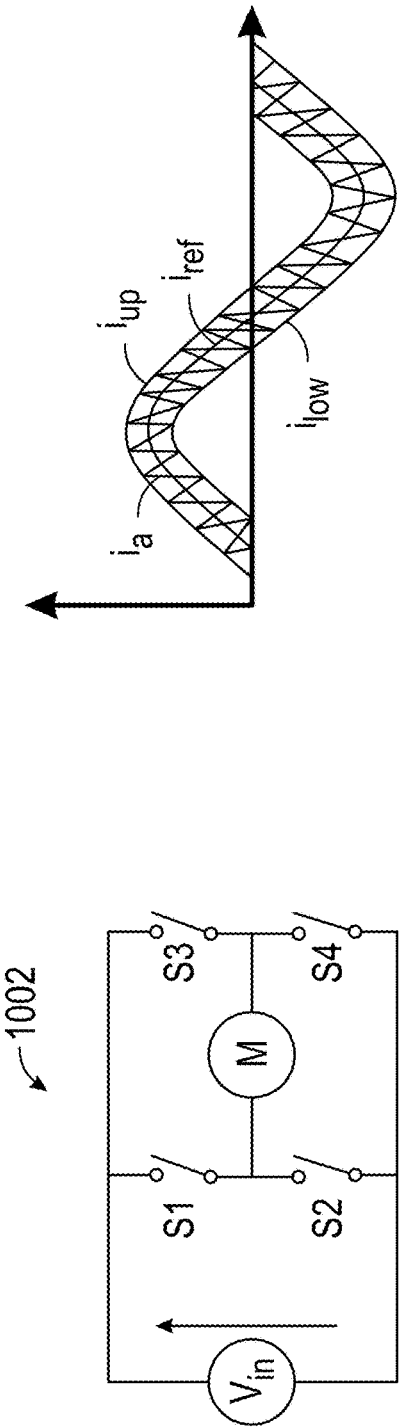
FIG. 8
FIG. 9
FIG. 10

Acheivable Amp Turns on Stator/Thruster for 240V Based on Resistance of Wire Gauge Acheivable Amp Turns on Stator/Thruster for 288V Based on Resistance of Wire Gauge Acheivable Amp Turns on Stator/Thruster for 336V
Based on Resistance of Wire Gauge Acheivable Amp Turns on Stator/Thruster for 384V
Based on Resistance of Wire Gauge

Power Loss of Stator/Thruster for 336V Based on Resistance of Wire Gauge

Power Loss of Stator/Thruster for 384V Based on Resistance of Wire Gauge

Power Loss of Stator/Thruster for 432V Based on Resistance of Wire Gauge

Power Loss of Stator/Thruster for 480V Based on Resistance of Wire Gauge

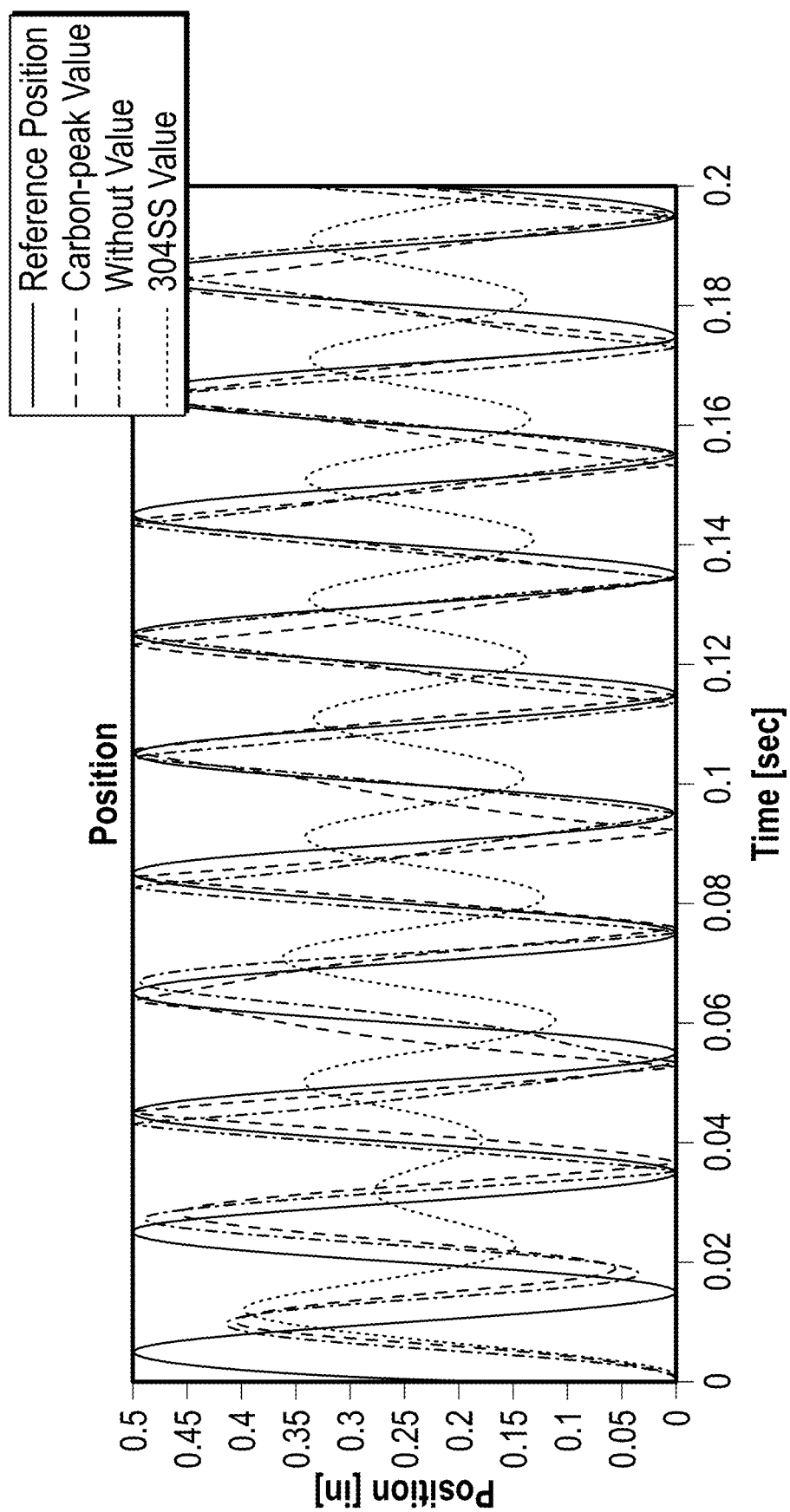

LINEAR ACTUATOR FOR VALVE CONTROL AND OPERATING SYSTEMS AND METHODS

CROSS-REFERENCE TO RELATED APPLICATIONS

The disclosure claims priority to and the benefit of U.S. provisional patent application No. 62/698,473, filed Jul. 16, 2018, which is hereby incorporated by reference herein in its entirety.

FIELD OF THE DISCLOSURE

The disclosure generally relates to actuators, such as electromechanical actuators, including but not limited to linear actuators which may be used for controlling valves or other high frequency actuation systems, including but not limited to variable valve control in internal combustion engines.

BACKGROUND

Commercially available linear actuators typically include permanent magnets. The use of permanent magnets, however, limits the operating temperature of the surrounding environment in which the linear actuators can be used. In addition, the linear actuators or the valves associated with the linear actuators typically include valve springs, which are potential failure points. Therefore, there is a need for linear actuators that do not include permanent magnets and that are capable of operating at desired frequencies while reaching various reference positions with minimal force without the use of valve springs.

SUMMARY

In certain embodiments, a linear actuator is disclosed. The linear actuator comprises a thruster and a stator. The thruster includes a thruster winding, and the stator includes a stator winding. The stator is disposed about the thruster. The linear actuator also includes a sheath disposed about the stator and the thruster. The thruster is configured to translate within the sheath relative to the stator upon application of an electrical current to the stator winding, the thruster winding, or a combination thereof. The stator winding and the thruster winding each comprise a nonpermanent magnet.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 8 depicts a control block diagram in accordance with one or more embodiments of the disclosure.

FIG. 9 depicts an H-Bridge converter in accordance with one or more embodiments of the disclosure.

FIG. 10 depicts a hysteresis current control in accordance with one or more embodiments of the disclosure.

FIGS. 31A-31C depicts the impact of different materials on the intake valve and the overall operation of the actuator in accordance with one or more embodiments of the disclosure.

DETAILED DESCRIPTION

An actuator is disclosed herein. Instead of using permanent magnets for the winding of the actuator, nonpermanent magnet material is used, such as copper or the like. Any suitable nonpermanent magnetic material may be used for the components of the actuator. This allows for a higher range of operating temperatures so that the ambient temperature of the operating environment, such as an engine compartment, is not an unduly limiting factor. In addition, to reduce the number of failure points on the actuator, valve springs (conventionally used to maintain the correct valve position) are not used in the actuator. The actuator may be configured to achieve any suitable maximum frequency. In addition to the frequency condition, the actuator advantageously is configured to reach an end position (with the valve at maximum or minimum extension) with minimal force. This is termed "soft-seating." The control is configured to take in a position reference and ensure that the actuator reaches the reference in an appropriate amount of time. In some instances, the position reference is a sinusoidal waveform, which provides the benefit of simplicity when deriving to find speed and acceleration. A sinusoidal waveform also fits the profile of the valve's position because it oscillates back-and-forth and can reach the endpoints with zero speed, i.e. "softly."

In certain embodiments, systems and methods for an actuator used for variable valve timing are disclosed herein. In some instances, the actuator is a linear actuator. The linear actuator includes at least two components: a stator and a thruster. The stator is stationary. The thruster is moves and, in some instances, forms or is attached to a valve. In certain embodiments, the thruster includes a thruster disk, the stator includes two separate portions, and a sheath surrounds the stator and thruster. The thruster disk is located between the two separate portions of the stator and is fixed to the thruster. The stator is disposed about the thruster but is not fixed to the thruster. From an operational standpoint, the thruster, thruster disk, and valve all move together in an axial direction, and the stator remains stationary.

Figure 16:
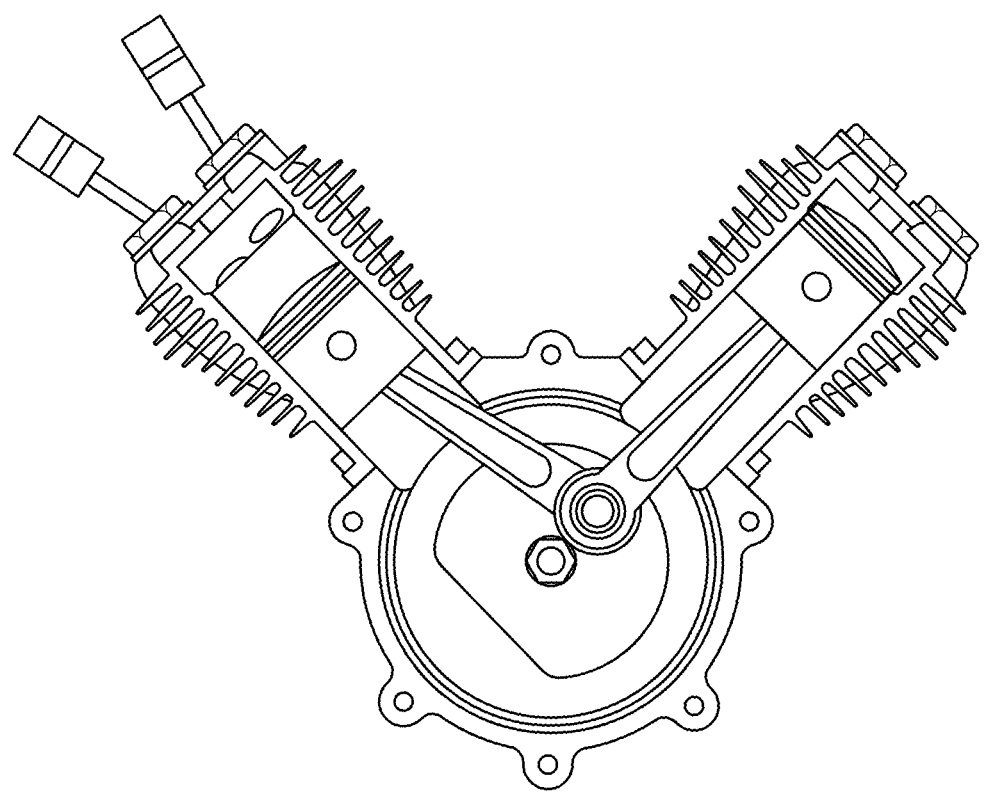
FIG. 16 depicts a linear actuator disposed of within an internal combustion engine in accordance with one or more embodiments of the disclosure.
Figure 17:
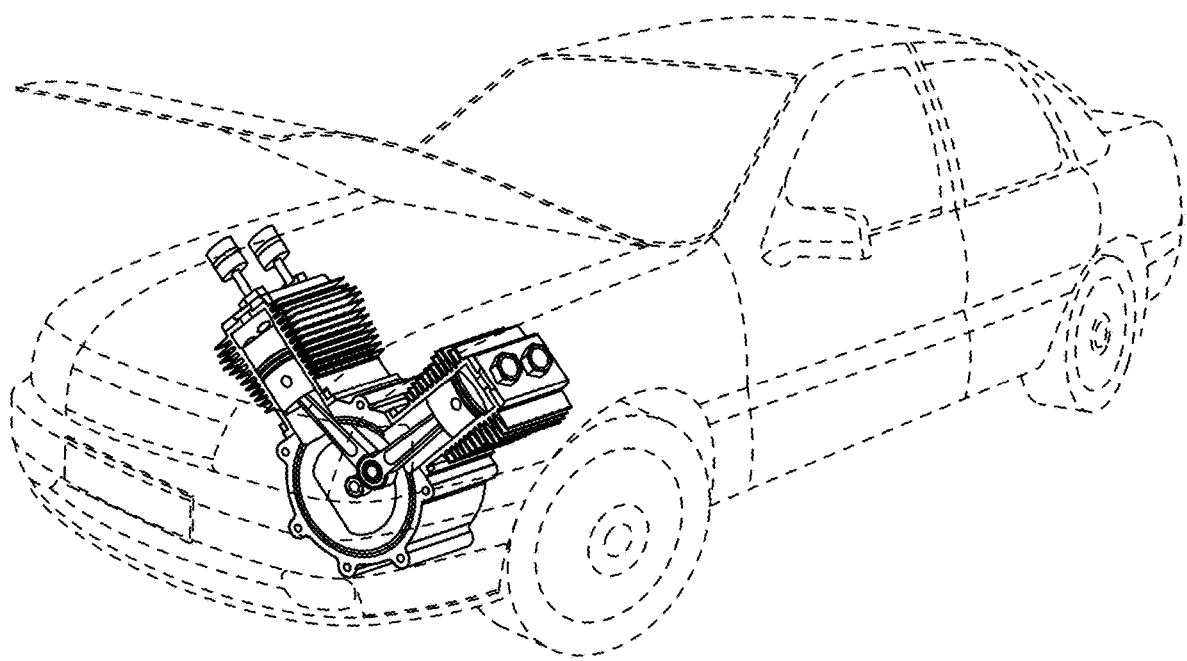
FIG. 17 depicts a linear actuator disposed of within an internal combustion engine, further disposed of within a vehicle in accordance with one or more embodiments of the disclosure.

In one exemplary embodiment, the linear actuator is used to control a valve in the internal combustion engine of a vehicle (as depicted in FIGS. 16 and 17). The linear actuator may be used in any suitable settings. The use of the term "actuator" or "linear actuator" may refer to any of the actuator or linear actuator embodiments described herein. More so, terms "actuator" and "linear actuator" may be used interchangeably herein.

Single Thruster Winding Actuator

Figure 1A:
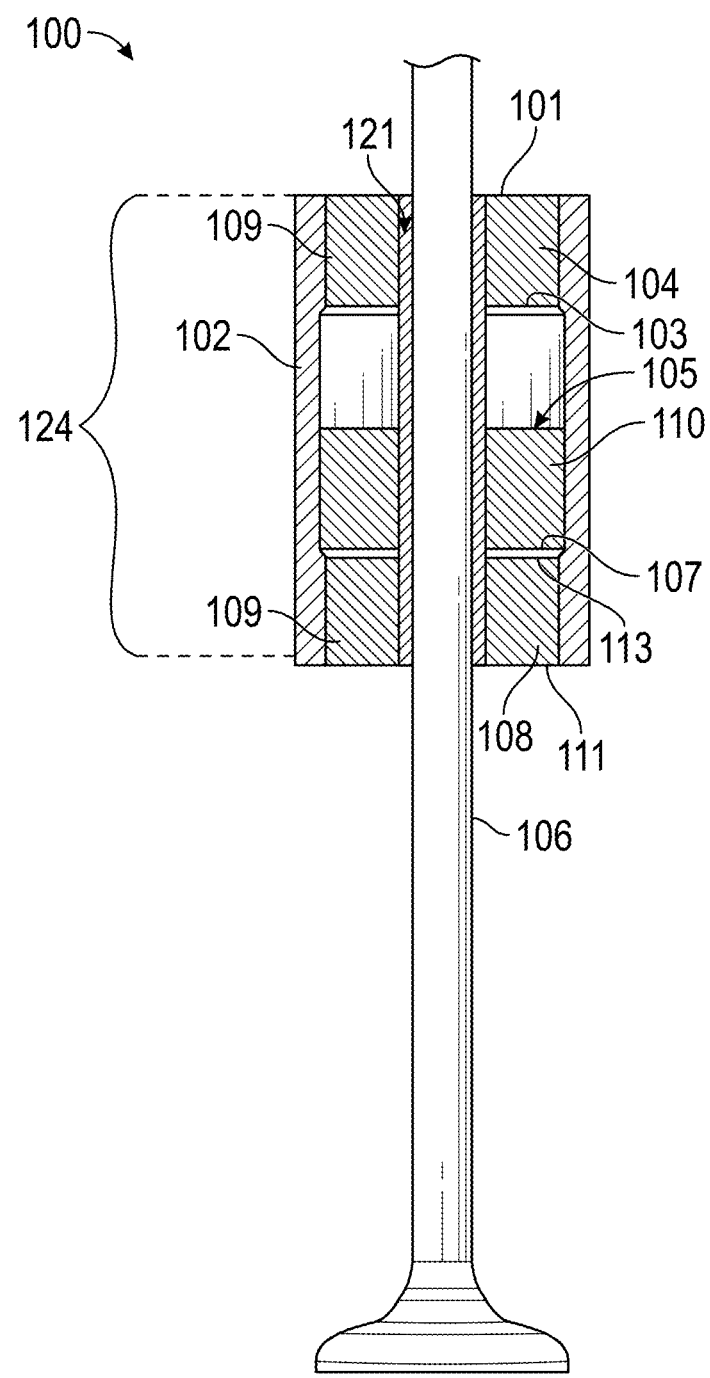
FIG. 1A depicts a single winding thruster actuator design in accordance with one or more embodiments of the disclosure.

FIG. 1A illustrates a cross-sectional view of a preferred embodiment of a linear actuator 100. The linear actuator 100 comprises a thruster disk 110 that is fixed about a thruster 121, a stator 109 comprising a first stator portion 104 and a second stator portion 108 (hereinafter "stator 109" may also be used to refer to the combination of the first stator portion 104 and the second stator portion 108) that are disposed about the thruster 121 and are not fixed to the thruster, and a sheath 102 that surrounds the stator 109, thruster disk 110, and thruster 121. The thruster disk 110 comprises a top thruster disk surface 105 and a bottom thruster disk surface 107. The first stator portion 104 comprises a top first stator surface 101 and a bottom first stator surface 103, and the second stator portion 108 comprises a top second stator surface 113 and a bottom second stator surface 111.

Figure 1B:
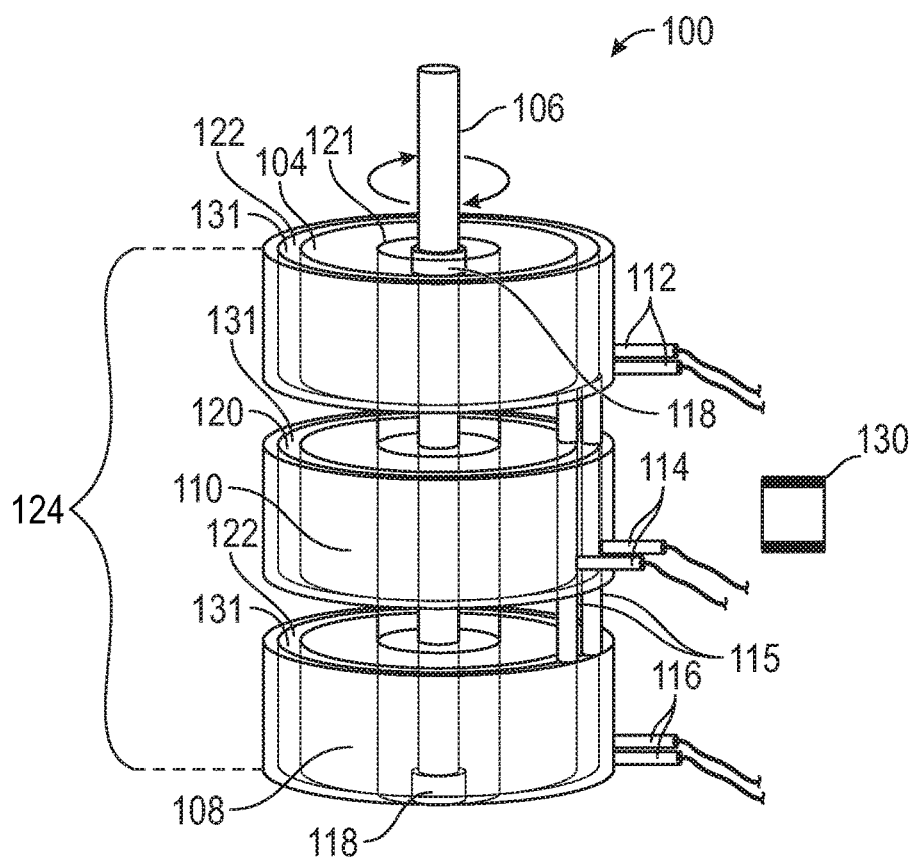
FIG. 1B depicts a commutation concept and bearing system in accordance with one or more embodiments of the disclosure.

The thruster disk 110 is fixed about the thruster 121 so that when the thruster disk 110 moves axially from one position to another, the thruster 121 also moves axially in the same direction as the thruster disk 110. The thruster disk 110 is located between the first stator portion 104 and the second stator portion 108, such that the bottom first stator surface 103 is adjacent to the top thruster disk surface 105, and the top second stator surface 101 is adjacent to the bottom thruster disk surface 107. The thruster disk 110 is cylindrical in shape such that it extends radially outward from the thruster 121 and surrounds the circumference of the thruster 121 (as illustrated in FIG. 1B). The thruster disk 110 is made of steel, preferably 1010 cold rolled steel, or any other similar ferromagnetic material. The thruster disk 110 also contains a thruster disk pot core structure 120 (see, FIG. 1C) that may comprise copper windings 131. Preferably, the copper windings 131 comprise only a single winding. The thruster disk pot core structure 120 may also comprise a solid core of copper or any other configuration of copper other than windings. Further, the thruster disk pot core structure 120 may comprise any other conductive material other than copper. The thruster disk pot core structure 120 and any associated copper windings 131 are configured to receive a current through one or more thruster commutators 114 (see FIG. 1B). The current flow through thruster disk pot core structure 120 induces a magnetic flux that serves to attract or repel the stator 109.

In the preferred embodiment, the stator 109 comprises two portions: a first stator portion 104 and a second stator portion 108. The first stator portion 104 and second stator portion 108 are disposed of on either side of the thruster disk 110 such that the thruster disk 110 is located between the two portions of the stator 109. Similar to the thruster disk 110, the stator 109 is cylindrical in shape, extends radially outward from the thruster 121, and surrounds the circumference of the thruster 121. The stator 109 is not fixed to the thruster 121 so that the thruster 121 may move axially with the thruster disk 110 while the stator 109 remains in the same position. The stator 109 is made of steel, preferably 1010 cold rolled steel, or any other similar ferromagnetic material. The stator 109 also contains a stator pot core structure 122 (see, FIG. 1C) that may comprise copper windings 131. That is, each portion of the stator includes its own individual stator pot core structure 122 and corresponding copper windings 131. In some instances, the copper windings 131 comprise only a single winding. The stator pot core structure 122 may also comprise a solid core of copper or any other configuration of copper other than windings. Further, the stator pot core structure 122 may comprise any other conductive material other than copper. The stator pot core structure(s) 122 and any associated copper windings 131 are configured to receive a current through one or more stator commutators 112 (see FIG. 1B). The current flow through the windings in the stator pot core structure 122 includes a magnetic flux within the linear actuator 100 that serves to either attract or repel the thruster disk 110.

The thruster disk 110 and stator 109 are configured such that the thruster disk 110 is able to move from one position to the next between the first stator portion 104 and the second stator portion 108 depending on the magnetic flux that is induced in the thruster disk 110 and/or the stator 109. This allows the thruster 121 and valve 106, which is attached to the thruster 121, to extend and retract from and to the actuator housing 124. For example, in FIG. 1A, the valve 106 is at a fully extended position, but when the thruster disk 110 moves back towards the first stator portion 104, the valve 106 will retract back towards the actuator housing 124.

Figure 1C:
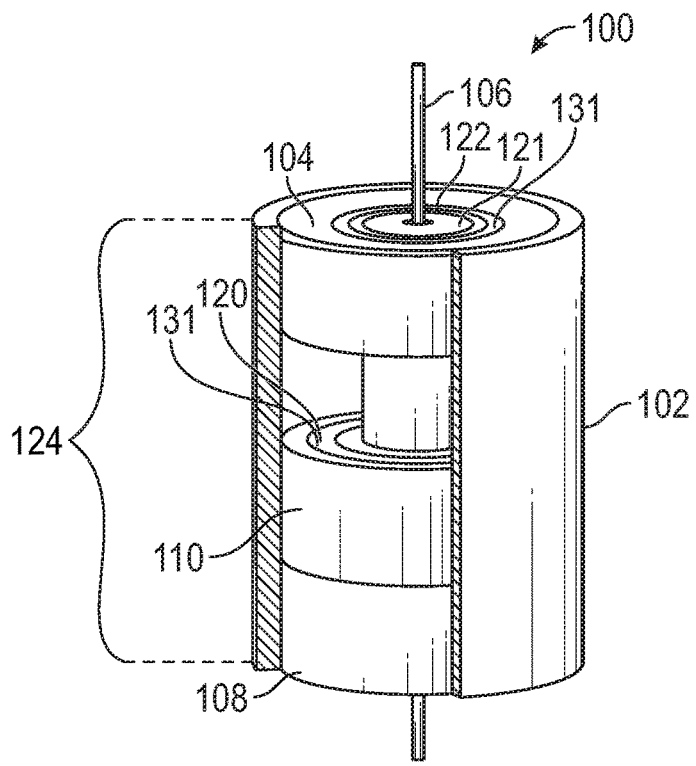
FIG. 1C depicts a linear actuator in accordance with one or more embodiments of the disclosure.

The thruster disk 110 and stator 109 are also surrounded by a sheath 102. The sheath 102 is in the shape of a hollow cylinder such that the sheath 102 surrounds the circumference of the stator 109 and the thruster disk 110, as depicted in FIG. 1C. The sheath is made of steel, preferably 1010 cold rolled steel, or any other similar ferromagnetic material. The sheath 102 serves the purpose of preventing undesirable magnetic flux dissipation.

FIG. 1B illustrates an orthogonal view of the same linear actuator 100 embodiment of FIG. 1A. The thruster disk pot core structure 120 and any associated copper windings 131 are configured to receive a current through one or more thruster commutators 114. The current flow through the thruster disk pot core structure 120 induces a magnetic flux. Similarly, the pot core structure 122 of the first stator portion 104 and second stator portion 108 and any associated copper windings 131 are also configured to receive a current through one or more first stator commutators 112 and/or one or more second stator commutators 116, respectively, which also induce magnetic flux from the two stator portions. The linear actuator 100 also comprises one or more thruster grooves 115, which allow the thruster commutators 114 to travel with the thruster disk 110 as it moves axially between the first stator portion 104 and the second stator portion 108. The thruster grooves 115 extend at least from the bottom first stator surface 103 to the top second stator surface 113. Finally, the linear actuator 100 may also comprise one or more bearings 118.

In one embodiment, the actuator includes three separated windings which are fed power through a power electronic drive 130 configured to provide electric current (one each for the thruster disk pot core structure 120, the stator pot core structure 122 of the first stator portion 104, and the stator pot core structure 122 of the second stator portion 108). Using the power electronic drive 130, it is possible to determine the sequences of the interruptions and the different running scenarios. One of the goals for designing the power electronic drive 130 for the full control of the actuator is to find the simplest and the most cost efficient topology which would satisfy the desired design with the least complexity.

Figure 22A:
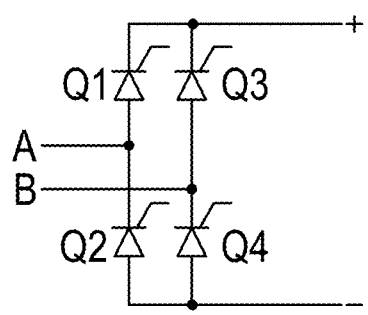
FIG. 22A depicts a general configuration Full-Bridge converter topology in accordance with one or more embodiments of the disclosure.
Figure 23A:
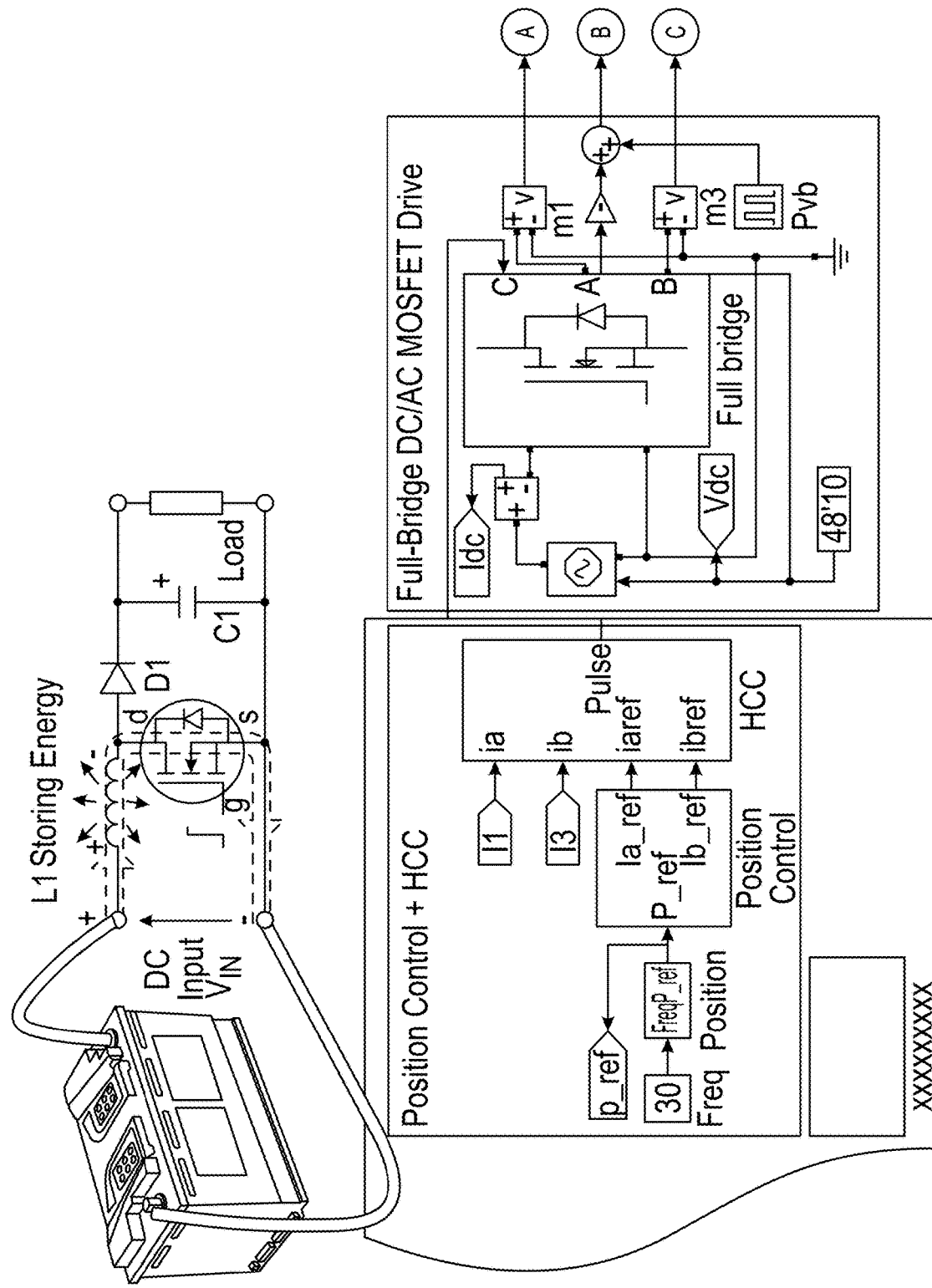
FIGS. 23A and 23B depict a Full-Bridge converter configuration along with multi-stage DC/DC converter in accordance with one or more embodiments of the disclosure.
Figure 23B:
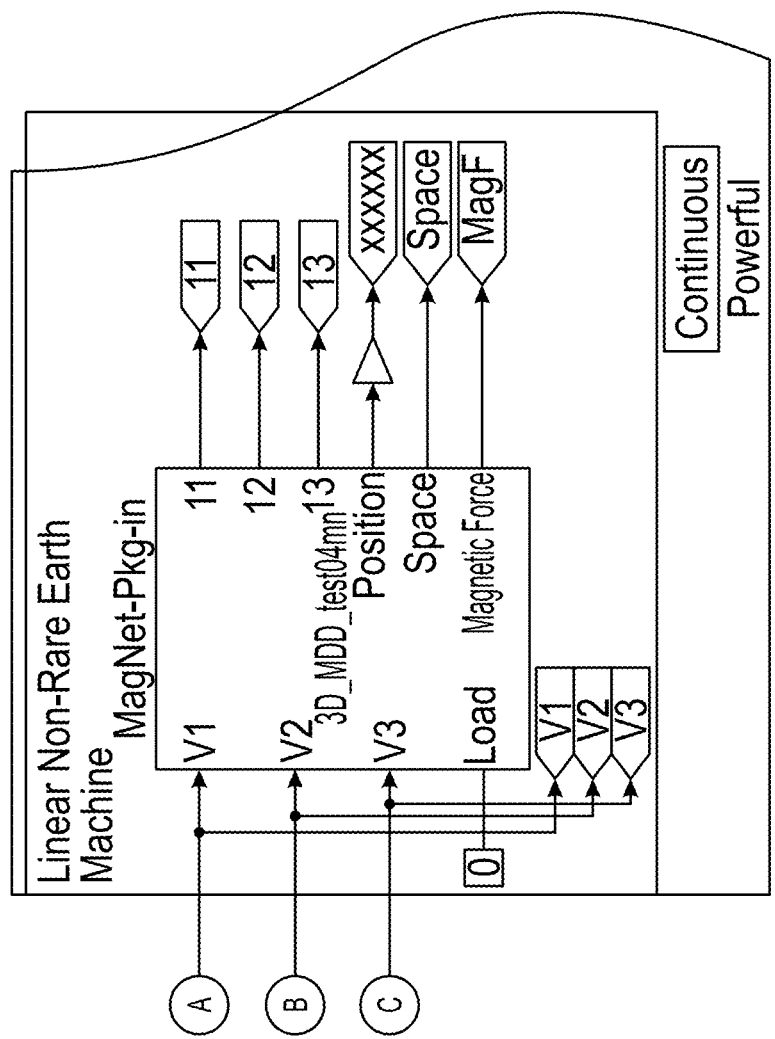
Figure 24:
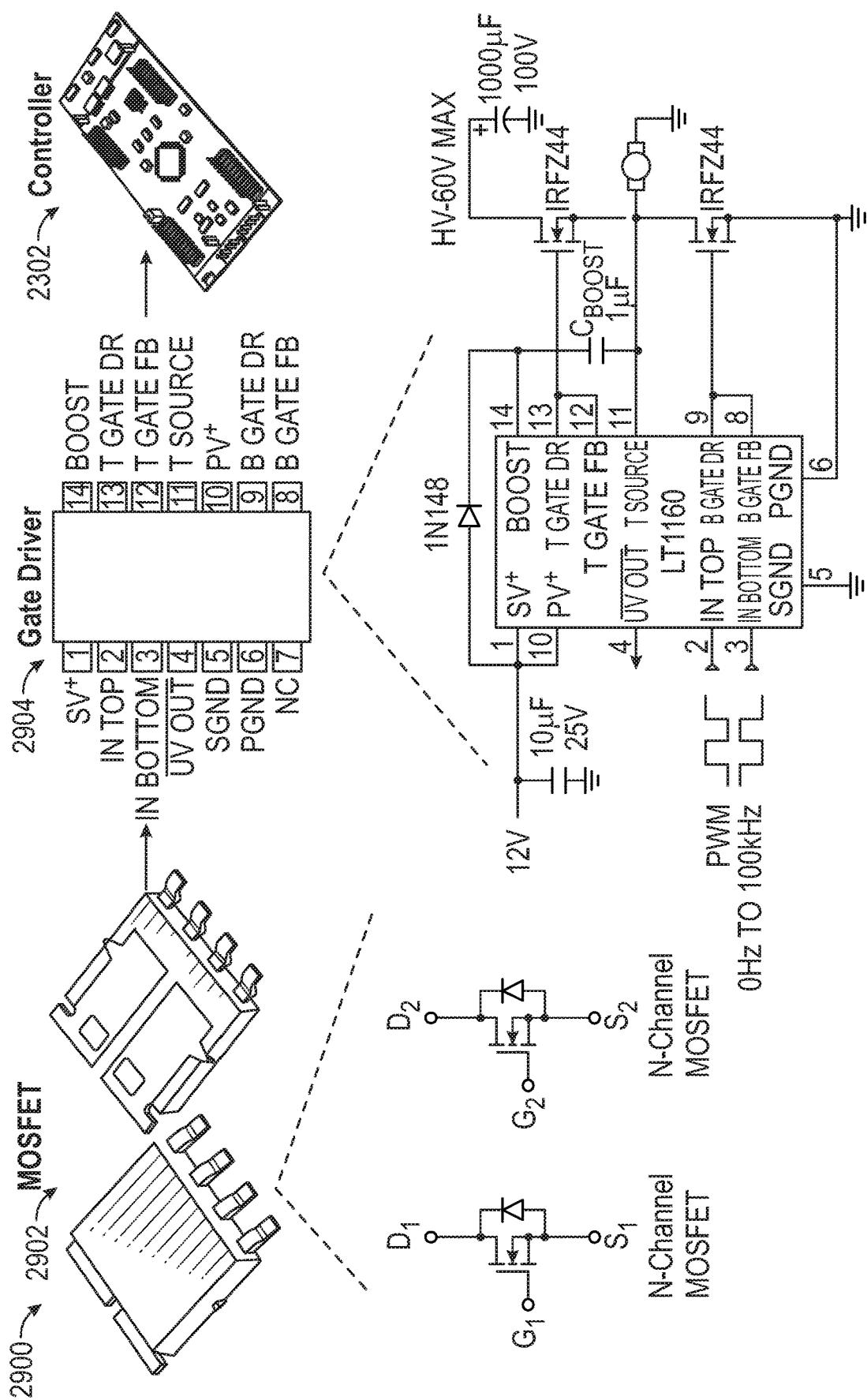
FIG. 24 depicts a power electronic drive package with the controller in accordance with one or more embodiments of the disclosure.

FIGS. 22-24 depict example hardware configurations for providing current to the pot core structures 120 and 122 of the actuator 100 and any associated copper windings 131. The thruster disk pot core structure 120 is constantly provided electric current, while the current provided to the stator pot core structure 122 for the first stator portion 104 and the stator pot core structure 122 for the second stator portion 108 is controllable through the power electronic drive 130, which serves to provide electric current to the stator portions at various intervals. As an example, a Full-Bridge converter topology may be used for the power electronic drive purpose, as shown in FIG. 22A.

Figure 22B:
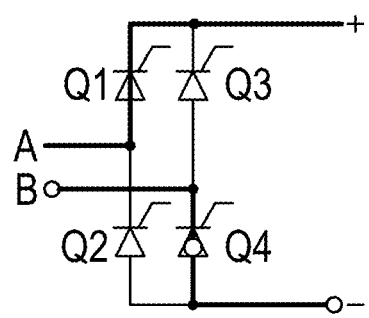
FIG. 22B depicts a top stator Full-Bridge converter topology in accordance with one or more embodiments of the disclosure.
Figure 22C:
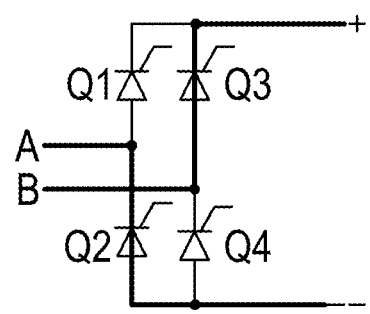
FIG. 22C depicts a bottom stator Full-Bridge converter topology in accordance with one or more embodiments of the disclosure.

The sequences of the conducting for each winding is shown in FIGS. 22A and 22B. FIGS. 22B and 22C show example topologies for the first stator portion 104 and the second stator portion 108. A multi-stage DC/DC converter may be used for providing a voltage, for example a 480 VDC, as an input to the Full-Bridge converter. FIGS. 23A and 23B depicts an example hardware configuration for the power electronic drive. This configuration is in simulation software to simulate providing electric current to the actuator. FIG. 24 also shows a full package solution 2900 for the power electronics drive 130 with the controller 2302. The full package solution 2900 may comprise a MOSFET 2902 (for example, the MOSFET depicted in FIGS. 28A and 28B), a gate driver 2904 that may be used to mitigate the voltage switching time of the MOSFET 2902 output, and the controller 2302.

Figure 30:
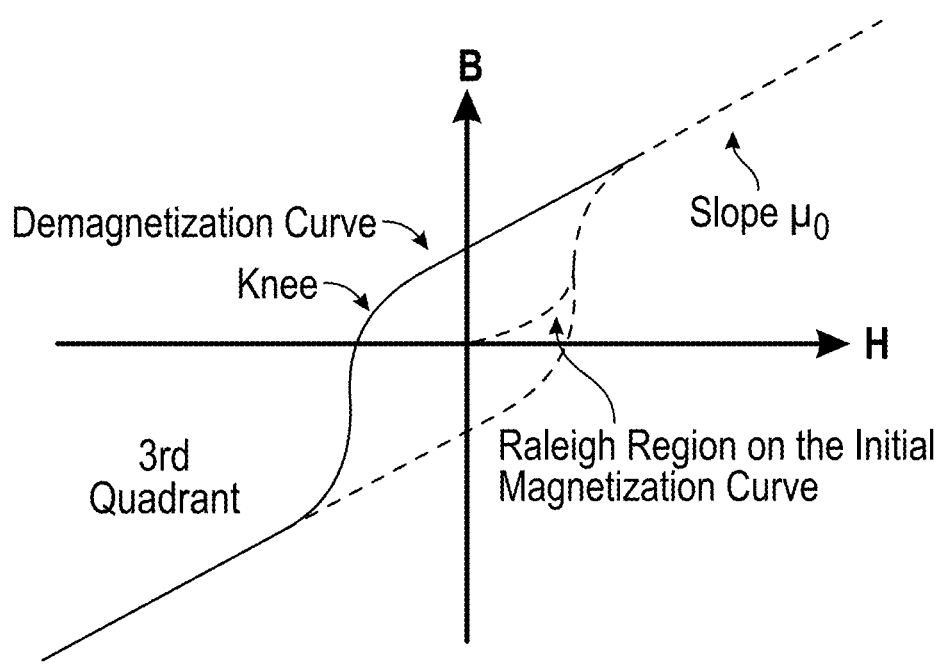
FIG. 30 depicts a B-H curve of a hard-magnetic material in accordance with one or more embodiments of the disclosure.
Figure 32:
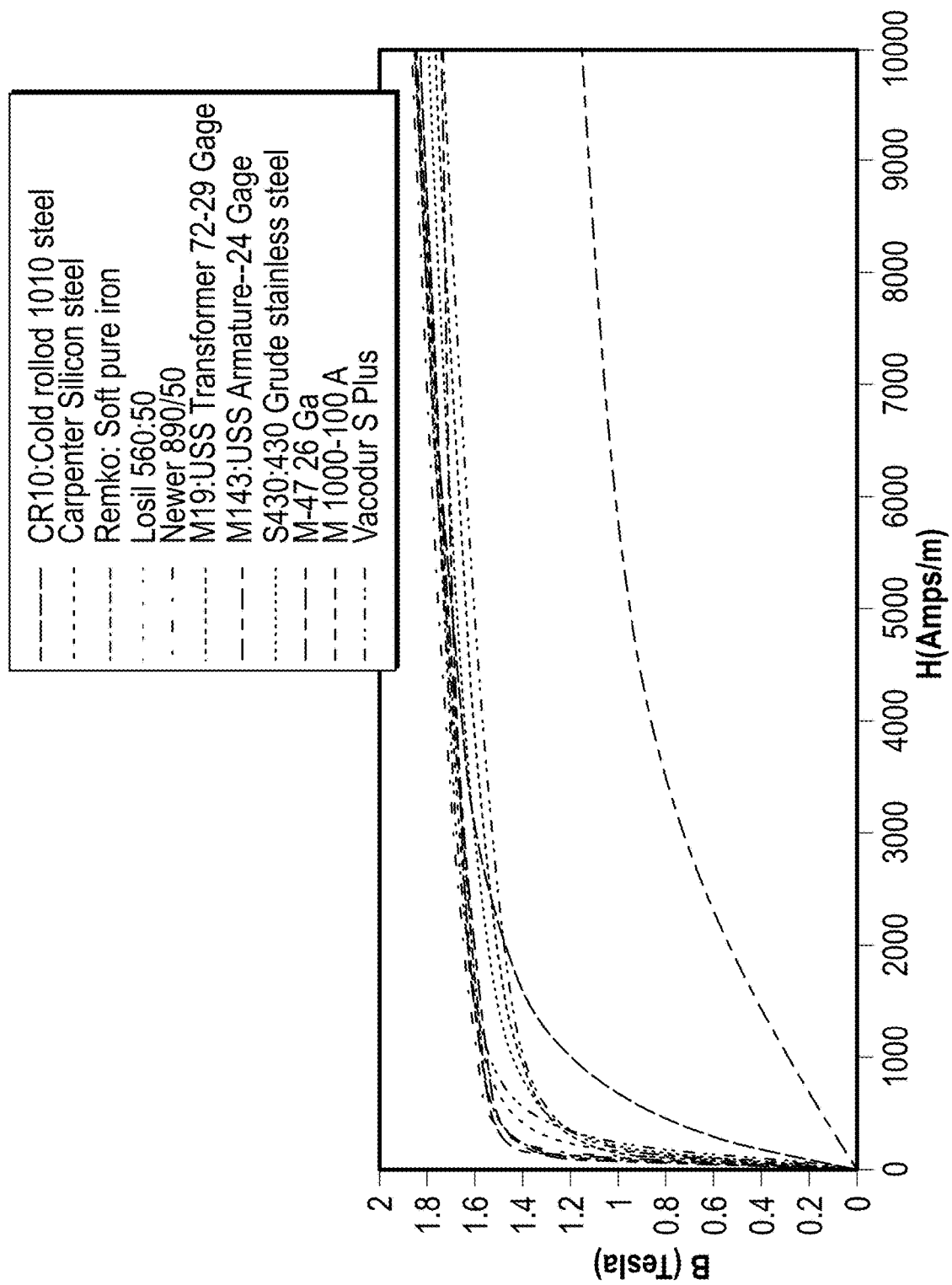
FIG. 32 depicts the B-H curve for 11 selected ferromagnetic materials in accordance with one or more embodiments of the disclosure.
Figure 33:
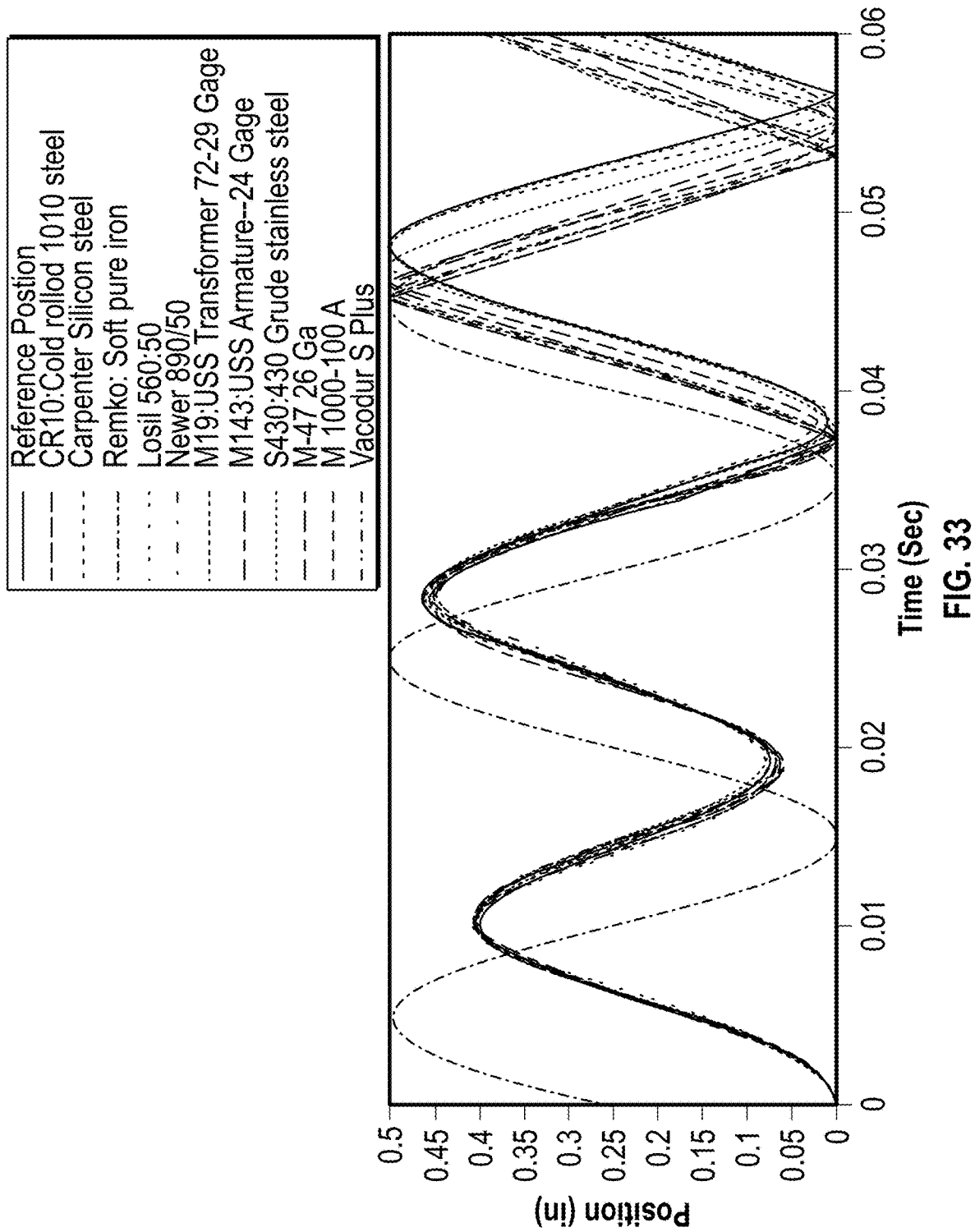
FIG. 33 depicts the valve position in the startup response of the actuator with the 11 different materials in accordance with one or more embodiments of the disclosure.
Figure 34:
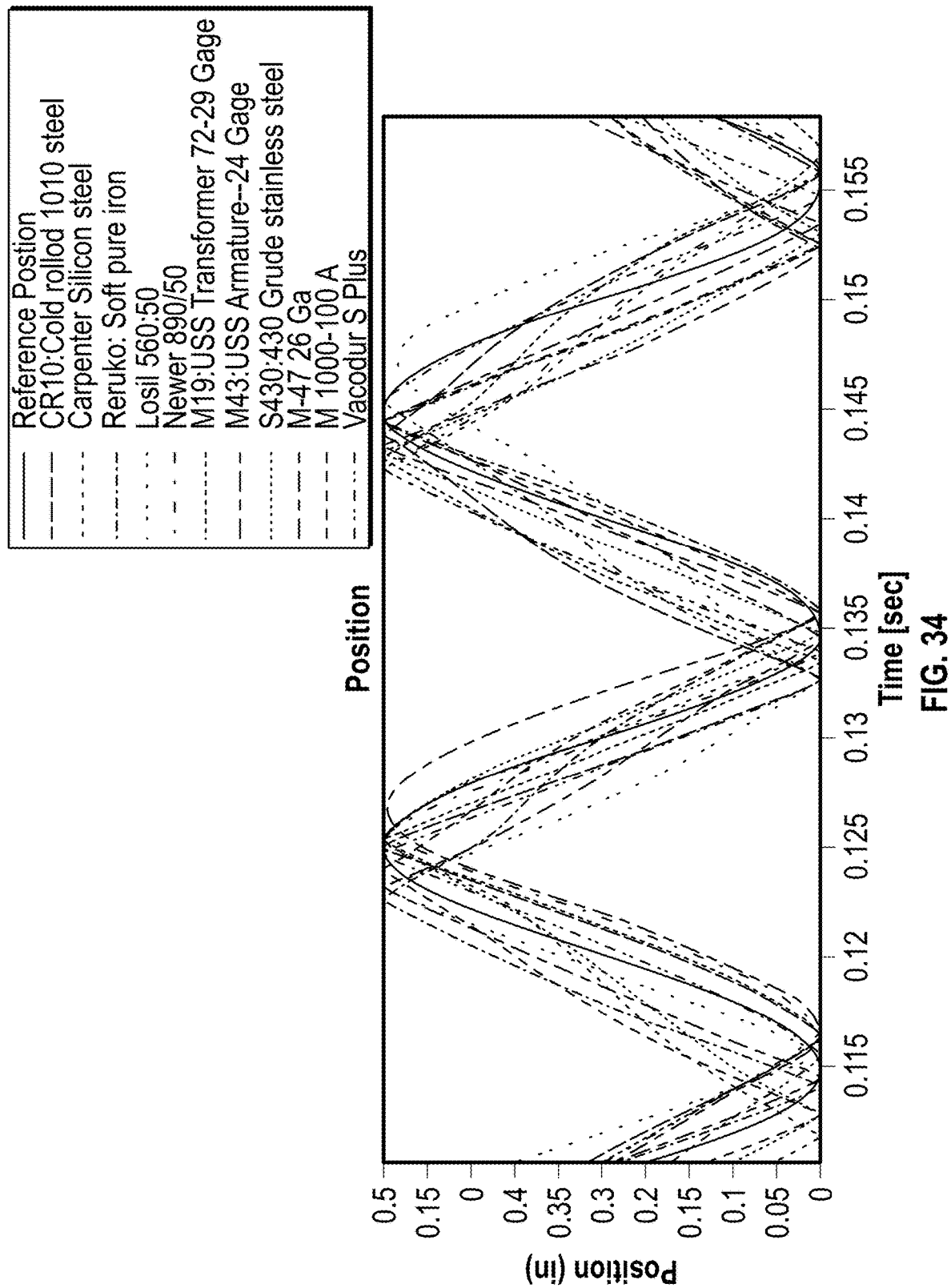
FIG. 34 depicts the valve position in the steady state response of the actuator to the 11 different materials in accordance with one or more embodiments of the disclosure.

FIG. 30 depicts a general B-H curve for a hard magnetic material. B is the flux density of an applied magnetic field. H is the field strength of the induced magnetic field within a material. FIG. 32 specifically depicts a B-H (used to plot magnetic properties of a material) curve comprising exemplary potential materials to use to form the stator 109, thruster 121, and thruster disk 110. Additionally, FIGS. 33 and 34 depict the impact of each of the exemplary materials of FIG. 32 on the startup and the steady state behavior of the actuator. Although some of the materials, like M19 or M43, have the same impact as other materials, certain materials, like CR10, may be cheaper to produce in mass production, and thus more desirable materials to use.

Alternate Actuator Iterations

Figure 2A:
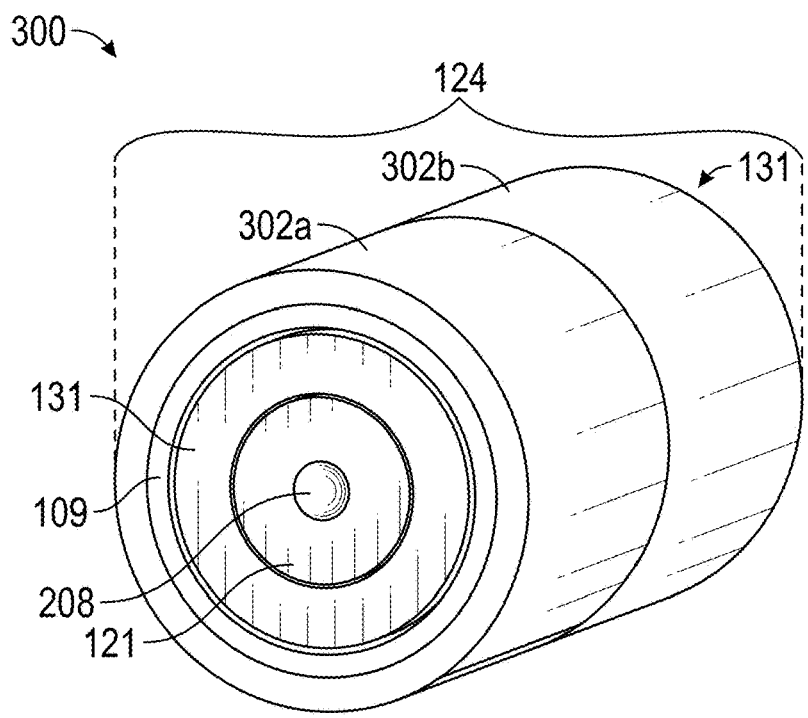
FIG. 2A depicts a linear actuator in accordance with one or more embodiments of the disclosure.

FIG. 2A depicts an embodiment of an iteration of a linear actuator 300. The actuator 300 provides increased controllability of the force produced by the actuator. The copper winding 131 for the stator 109 in the linear actuator 300 is split into two separate windings 302a and 302b that can be controlled independently in the actuator 300. Each of the stator windings 302a and 302b spans half of the actuator's length. By splitting the copper windings surrounding the stator 109 into two, the actuator 300 includes the ability to produce either a pushing or pulling force throughout the stroke of the thruster 121 by separately controlling the currents in the two windings 302a and 302b.

This embodiment provides increased control over the direction of the force. However, the magnitudes of the produced forces are quite low. In order to reach the necessary acceleration values to achieve the highest operating speed, the actuator 300 would need to use an excessive amount of current, which would also cause the steel to become saturated. While this is not a major issue if the saturation is localized to a few small areas, in testing, the actuator 300 was well past the knee of the B-H curve throughout nearly all of the steel on both the stator 109 and thruster 121. This can be seen in FIG. 2B, which shows the field intensity of the stator 109 and thruster 121 with sections of the windings hidden for illustrative purposes. It is clear that the actuator 300 is well into saturation, which would cause heating along with adverse magnetic characteristics.

Figure 2B:
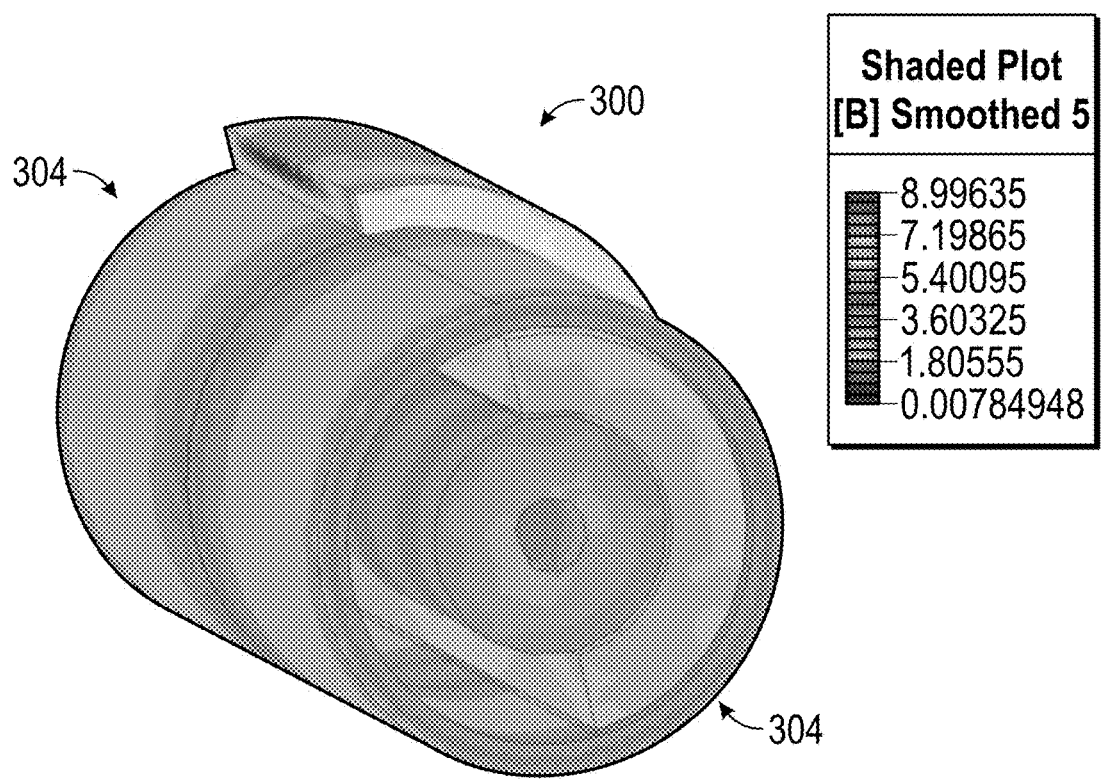
FIG. 2B depicts a flux density of a linear actuator in accordance with one or more embodiments of the disclosure.

FIG. 2B illustrates the magnetic flux density for actuator 300. Due to the physical structure of the actuator 300, the magnetic flux produced by the stator windings 302a and 302b and the copper windings 131 surrounding the thruster 121 enters and exits at the ends 304 of the actuator 300, causing a large air gap in the magnetic flux path. This in turn means that producing the required magnetic flux would need a much larger current as opposed to a design having a shorter path for the flux to flow through. Therefore, the overall structure of the actuator 300 is modified to reduce the air gap present in the flux path to better facilitate force production. Reducing the distance the flux needs to travel through air results in a larger force production for the same amount of current supplied, allowing the actuator 300 to be driven with less current to avoid widespread saturation.

Figure 3A:
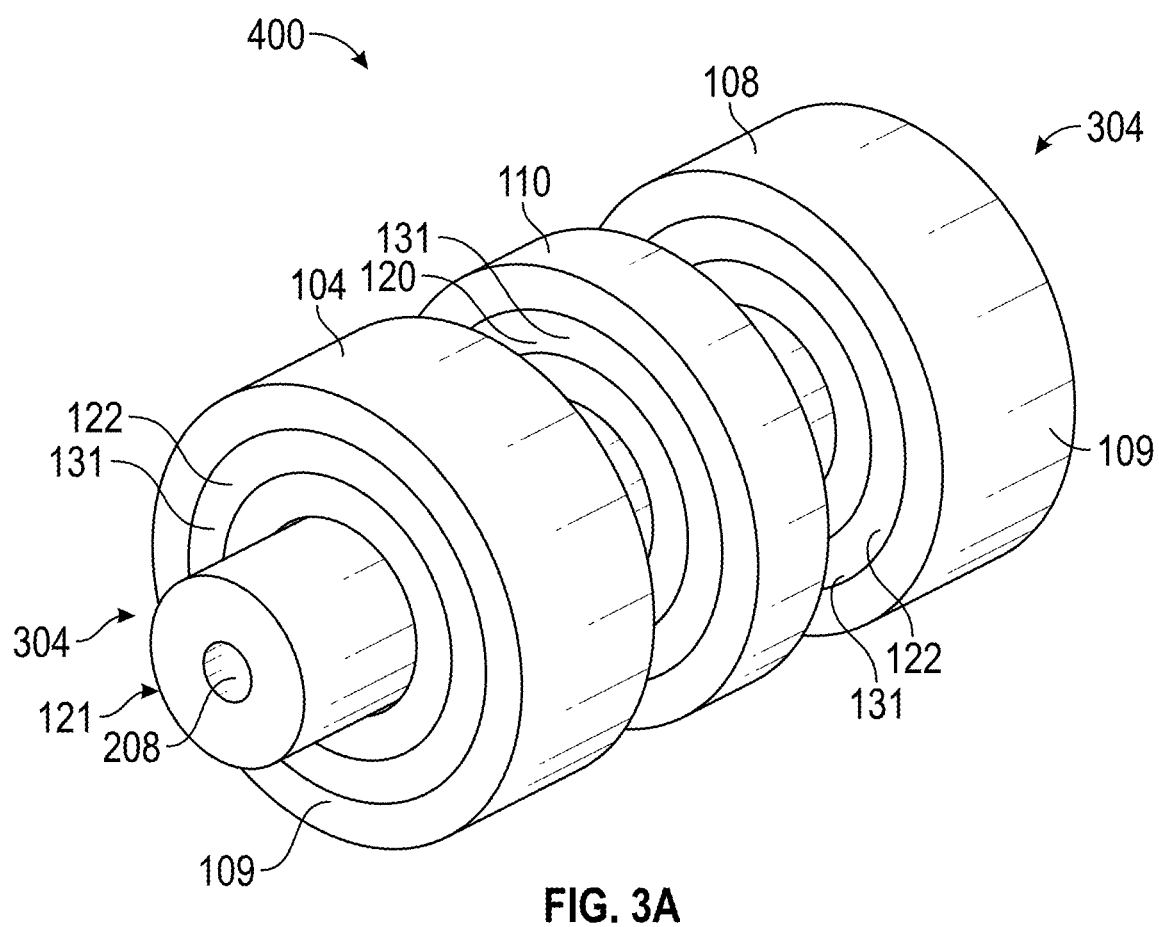
FIG. 3A depicts a linear actuator in accordance with one or more embodiments of the disclosure.

FIG. 3A shows an embodiment of an iteration of a linear actuator 400. Instead of being a single piece surrounding the thruster 121, the stator 109 is broken into a first stator portion 104 and a second stator portion 108, one at each end 304 of the actuator 400. Instead of having the windings wrapped around the outside of the steel on the stator 109, the copper is embedded into a stator pot core structure 122 to allow flux to flow through the steel on either side. Additionally, the windings on the thruster 121 are removed and a thruster disk 110 is placed in between the first stator portion 104 and second stator portion 108 to allow either the stator pot core structures 122 to attract the disk 110 when excited (receives electric current). Since the thruster disk 110 is attached to the thruster 121, the operating principle is that exciting one of the stator pot core structures 122 will pull the thruster disk 110 toward them. This process provides the ability to pull the thruster 121 either outward toward the fully extended position or inward toward the fully seated position depending on which stator pot core structure 122 is excited. FIG. 3A shows the thruster 121 in a position between the endpoints for examination of the stator pot core structure 122. Additionally, the thruster 121 in actuator 400 is a non-magnetic material since the thruster disk 110 is the major factor in the interaction between the stator 109 and thruster disk 110.

Figure 3B:
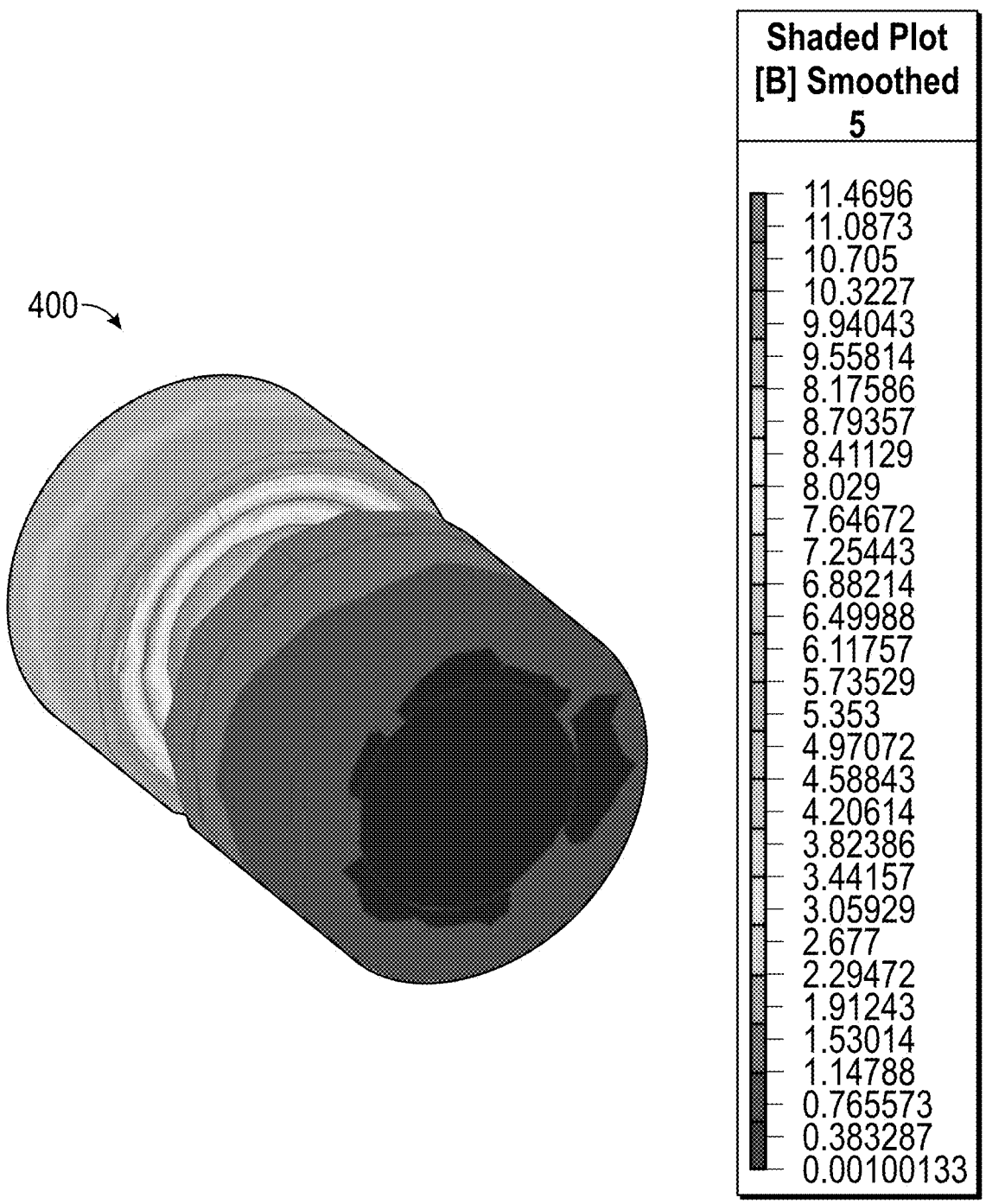
FIG. 3B depicts a flux density of a linear actuator in accordance with one or more embodiments of the disclosure.

Multiple test cases were conducted using varying stator current values to observe the force produced by the actuator 400. Similar to the previous interaction of the actuator 300, it was discovered that the actuator 400 was limited in the magnitude of the force that it could produce without saturating the actuator 400. This result can be seen in FIG. 3B, which shows how the actuator 400 saturating when attempting to pull the thruster from the fully seated position outward.

Since only one winding could be excited at a time to keep the produced forces from cancelling each other out, the actuator 400 would have to overcome an air gap at either the fully seated or extended positions. However, these positions corresponded to both the point where the highest force production was needed to accelerate the thruster and the point where the least amount of force could be produced since the air gap was at its largest value. It was clear that without being able to repel the thruster from the endpoints toward the center position, the actuator 400 would not be feasible. This finding also explained the usage of springs or permanent magnets in the prior art actuators developed in literature.

Figure 4A:
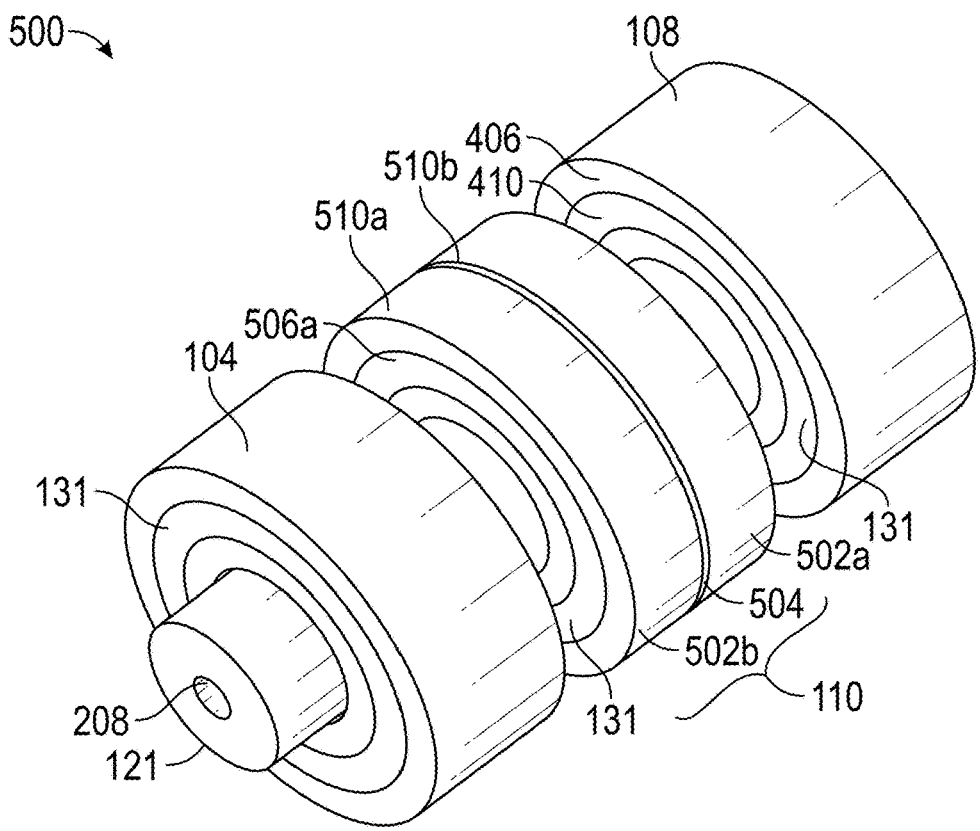
FIGS. 4A and 4B depict a linear actuator in accordance with one or more embodiments of the disclosure.

FIG. 4A depicts an embodiment of an iteration of a linear actuator 500, in which two thruster disk pot core structures 506a and 506b (which may include copper windings 131 or any other configuration of copper or other conductive material) are incorporated into the thruster disk 110 to allow the creation of a magnetic flux. This embodiment provides the ability to both repel and attract the thruster disk 110 with each of the stator pot core structures 122, instead of just being able to attract like in the previous design. The two thruster disk pot core structures 506a and 506b in this iteration serve to create separate flux paths for each of the copper windings 131 of the stator 109. To accomplish this, the two pot cores 506a and 506b attached back to back with each other, with a layer of epoxy 504 separating the two. The epoxy layer 504 attaches two halves 510a and 510b of the thruster disk 110 and also serves as a barrier to separate the magnetic flux produced by each of the thruster disk pot core structures 506a and 506b.

Figure 4B:
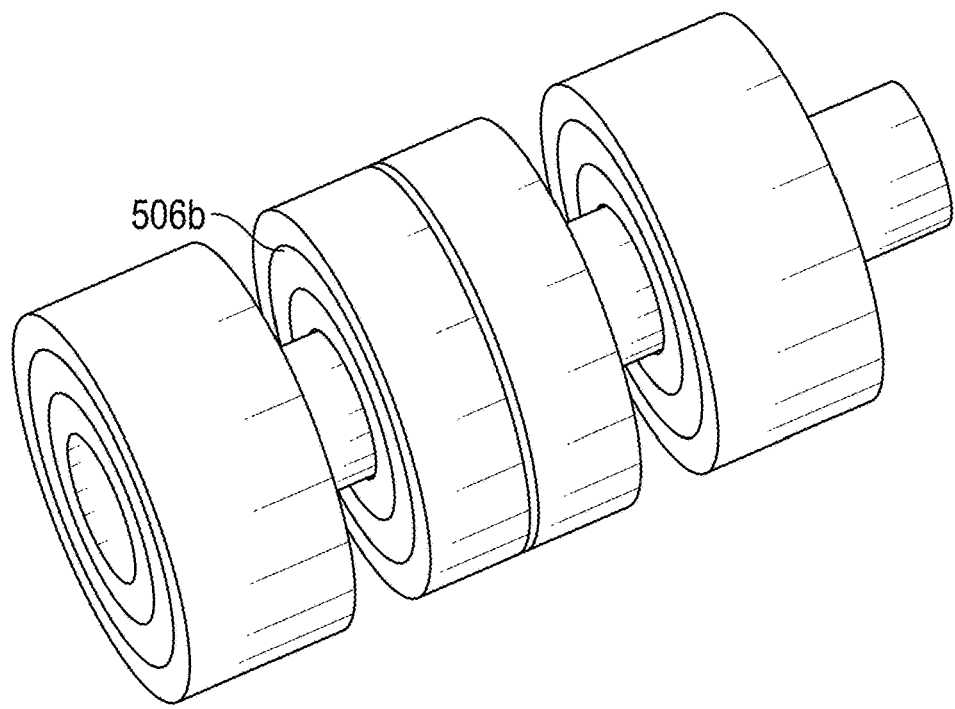
Figure 4C:
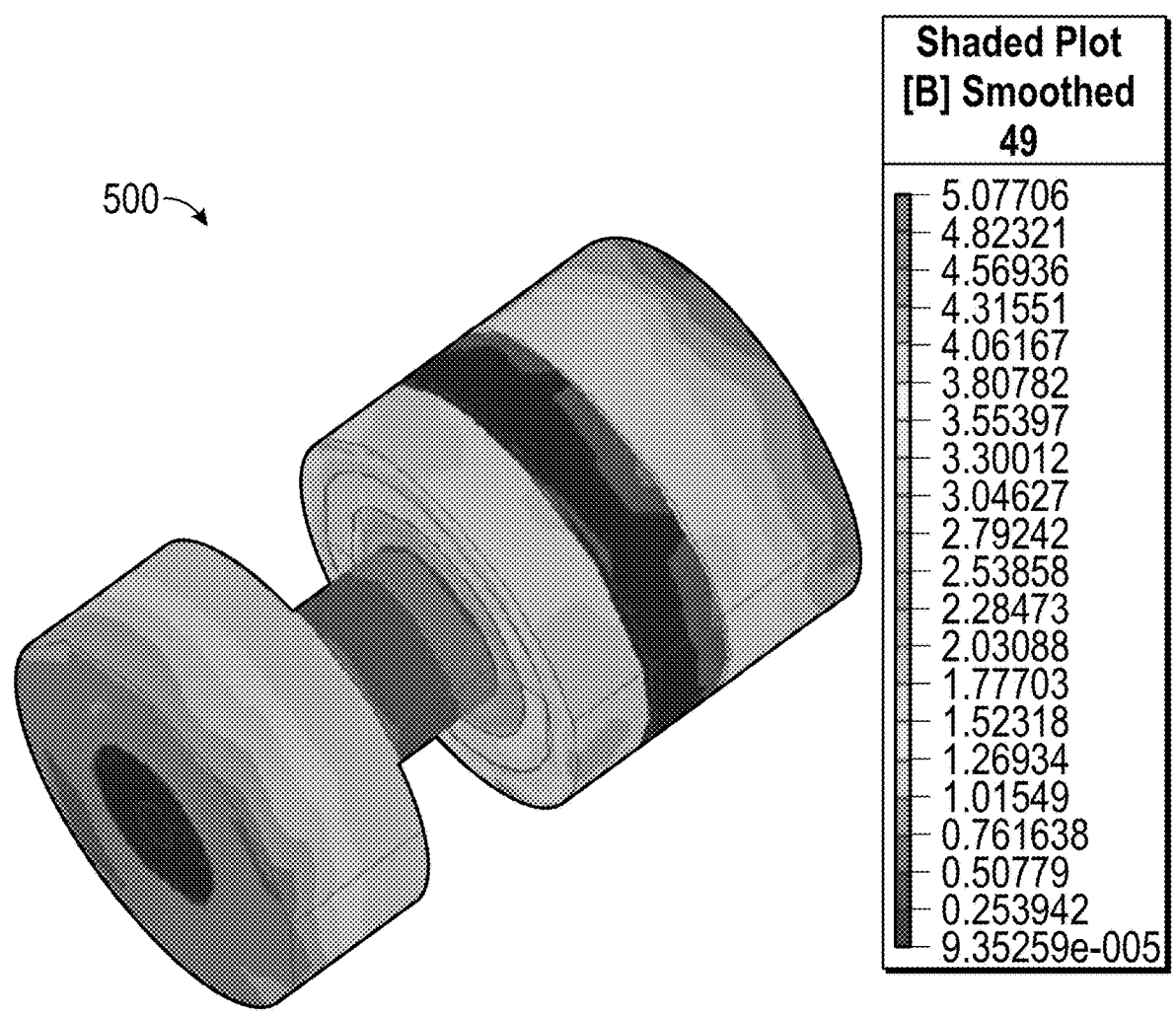
FIG. 4C depicts a flux density of a linear actuator in accordance with one or more embodiments of the disclosure.

The actuator 500 was modeled and tested to determine the force production with the thruster currents held at constant values. Based on the preliminary tests, the actuator 500 appeared to be capable of producing the force required to accelerate the thruster disk 110 to achieve the desired cycle rates. Additionally, the reduction of currents also greatly reduced the field throughout the actuator 500, as shown in FIG. 4B. This meant that it was no longer operating under saturation, and the amount that did occur was localized to a few small areas.

Since the desired acceleration was met and the structure of the actuator 500 allowed for directional control of the force production, numerous cases were run with thruster current values at both 4000 and 6000 ampere-turns and the stator currents ranging from 0-6000 ampere-turns for the 4000 ampere-turn case and 2000-8000 for the 6000 ampere-turn case in increments of 200. Each of these cases were run at 11 thruster positions ranging from fully seated to the midway point in the stroke. Because of the structure of the actuator 500, it was assumed that the force calculation for any points past the halfway point could be found using symmetry. In all, this resulted in the collection of roughly 22,000 data points that were to be used to populate the look-up tables used in the control section. After collecting all of the data and filling the look-up tables, the next step in the design was to calculate the resistance and inductance values necessary to determine the electrical characteristics of the actuator.

Mechanical Refinements to Alternate Actuator Iterations

Figure 15A:
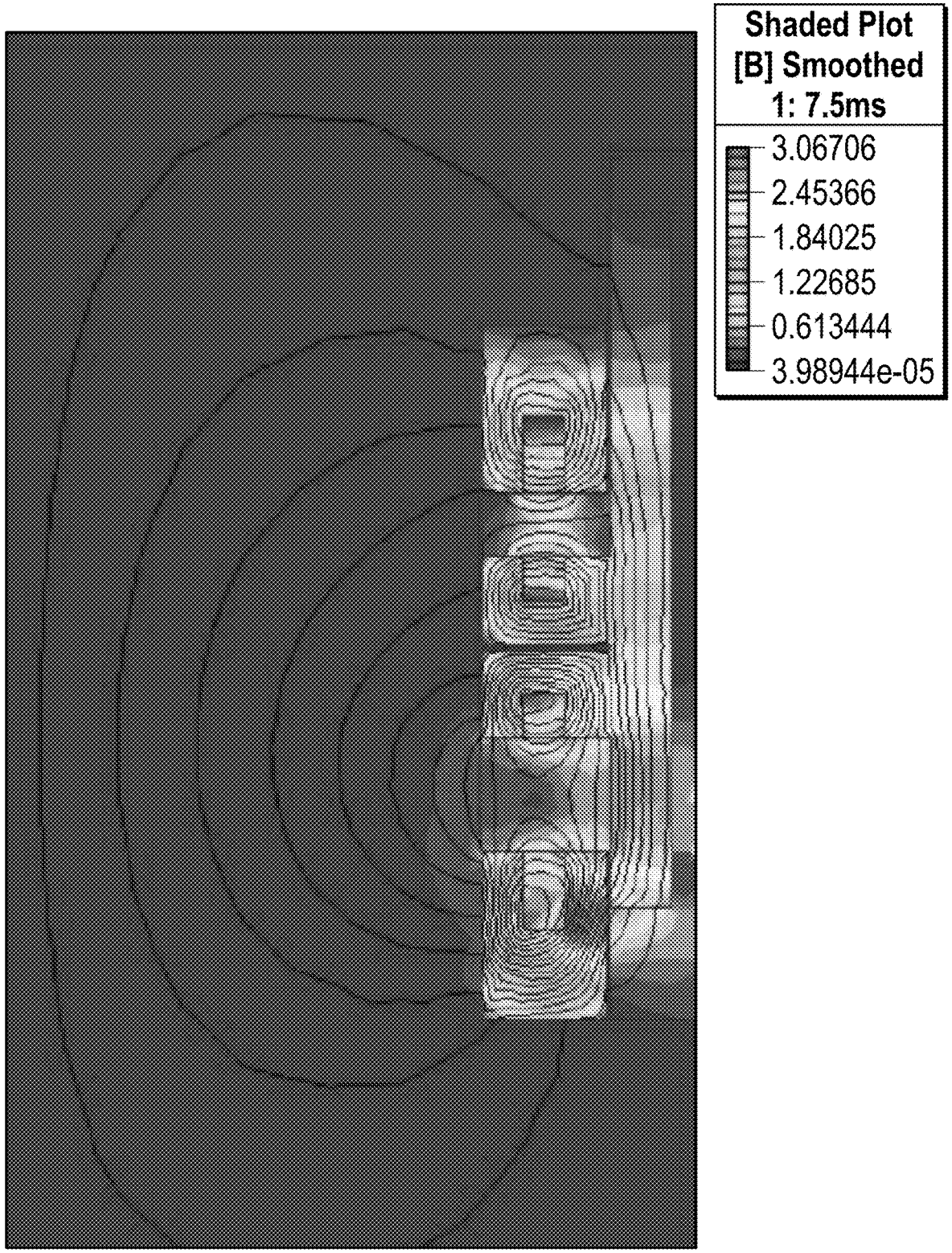
FIG. 15A depicts a flux path presentation in accordance with one or more embodiments of the disclosure.

As depicted in FIG. 15A, the flux path in the outer part of the actuator in certain embodiments is shaped in a way that the flux does not easily close the loop. In order to avoid flux dissipation in the corners, as well as heating the core material, a sheath 102 that entirely covers the outer section of the actuator (stator and thruster) is introduced, as is depicted in FIG. 1C. Moreover, the length and width of the main yoke of the actuator may be changed to impose more fluxes to the sheath 102 instead of the inner loop of the thruster 121. FIG. 1C also shows the stator refinements to increase the concentration of the flux in the reluctance path instead of air.

Figure 6A:
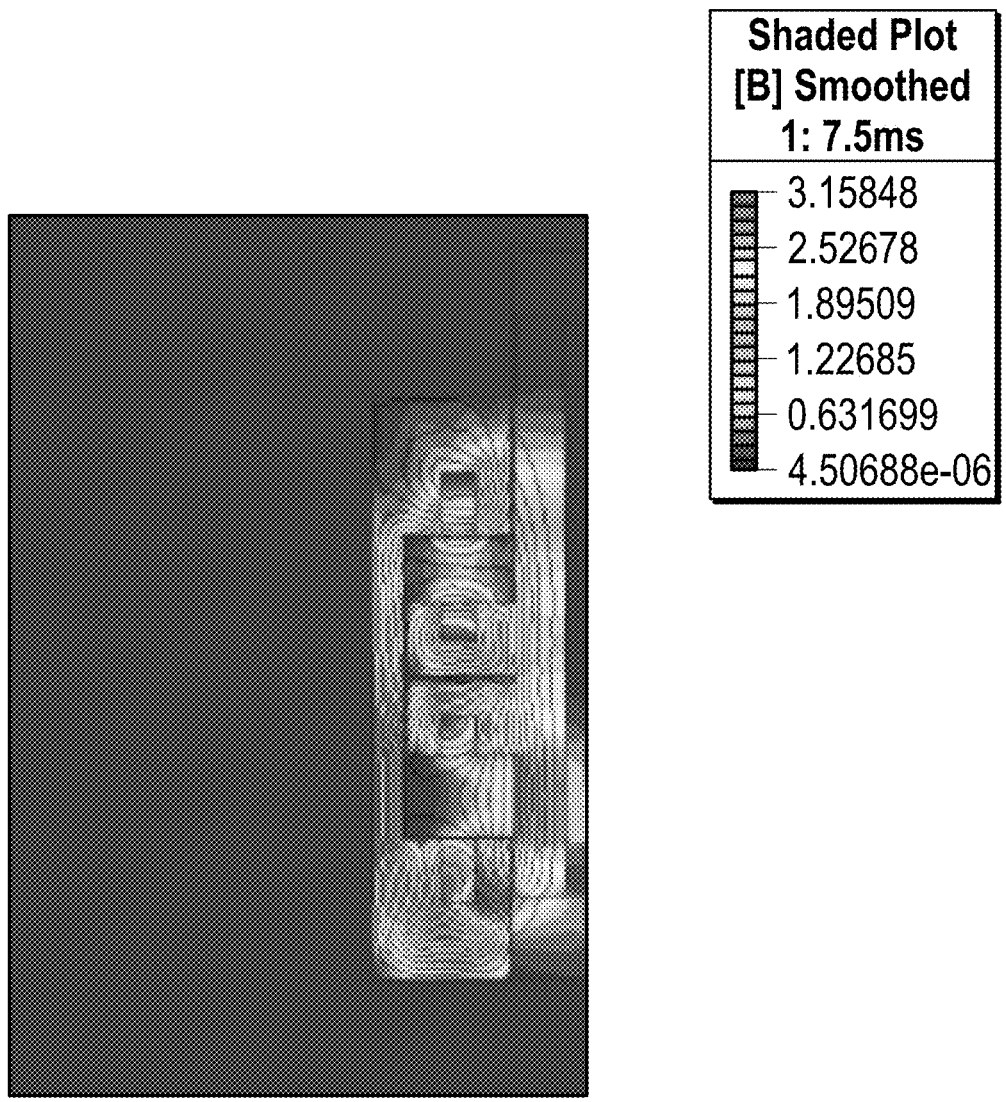
FIG. 6A depicts a flux path in accordance with one or more embodiments of the disclosure.
Figure 6B:
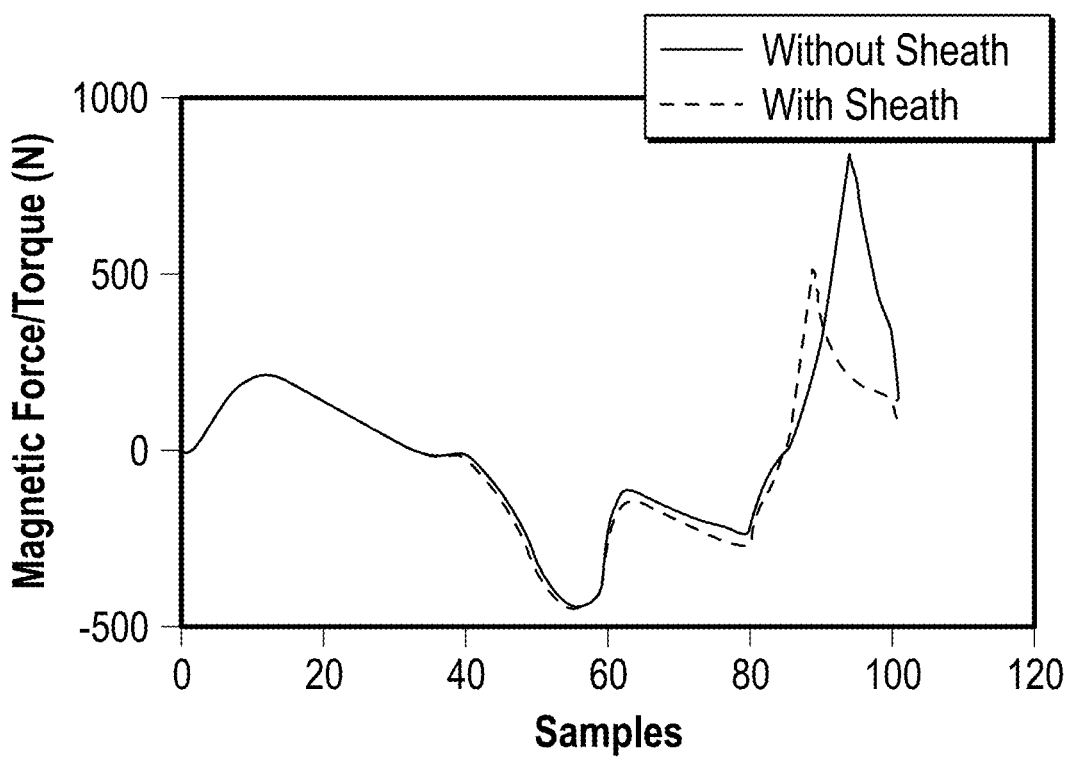
FIGS. 6B and 6C depict a magnetic force and a position of a linear actuator in accordance with one or more embodiments of the disclosure.
Figure 6C:
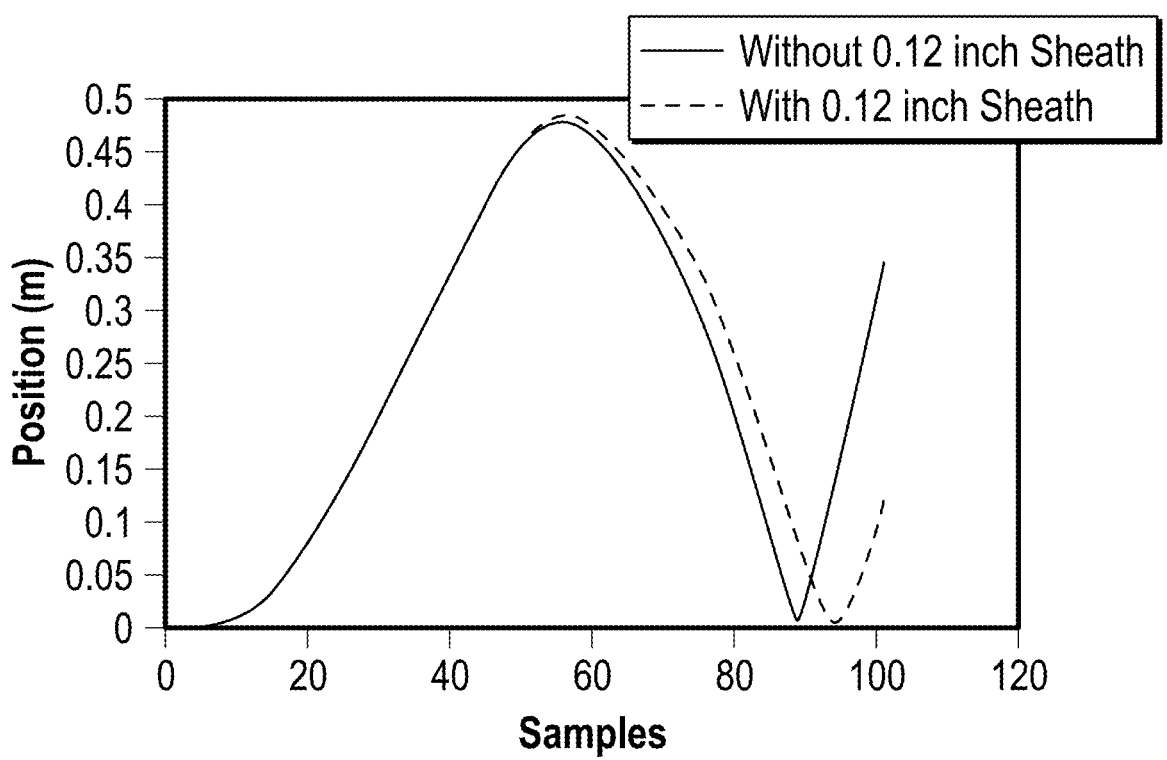
Figure 7:
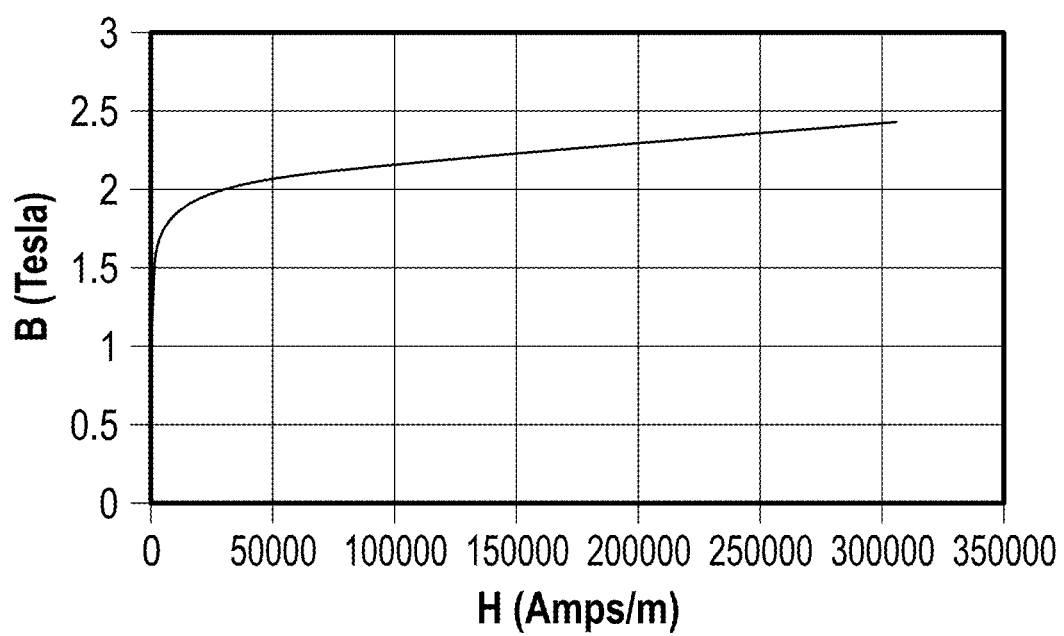
FIG. 7 depicts a B-H Curve of 1010 cold-rolled steel showing the magnetic response of the 1010 cold rolled steel to an applied magnetic field/flux in accordance with one or more embodiments of the disclosure.

The flux function of the actuator is shown in the FIG. 6A. Also, FIGS. 6B and 6C show the simulation results of the dynamic 2D simulation operation of the actuator for one cycle and is compared with the previous design (lacking the sheath 102). The results reveal that using the sheath 102 around the actuator, requires less magnetic field production on the windings (less current drain from the energy source), and the actuator can complete the running cycle faster.

Figure 5:
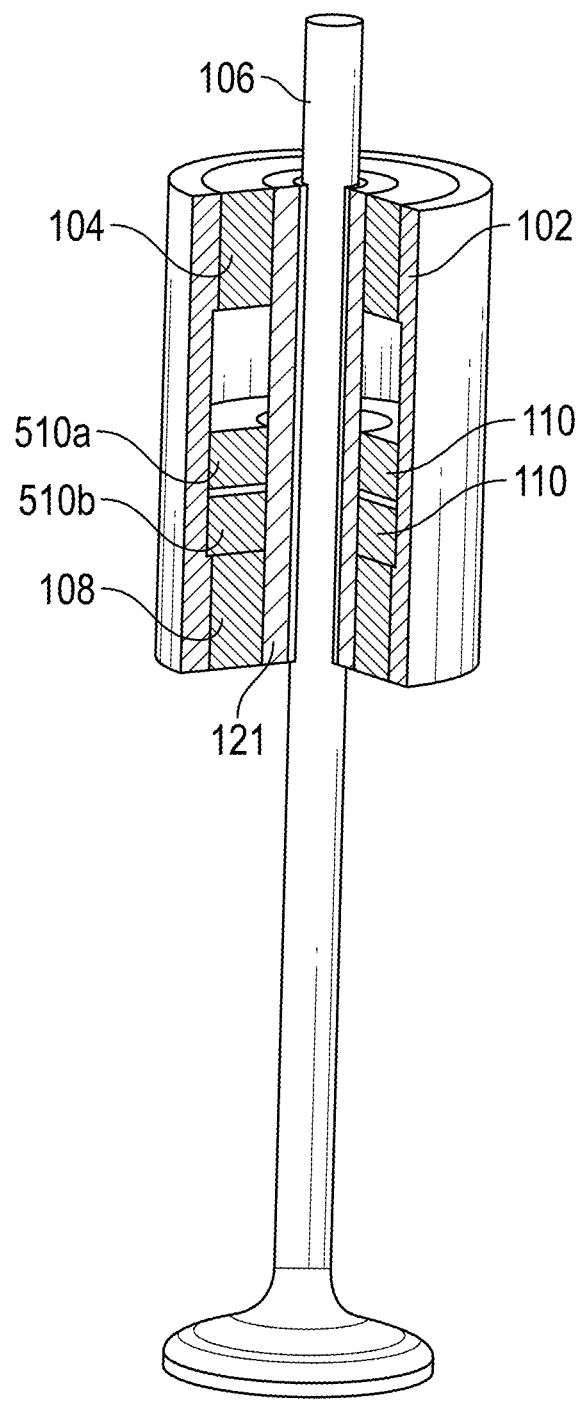
FIG. 5 depicts a double thruster design in accordance with one or more embodiments of the disclosure.

In some embodiments, the number of the system orders (e.g., number of windings present in the thruster) is for the sake of simplicity. For instance, in some embodiments, the number of thruster windings is reduced from two to one (a two thruster winding embodiment is depicted in FIG. 5 and the preferred one thruster winding embodiment is depicted in FIGS. 1A-1C). This results in easier control and the robust operation of the actuator. In some embodiments, the actuator includes two stator windings and two thruster windings that are operated symmetrically. In other words, for example, when the bottom stator and the bottom thruster windings attract each other in the same direction, the other half of the actuator can produce the same magnetic force in the same direction to increase the speed. Yet, the same windings are able to produce slightly higher magnetic fields in the reverse direction for introducing the breaking mode. Moreover, the designed commutators and brush system with the sheath of copper in the hollow area between the thruster and stator are not practical since there is a need for two sets of the commutations and conductive material in a specific groove for providing power to the thruster windings. One possible solution for the thruster with the double windings may be the use of two sets of separate grooves along with the ball bearing commutation system. The proposed concept for the double winding thruster configuration is shown in FIG. 1B.

Figure 15B:
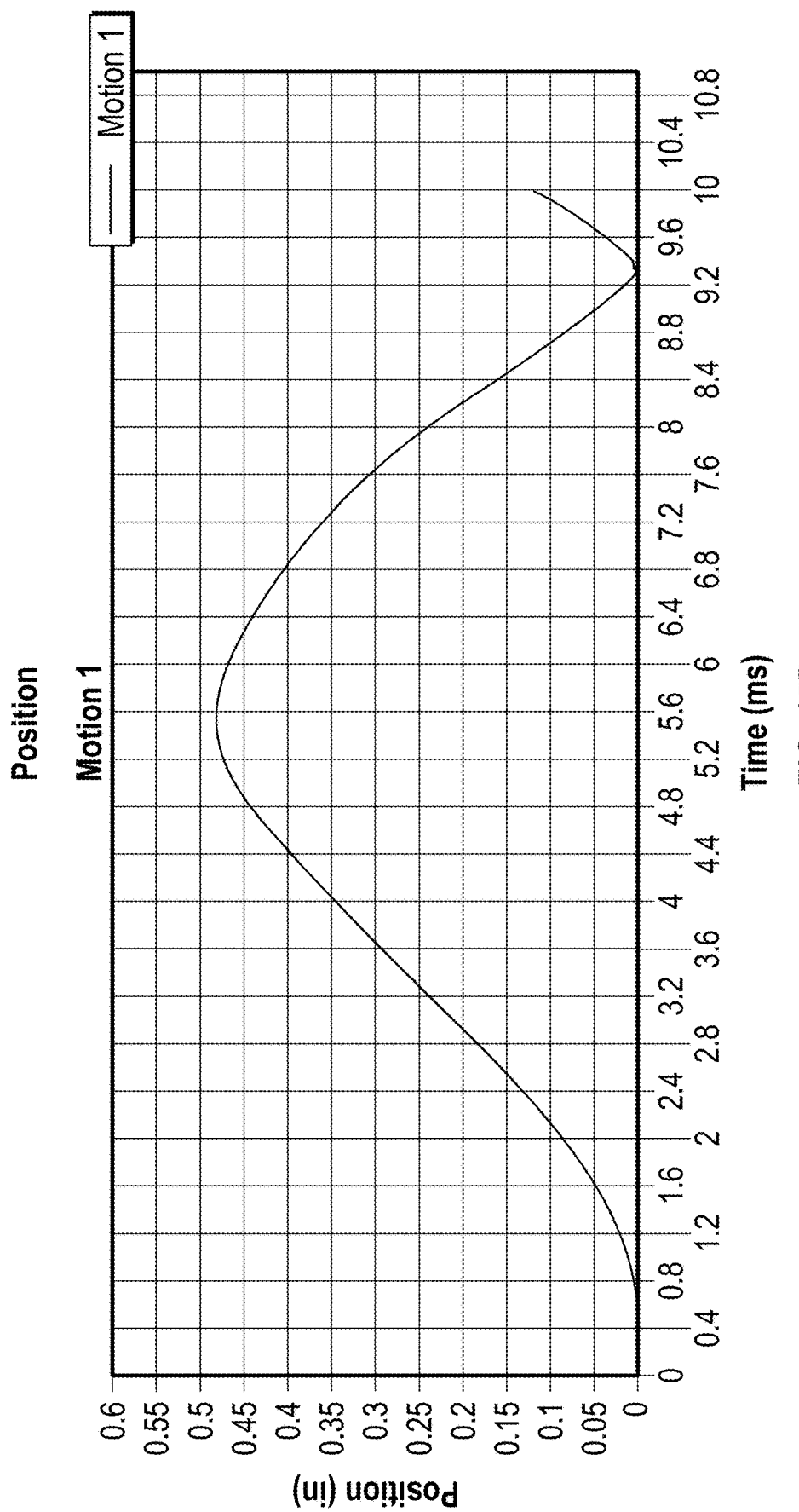
FIGS. 15B-15D depict position, voltages, and currents of stators and thrusters in accordance with one or more embodiments of the disclosure.
Figure 15C:
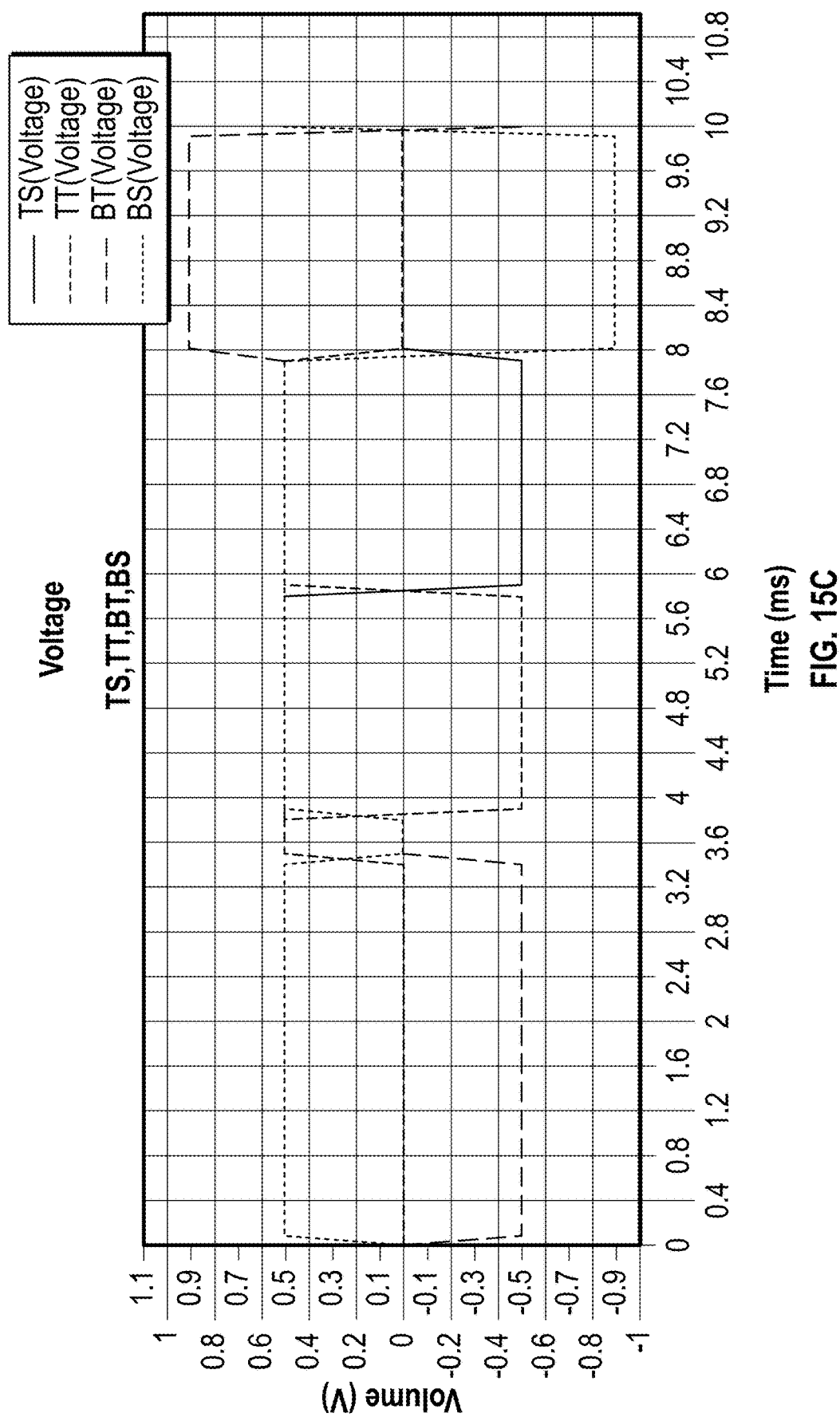
Figure 15D:
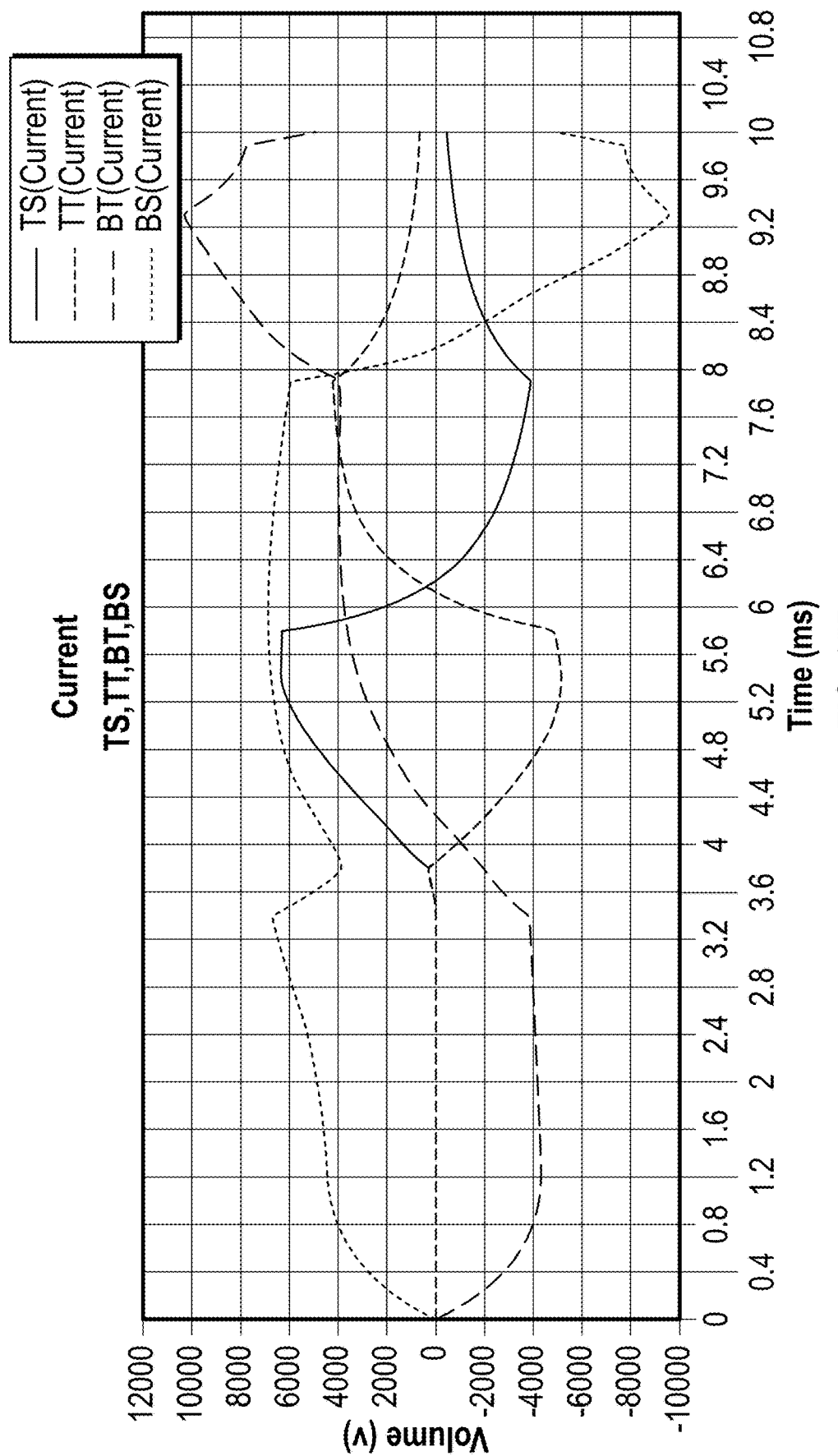

Furthermore, one of the main disadvantages of a double winding thruster is the need for at least two full-bridge converters for both pairs of windings (top or bottom windings), which results in a more complex control scheme, as there might be some feasible overlap conditions in controlling of a common leg, causing a short circuit between switches of a converter leg. Simulated position, voltage, and current plots for stators and thrusters for a double winding thruster are shown in FIGS. 15B-15D. In the actuator, as depicted in FIG. 1A, the thruster windings are merged together to form a single winding thruster actuator. This allows the thruster disk 110 to be fed directly with a 480 VDC source, which continuously provides electric current to the thruster disk 110, resulting in less complications in control. Thus, by controlling the stator windings using one set of full-bridge converters, it will be reasonable to reduce the quantity of switches and the overall system complexity.

FIGS. 20A-20J and 21A-21I depict performance parameter plots for various wire gauges (these plots were used to determine optimal wire gauges for the actuator system). The number of the turns and the resistance of each windings impact the desired Ampere-turn (A.T) for the production of magnetic force. The higher the A.T for each of the windings, the faster and smoother the control of the valve position. There is a trade-off between higher A.T and the lower resistance of the wire path in the sense that the higher A.T (more specifically, higher amps) with high resistance of the winding will result in a hot spot in the actuator causing deterioration or aging of the windings. To support this shortcoming, codes were developed for the static modeling of the actuator. The codes were used to find the optimum wire gauge size and the number of turns to meet the desired A.T with respect to the least resistance, physics limitation, and the design constraints. In the static modeling, the condition that the size of the actuator is a variable of the x-axis has been taken to account. In other words, by using these simulations, it was assessed if the increase in the size of the actuator (in the x-axis) will meet the desired design criterions. In some instances, the 48 VDC may not be sufficient for most of the operation conditions of the actuator, i.e., operation cycle of 20 Hz and above. With this in mind, the power electronic drive is designed to be able to provide higher voltages up to 10 times of the source voltage (i.e., 480 VDC) internallyby means of a multi-stage DC/DC converter accompanied by the full-bridge converter. The static simulations of the achievable A.T for different excitation voltage of the windings can be seen in FIGS. 20A-20J. The excitation voltage is considered to be in the range of 48 VDC up to 480 VDC with steps of 48 volts. The same results for the power loss are obtained with respect to the same conditions of the excitation voltage. The results for the power loss are depicted in FIGS. 21A-21I. The results from the static simulations in FIGS. 20A-20J and 21A-21I illustrate that increasing the size of the actuator in the x-axis (which provides more room for the number of turns in each windings) may not be beneficial for the overall design. Moreover, the results show that extra room for more wirings will increase the mass of the moving compartments, while the higher resistance of the windings is another limitation factor for the A.T requirements.

In one exemplary embodiment, the optimum wire gauge size was found to be about 34 with 4800 turns of wire for each of the windings. Any suitable wire gauge and number of turns may be used, however. The outcome from the static simulations are in line with the dynamic simulations using co-simulation of Simulink and MagNet. In should be noted that the database of the different wire gauge sizes is not finalized with the wire manufacturer. This might result in a deviation of wire gauge sizes and number of the turns. This is mainly due to different size of coating materials used by different manufacturers.

Actuator Controller

Figure 18:
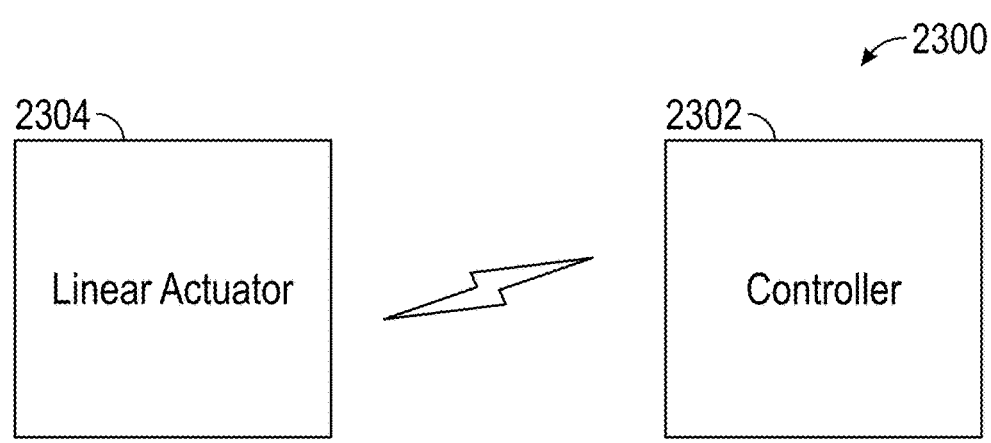
FIG. 18 depicts a system comprising a linear actuator and a controller in accordance with one or more embodiments of the disclosure.

FIG. 18 depicts an exemplary system 2300 for controlling the actuation of a linear actuator. The linear actuator may be any of the previously mentioned linear actuator embodiments. The system comprises the linear actuator and a controller 2302 used to control the actuation of the linear actuator. In one embodiment, the controller 2302 includes a simple P control loop which uses feedback information to allow the thruster 121 position to closely follow a position reference. The controller 2302 receives input data from the actuator, such as information pertaining to the position of various components, and provides output data to the actuator in the form of signals and/or commands instructing the actuator to perform particular functions.

In some embodiments, the controller 2302 is a computing system comprising one or more processors, an operating system, and memory. The memory can comprise functionality instructions storage and functionality information storage. The functionality instructions storage can comprise computer-accessible instructions that, in response to execution (by at least one of the processor(s)), can implement one or more of the functionalities of the disclosure. The computer-accessible instructions can embody or can comprise one or more software components illustrated as power control component(s). In one scenario, execution of at least one component of the power control component(s) can implement one or more of the techniques disclosed herein. For instance, such execution can cause a processor that executes the at least one component to carry out a disclosed example method.

It should be appreciated that, in one aspect, a processor of the processor(s) that executes at least one of the power control component(s) can retrieve information from or retain information in a memory element (referred to as power control information) in the functionality information storage in order to operate in accordance with the functionality programmed or otherwise configured by the power control component(s). Such information can include at least one of code instructions, information structures, or the like. At least one of the one or more interfaces (e.g., application programming interface(s)) can permit or facilitate the communication of information between two or more components within the functionality instructions storage. The information that is communicated by the at least one interface can result from implementation of one or more operations in a method of the disclosure. In certain embodiments, one or more of the functionality instructions storage and the functionality information storage can be embodied in or can comprise removable/non-removable, and/or volatile/non-volatile computer storage media.

At least a portion of at least one of the power control component(s) or power control information can program or otherwise configure one or more of the processors to operate at least in accordance with the functionality described herein. One or more of the processor(s) can execute at least one of such components and leverage at least a portion of the information in the functionality information storage in order to provide power control in accordance with one or more aspects described herein.

It should be appreciated that, in certain scenarios, the functionality instruction(s) storage can embody or can comprise a computer-readable non-transitory storage medium having computer-accessible instructions that, in response to execution, cause at least one processor (e.g., one or more of the processor(s)) to perform a group of operations comprising the operations or blocks described in connection with the disclosed methods.

The memory can comprise computer-accessible instructions and information (e.g., data and/or metadata) that permit or facilitate the operation and/or administration (e.g., upgrades, software installation, any other configuration, or the like) of the computing device. Accordingly, as illustrated, the memory can comprise a memory element (labeled OS instruction(s)) that contains one or more program modules that embody or include one or more operating systems, such as Windows operating system, Unix, Linux, Symbian, Android, Chromium, and substantially any operating system suitable for mobile computing devices or tethered computing devices. In one aspect, the operational and/or architectural complexity of the computing device can dictate a suitable operating system. The memory also comprises a system information storage having data and/or metadata that permits or facilitates the operation and/or administration of the computing device. Elements of the OS instruction(s) and the system information storage can be accessible or can be operated on by at least one of the processor(s).

FIG. 8 illustrates an embodiment of the P control loop 900 of the controller 2302. The input to the control loop 900 is the position reference 902 of the thruster 121. The actual position of the thruster 121 is then subtracted from the position reference to produce an error. The error is fed into a proportional controller 904 which outputs the force reference for the thruster 121. The force reference along with the position of the thruster 121 is then sent to a reverse lookup table 906 that determines the current references that must be applied to the stator pot core structures 122. The thruster disk pot core structure 120 may have a current of 4000 amp-turns or 6000 amp-turns. The current reference is then fed into a Hysteresis Current Controller (HCC) 908 which, in turn, controls the switching of a converter 1002. The outputs of the converter 1002 are sent to the modeled electrical dynamics (resistance and inductance in series). This in turn gives the actual currents of the stator pot core structures 122. The actual currents of the stator pot core structures 122 along with the actual position of the thruster 121 are then used to determine the force produced by the thruster 121. This force is then sent to the Newton's law equation 912 to determine the speed and position of the thruster 121. A proportional gain of the controller 2302 may be increased to produce a higher force reference for the thruster to a change in position reference; however, this inherently inhibits the soft seating aspect that is desired. A higher proportional gain will produce a larger force reference and vice versa.

For the reverse current lookup tables, the actual position of the thruster 121, which is calculated by Newton's Law, and the force reference are fed into this block then the current for each of the stator pot core structures 122 are determined. When taking a closer look into these blocks, there may be eleven different 1-D lookup tables for each winding for a single amp-turn value in the thruster 121, one for each of the different positions that was used to collect data. The force reference are fed into each of these lookup tables which, in turn, produce a current value. Since there may be eleven different current values being produced, one for each of the positions, the correct current value must be determined. This is done by using the actual position to decide which current value is the correct one to use by calculating which position that was used to collect data is closest to the actual position of the thruster. The data in these lookup tables may be from the data collected through MagNet, or similar simulation software.

FIG. 9 depicts an example embodiment of a converter 1002 used by the HCC 908 to control current being provided to the actuator. In one embodiment, the converter 1002 used is an H-bridge. There may be a total of four switches (shown as S1, S2, S3, and S4 in FIG. 9) for each winding (Shown as "M" in FIG. 9). The voltage equation for the converter 1002 is shown in Equation (1).

$$V_{out} = (2S-1)VDC \quad (1)$$

For simplicity, this converter only has two states: VDC and −VDC (where VDC means DC voltage). In Equation (1), S determines the state of the switches and is either one or zero. An illustration of a converter that controls a single winding is shown in FIG. 9, where M represents a winding of the actuator.

The current references for each of the stator windings are sent to the Hysteresis Current Controller (HCC) 908. HCC is a current control strategy which maintains the phase current within a certain tolerance of the desired current. If the phase current becomes greater than the reference current plus the hysteresis level, the state of the converter becomes −VDC, which reduces the current output. If the phase current becomes less than the reference current minus the hysteresis level, the state of the converter becomes VDC, which increases the current output. This strategy is illustrated in FIG. 10, where $i_a$ is the actual current, $i_{ref}$ is the reference current, $i_{up}$ is the upper band current, and $i_{low}$ is the lower band current.

The voltage output of the converter equations is then sent to the electrical dynamic equation. The electrical dynamic equation utilizes the resistance and inductance as a function of the voltage to calculate the actual current in the windings. The actual current value is used as a measurement in the HCC 908 and is also sent to the current to force lookup table. The equation is in the form of a transfer function and is shown in Equation (2).

$$\frac{1}{(s+R)} \tag{2}$$

The resistance value of the actuator used by the electrical dynamic equation is calculated based off of the physical dimensions of the actuator. The resistance is found using the Equation (3):

$$R = p\left(\frac{l}{A}\right) \tag{3}$$

where R is the total resistance of the wire, p is the resistivity of the material and is a constant, l is the length, and A is the cross-sectional area. The area of the wire depends on the gauge, which may be 22 AWG wire, but any gauge may be used herein. The length of the wire is found by using the average radius from the center of the actuator and multiplying the circumference by the number of turns required, as shown in Equation (4):

$$l = N(2\pi r_{avg}) \tag{4}$$

The number of turns, N, may be 600 based on the usage of 22 AWG wire and average current values present in the actuator, and $r_{avg}$ was chosen as the distance from the center of the actuator to the middle of the winding slot on the stators. However, any number of turns, N, may potentially be used.

It is desired to use the lowest inductance value to create the highest switching frequency in the control to gauge how fast the power electronics would need to be. This value is achieved when the thruster is at its midpoint since this position creates the largest air gap between both of the stator windings. The inductance value of the actuator used by the electrical dynamic equation is calculated based off of the reluctance of the magnetic flux path through the stator, air gap, and thruster. The equation to find the reluctance is given as Equation (5):

$$\mathcal{R} = \frac{l}{(\mu_r \mu_0 A)} \tag{5}$$

where $\mathcal{R}$ is the reluctance, $\mu_r$ and $\mu_0$ are relative permeability and the permeability of free-space, respectively. The length is found using the mean flux path and may be broken into parts to consider that the flux had to travel through two pieces of steel and an air gap. The sum of the individual sections is then used to determine the total reluctance. After this value is found, the relationship in Equation (6)

$$\frac{N^2}{\mathcal{R}} \tag{6}$$

is used to determine the total inductance, considering how many turns of wire were selected. Example calculations for the resistance and inductance values are found in the calculations appendix section.

The current to force lookup table utilizes the actual currents that are applied to the windings along with the actual position of the thruster to determine the actual force that is being produced by the thruster. This is done through a 3-D lookup table. The data in this lookup table may be from the data collected through simulation software, such as MagNet.

The force output from the current to force lookup table is sent to the Newton's Law equation. This equation calculates the position of the thruster and is shown in Equation (7).

$$F = ma \tag{7}$$

Since the force and mass of the thruster is known, the acceleration is calculated. By integrating the acceleration twice, the actual position of the thruster is calculated. The actual position, calculated by Newton's Law, is used in the P control loop, reverse lookup tables, and the current to force lookup table.

Figure 25A:
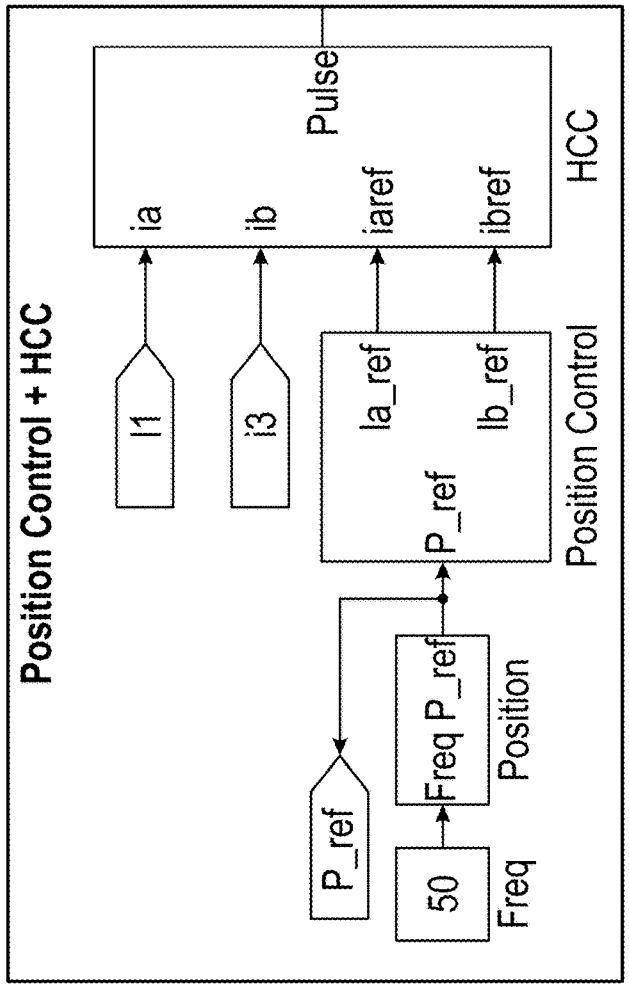
FIG. 25A depicts a proposed position controller and the Hysteresis Current Control (HCC) block, including general control scheme in accordance with one or more embodiments of the disclosure.
Figure 25B:
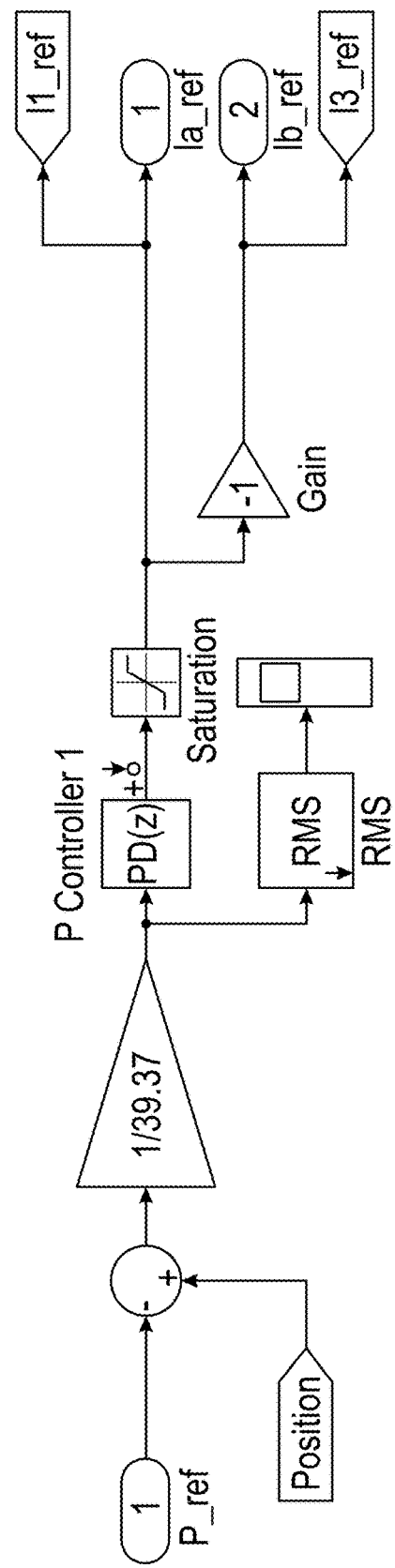
FIG. 25B depicts a proposed position controller and the Hysteresis Current Control (HCC) block, including a position controller in accordance with one or more embodiments of the disclosure.
Figure 25C:
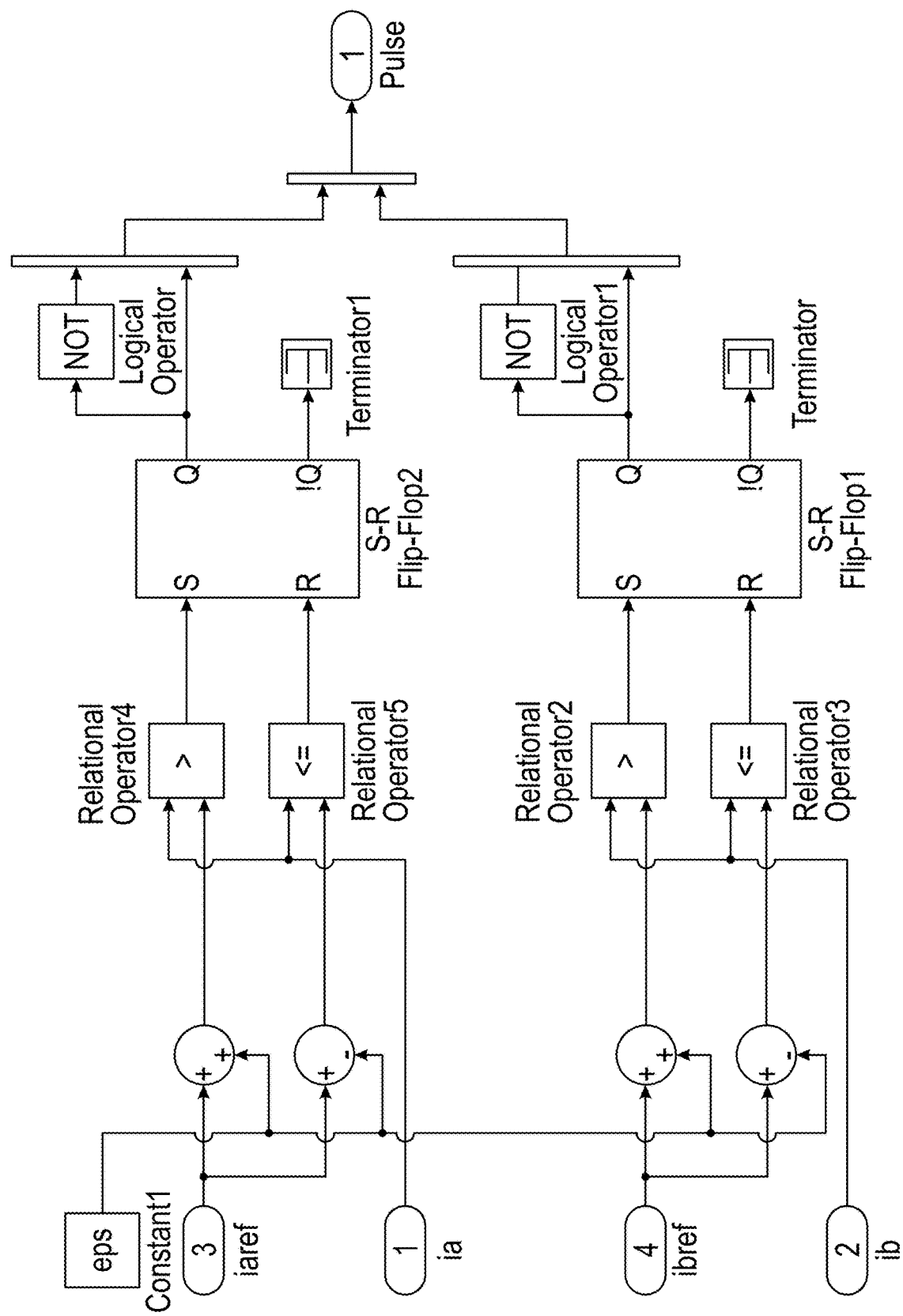
FIG. 25C depicts a proposed position controller and the Hysteresis Current Control (HCC) block, including a HCC block in accordance with one or more embodiments of the disclosure.

Some considerations had to be taken into account with regards to the physical limitations of the actuator for this part of the simulation. Since the actuator has upper and lower limits on the position, Newton's Law must take into account these restrictions. This is done in two different places. The output of the first integrator, which is the speed, must equal zero when the thruster is either fully extended or seated. This is done by adding an external reset which is activated when the thruster is at either of these positions. The second integrator's output, which is the position of the thruster, may utilize an upper and lower saturation limit of 0.5 in and 0 in, respectively. FIGS. 25A-25C illustrate an embodiment of a position controller 2302 in which the position controller 2302 includes a PD control loop. This embodiment may address the dynamic response of the actuator (modeled in MagNet) and the nonlinear behavior of the switching drive. The proposed controller includes a discrete PD controller. The compensator is shown in Equation (8):

$$C_{par}(z) = P + D\frac{1}{T_s}\frac{z-1}{z} \tag{8}$$

The input of the controller block is typically an error signal, which is the difference between a reference signal and the system output. In this application, the input signal to the control loop is the position reference, which is considered to be sinewave with an offset value. The error fed into the PD controller, which outputs the current references for the top and bottom stator windings. The current reference is then fed into a Hysteresis Current Controller which, in turn, provides the gate signals for controlling the switching state of the converter. The gate signals are then fed into the dynamic switching model of the full-bridge converter to build the required excitation voltages of the stator windings. Consequently, in certain instances, a MagNet plug-in may send the excitation voltages to MagNet software (which is running in the background) and sends the actual windings currents with the actual position of the intake valve back to the controller.

Figure 37:
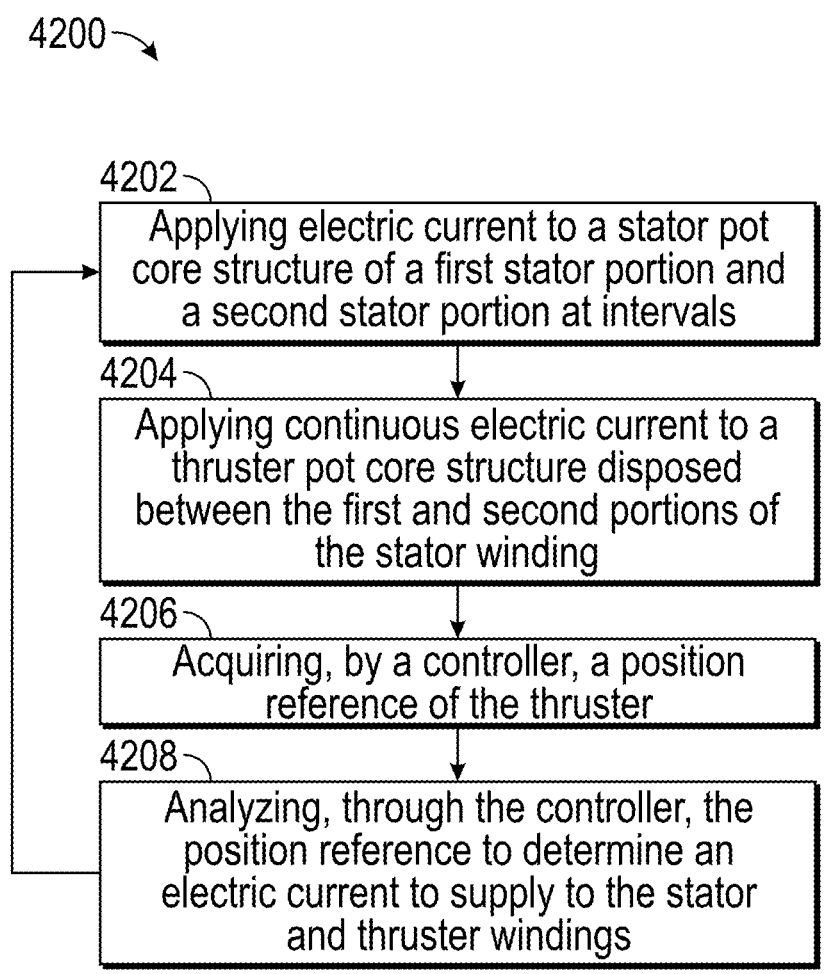
FIG. 37 illustrates a method of actuating a linear actuator in accordance with one or more embodiments of the disclosure.

FIG. 37 depicts an example actuator control method 4200. The method involves applying electric current to a stator pot core structure 122 (and any associated copper windings 131) of a first stator portion 104 and a second stator portion 108 at intervals at 4202. At 4204, continuous electric current is applied to a thruster pot core structure 120 and any associated copper windings 131, which may be disposed of between the first 104 and second portions 108 of the stator 109. At 4206, a position reference of the thruster 121 may be obtained by a controller 2302. At 4208, the controller 2302 analyzes the position reference to determine an electric current to supply to the thruster pot core structure 120 and stator pot core structures 122 (and any associated copper windings 131).

In some instances, the linear actuator is configured to achieve any suitable maximum frequency. The magnitude of the achieved frequency is based on linear actuator design factors, such as the number of turns in any of the copper windings 131, the amount of current injected into the copper windings 131, the magnetic material used to create the flux paths, the switching frequency of the power electronic drive 130 and similar devices, the capability and frequency of digital signal processing units found within the controller 2302, and/or any number of other design factors. Any one or combination of these components may be adjusted to achieve any suitable maximum frequency.

Simulation Results

Figure 14:
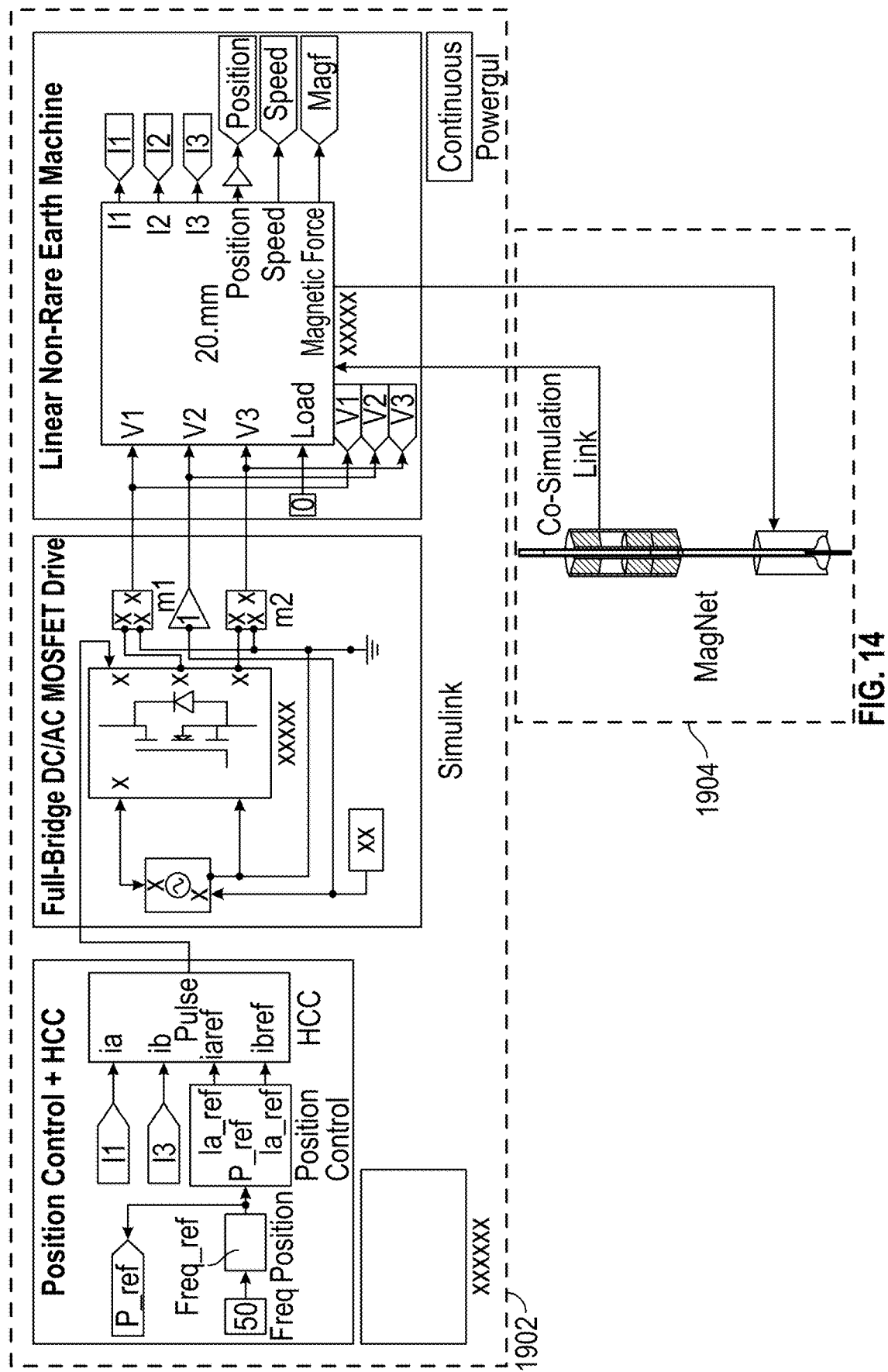
FIG. 14 depicts a testing setup using Simulink to MagNet (and vice versa) during a co-simulation process in accordance with one or more embodiments of the disclosure.

The actuator was evaluated using the co-simulation of Matlab/Simulink and Infolytica/Magnet capabilities to provide an accurate and reliable simulation of the actuator along with the proposed power electronics drive and position control system. The goal of the study was to first have a better understanding of the different magnetic permeability in the ferromagnetic paths for the overall response of the actuator, and second to improve the dynamic behavior of the system under unidentified conditions. The structure of the Magnet 1904 and Simulink 1902 co-simulation is shown in FIG. 14. After developing the position control for the actuator and populating the required look-up tables with the data obtained from the FEA analysis, multiple cases were simulated to determine the performance of the actuator and control. These cases covered both the upper and lower frequencies to observe the performance of the actuator throughout the entire operating range. The first case, with the actuator operating at the slowest frequency of 20 Hz, can be seen in FIG. 1.

Figure 11:
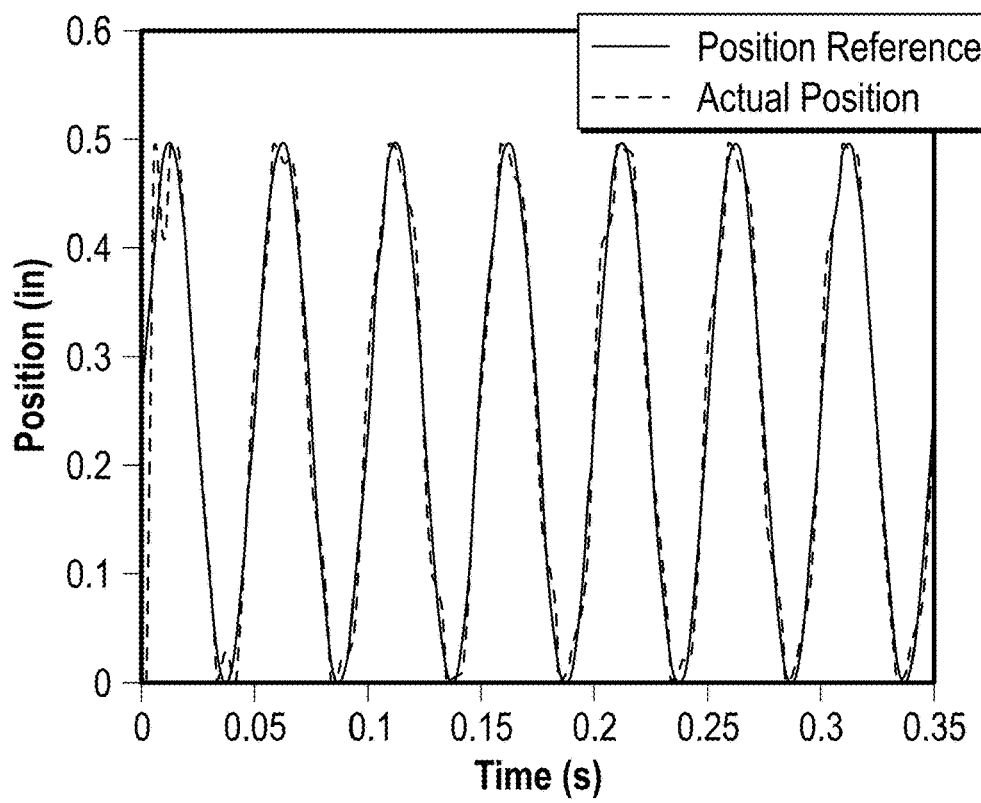
FIG. 11 depicts reference and actual position at 20 Hz in accordance with one or more embodiments of the disclosure.
Figure 12:
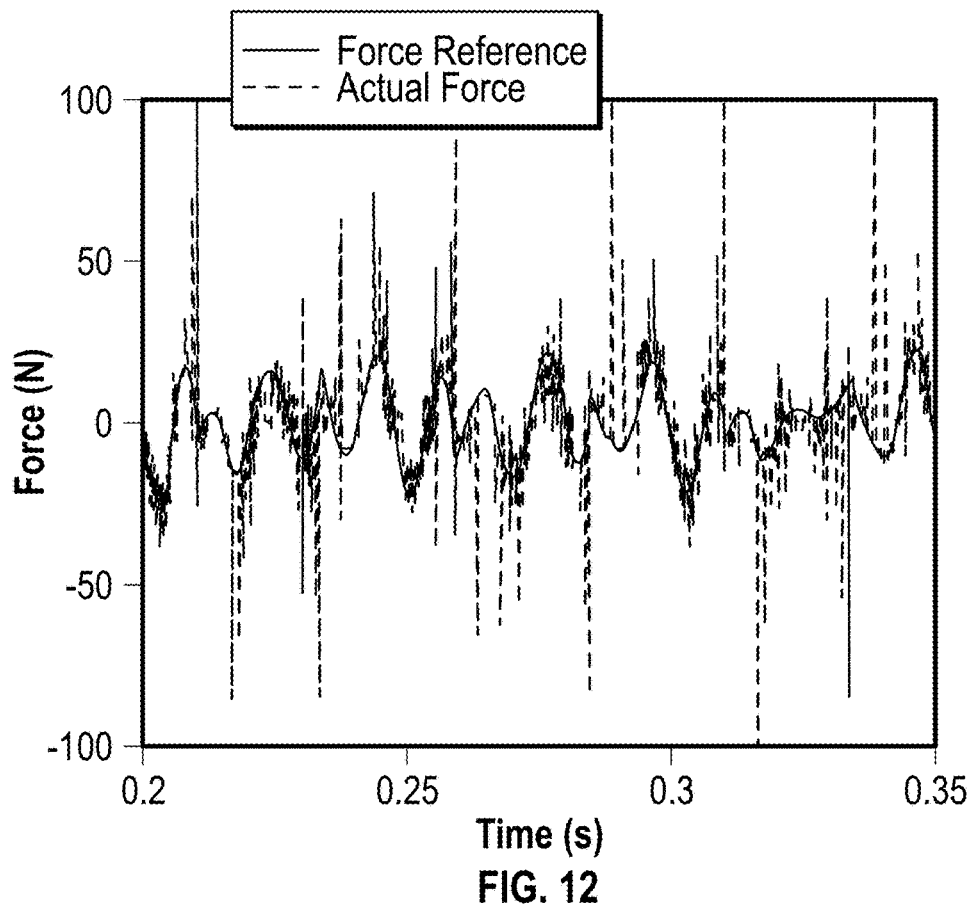
FIG. 12 depicts reference and actual position at 50 Hz in accordance with one or more embodiments of the disclosure.
Figure 13:
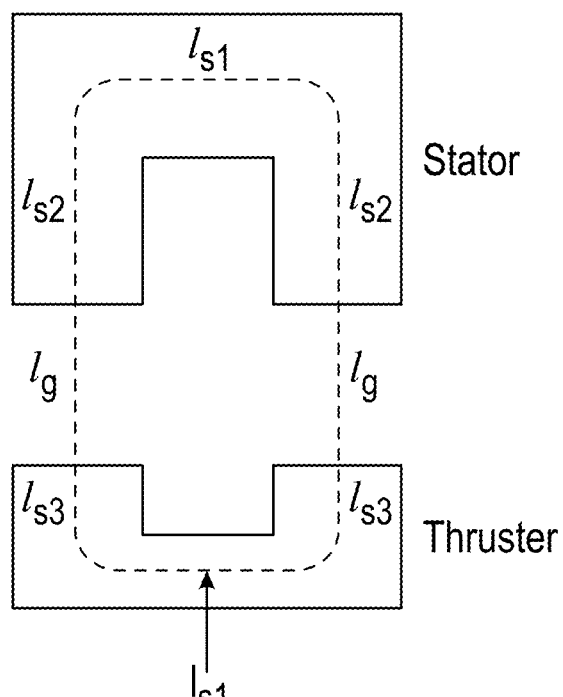
FIG. 13 depicts the mean flux path in accordance with one or more embodiments of the disclosure.

Looking at FIG. 11, it can be seen that the actuator tracks the position reference quite accurately at 20 Hz. This plot also demonstrates the soft seating ability of the actuator. The thruster accelerates outward before slowing and coming to a stop at the endpoint, and does the same process for the reverse. Since the velocity of the thruster goes to zero as the actuator reaches either of the endpoints, it is clear that soft seating is achieved. The forces produced in this case can also be viewed in FIG. 12, which shows the force reference produced by the controller and the actual force coming from the actuator after the hysteresis current control. The large spikes in the actual force production is likely due to a lack of data around certain operating points of the actuator. With more FEA analysis this could be cleaned up to eliminate most of the irregularities. However, since the spikes correspond to points where the force production is unknown at certain current values, the actual actuator would not experience the large changes in force production shown. Additionally, there is a ripple in the actual force output due to the switching of the converter when using the HCC. The size of this ripple is determined by how fast the converter switches, with a higher switching frequency correlating with reduced ripple. Therefore, the actual hardware used in the final design of the actuator will influence the actual amount of ripple present in the finished product. However, FIG. 12 shows that the converter model is functioning as expected and that the look-up tables using the FEA data are also operational.

Moving forward in the design process, some considerations need to be made for refining the design. To begin, the materials chosen in these simulations were based on typical materials that would be commonly used and does not necessarily represent the optimal choice for what the components of the actuator should be made out of. An in depth study could be performed to examine multiple materials for each of the components to find one with the best balance between performance and ease/cost of manufacturing. Additionally, the wire size used was based off of a rough study to find a suitable gauge in terms of size versus ampacity. Further optimization could be completed to find the best wire size to use, along with the dimensions of the space needed in each of the cores to fit the necessary turns. This could in turn require changing the copper to steel ratios or resizing some of the components to find a design that will allow the best possible performance.

After the physical characteristics of the actuator are settled on, the control may need some additional tuning to account for any changes made to the physical properties. The same type of control already developed could be used if the additional performance offered by the new design is sufficient to meet the requirements. However, if the design still requires tuning, then a more advanced control scheme may need to be implemented. As previously mentioned, a gain scheduling technique could be used to adjust the coefficients of the controller based on the operating point, or a different scheme such as a predictive based control could be implemented.

Figure 19:
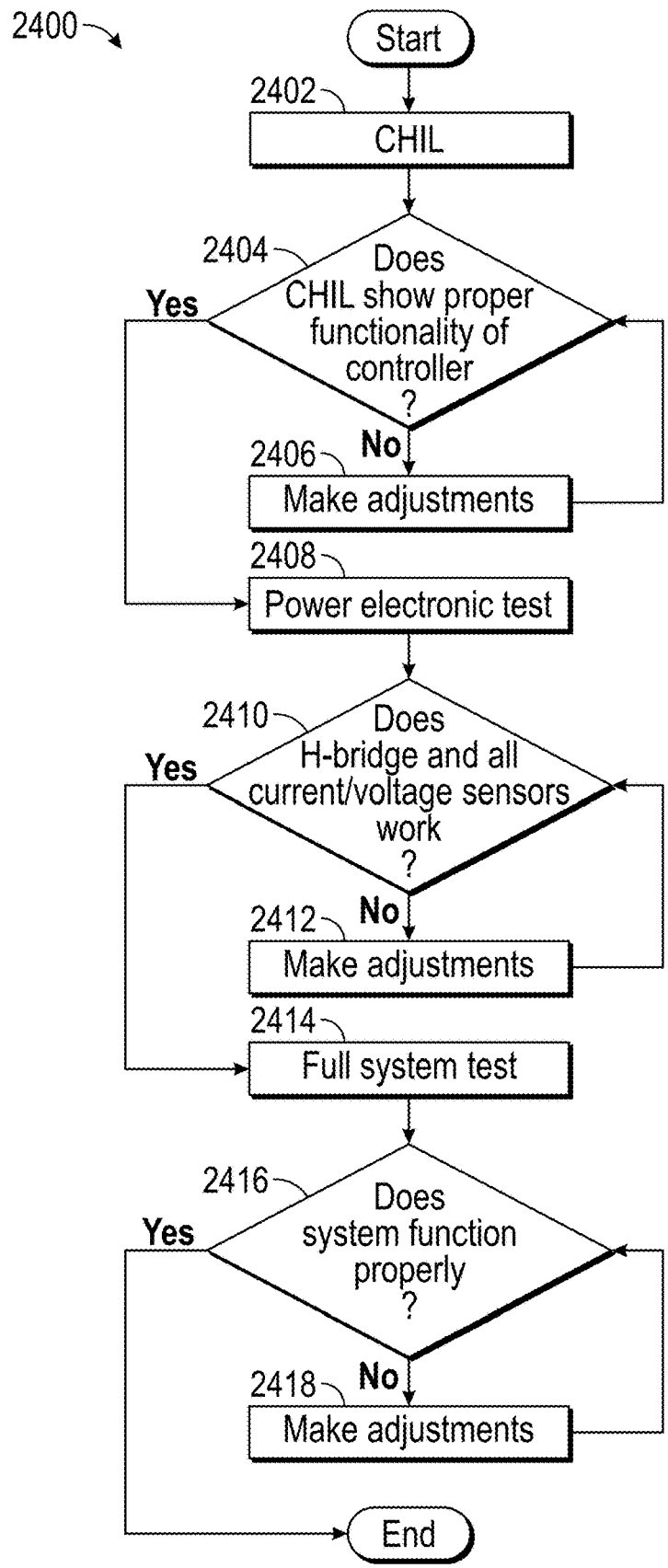
FIG. 19 depicts test flow charts in accordance with one or more embodiments of the disclosure.
Figure 20A:
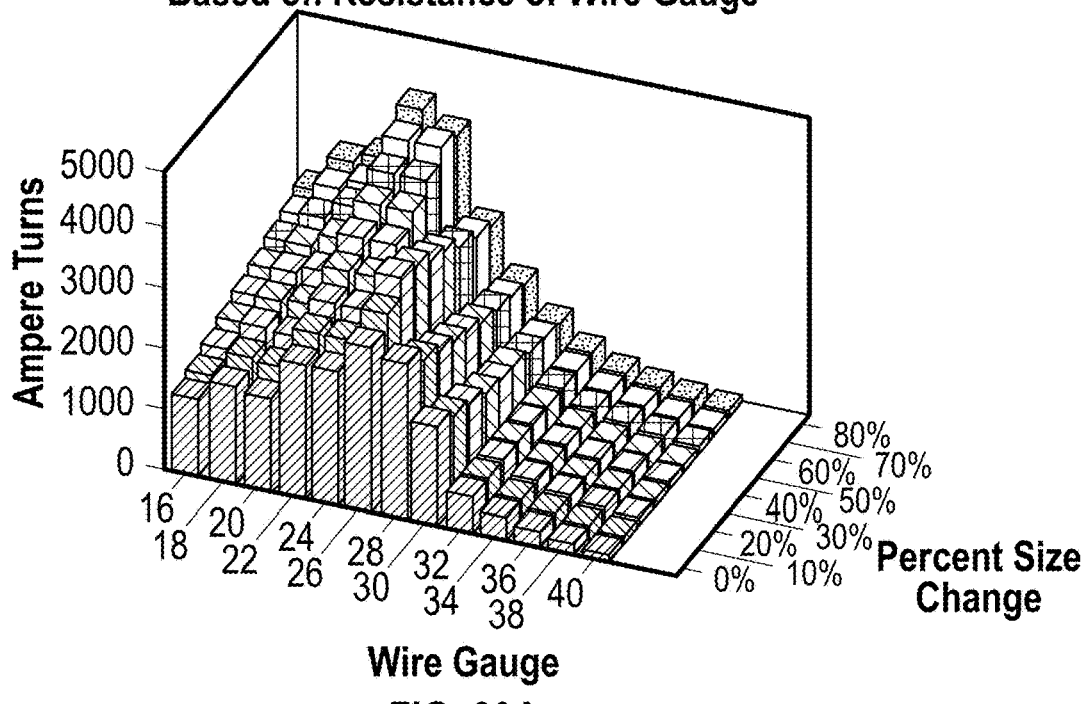
FIGS. 20A-20K depict achievable Ampere-turn values with different wire gauge size and different excitation voltages in accordance with one or more embodiments of the disclosure.
Figure 20B:
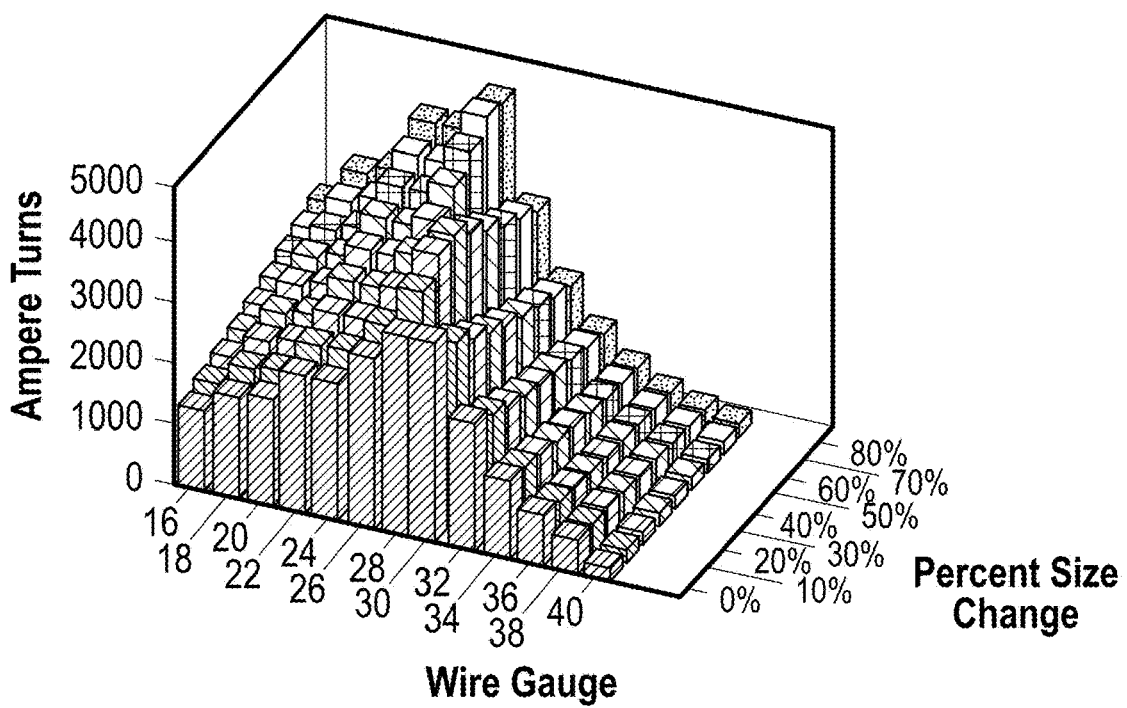
Figure 20C:
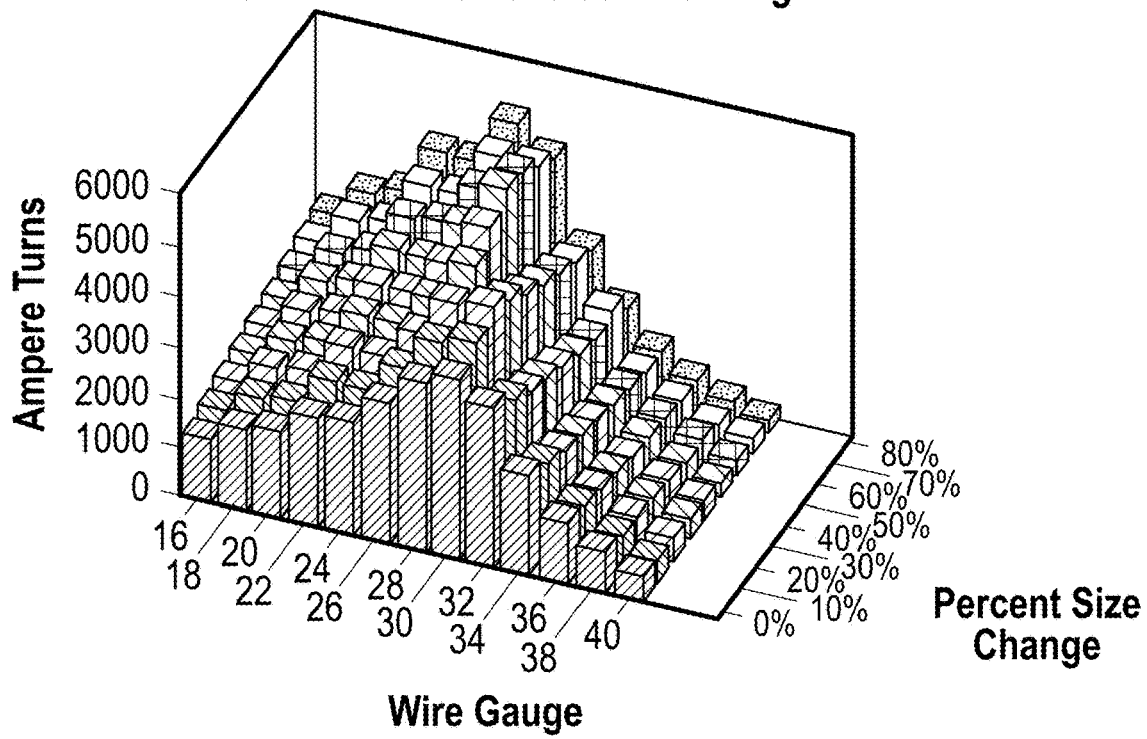
Figure 20D:
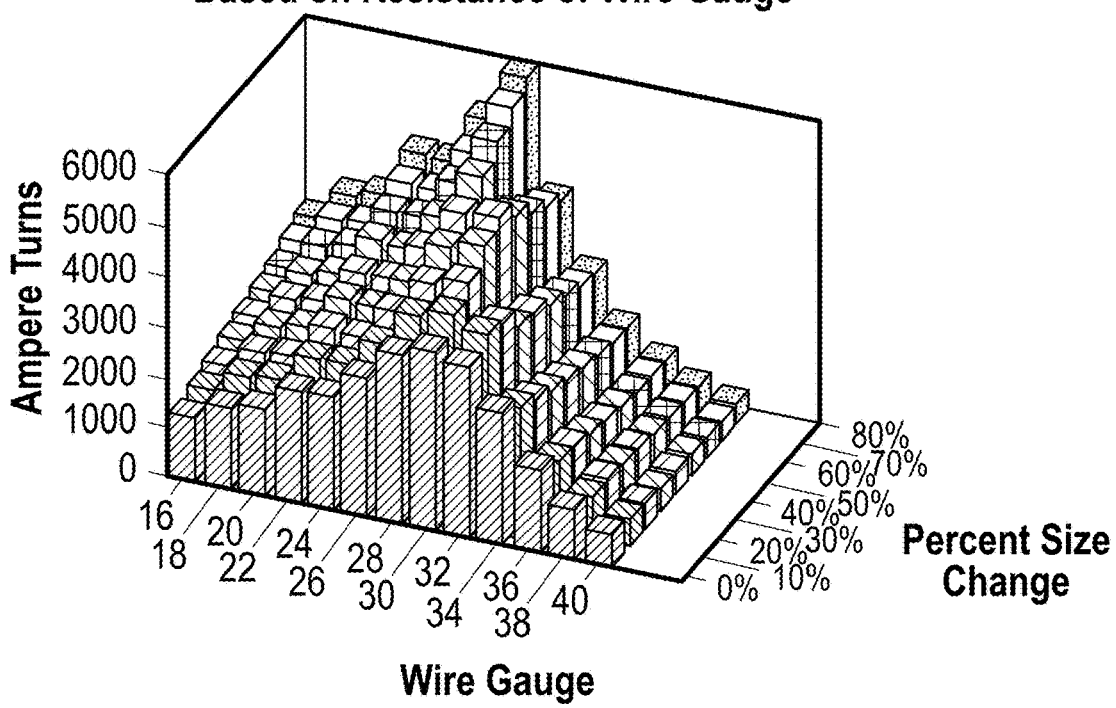
Figure 20E:
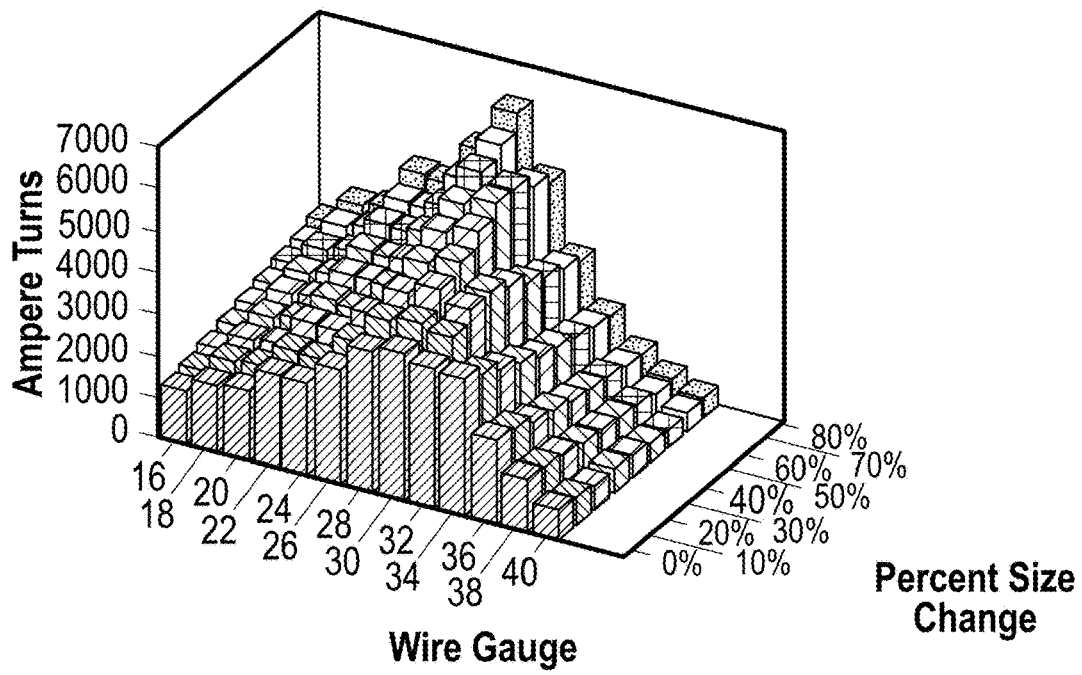
Figure 20F:
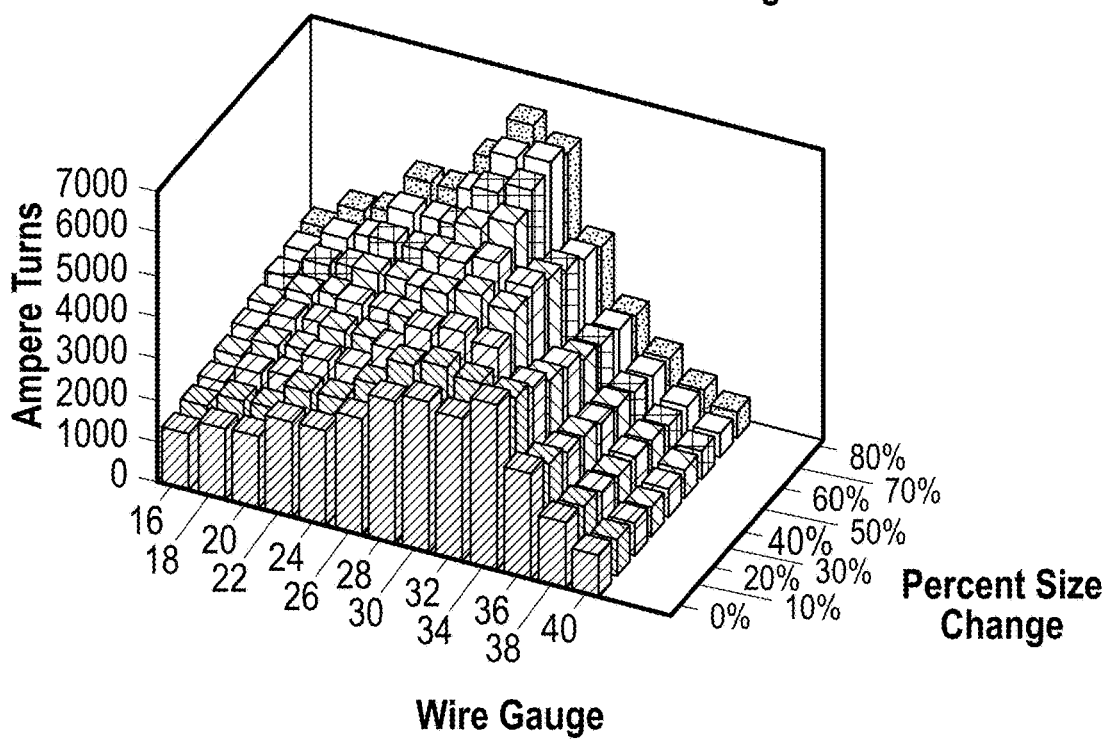
Figure 20G:
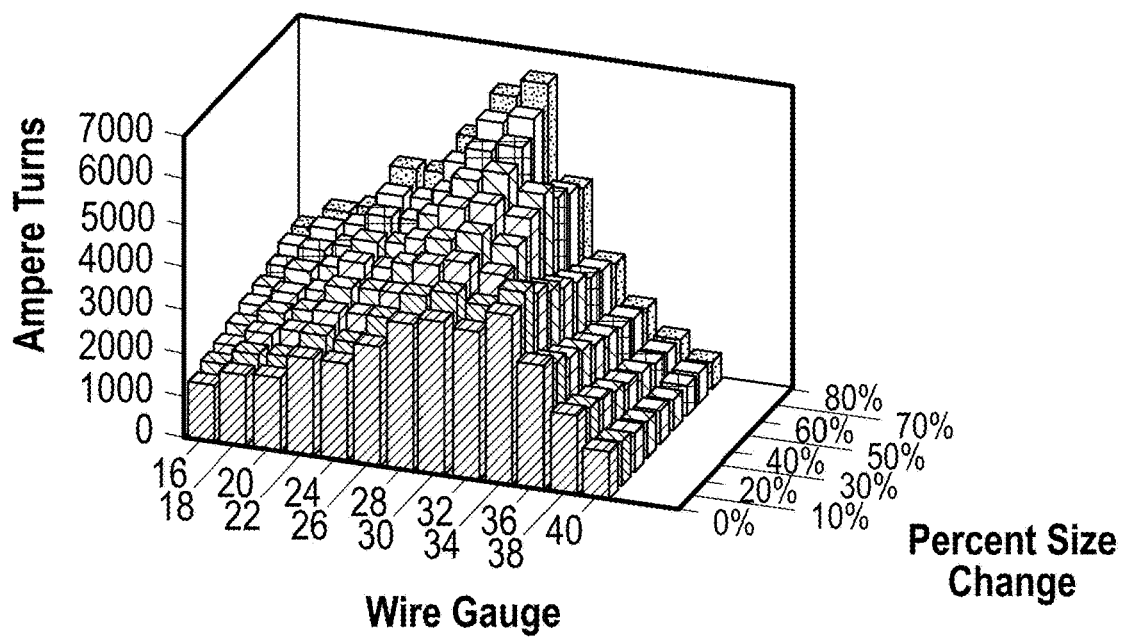
Figure 20H:
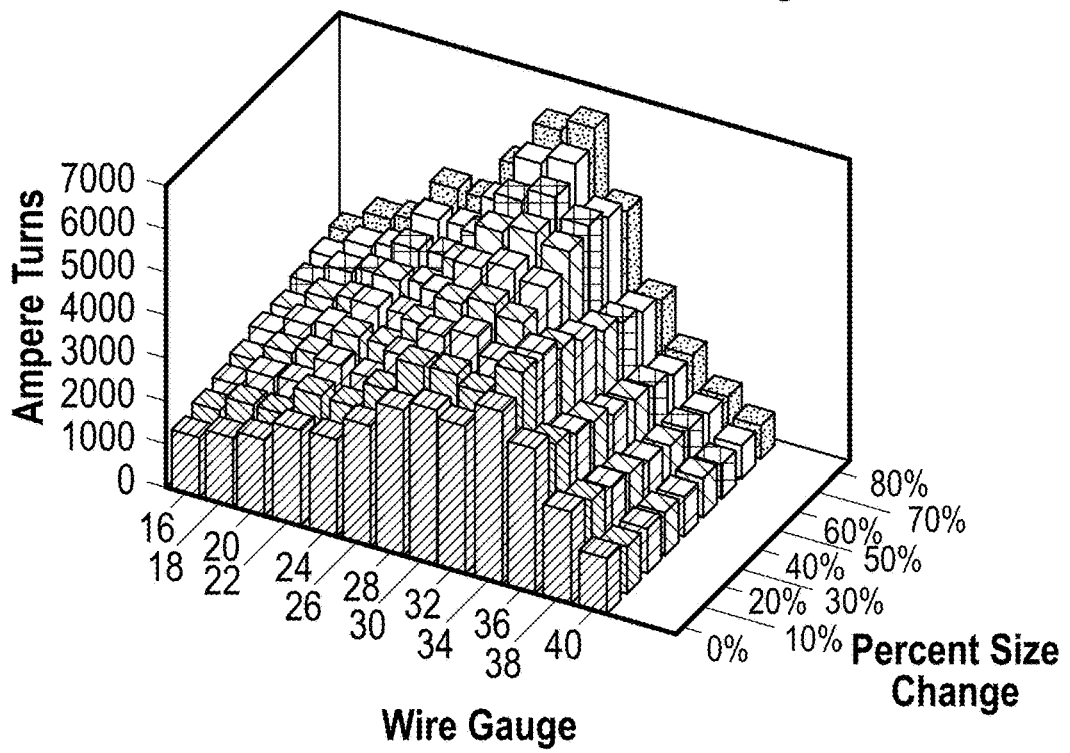
Figure 20I:
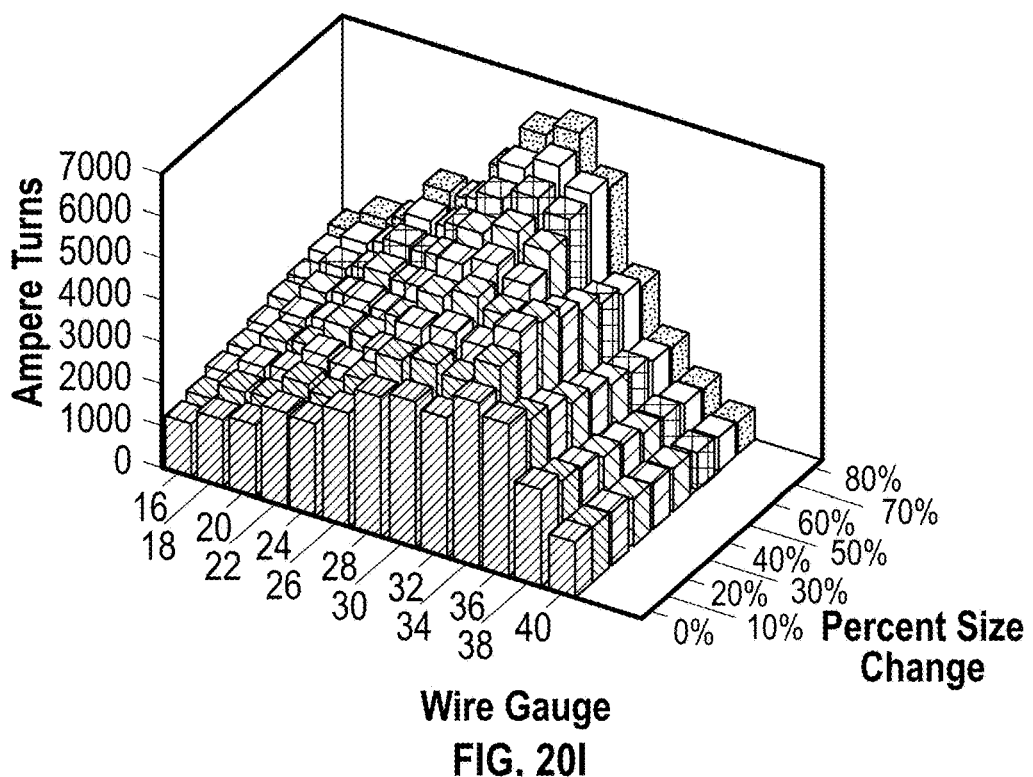
Figure 20J:
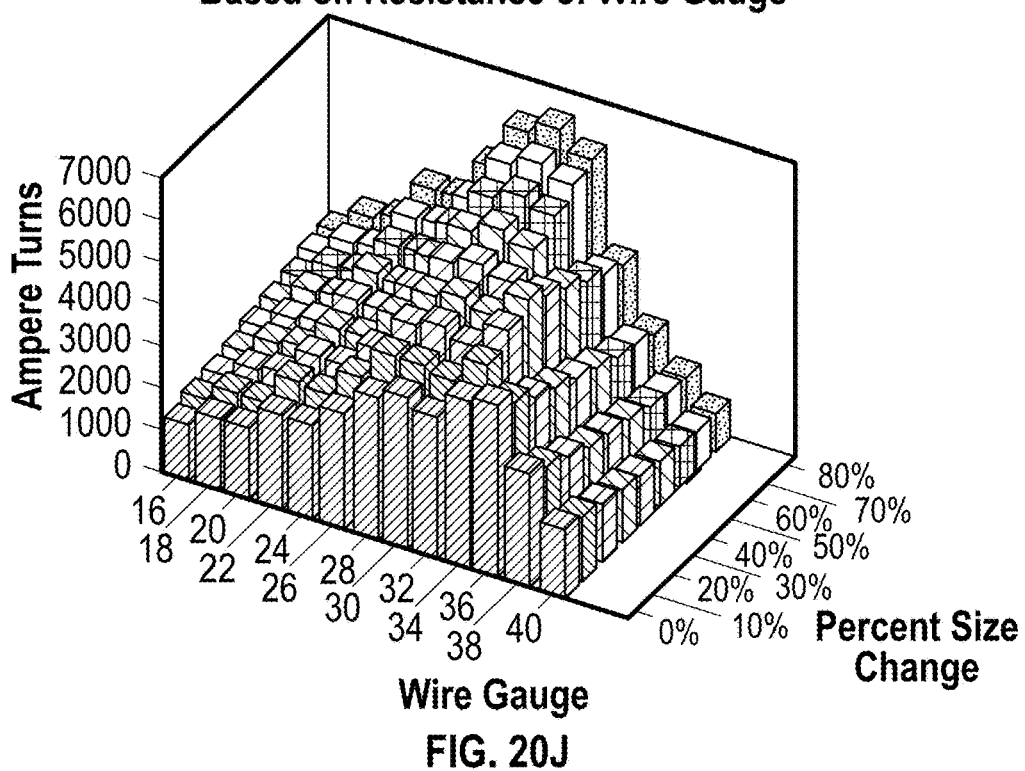
Figure 20K:
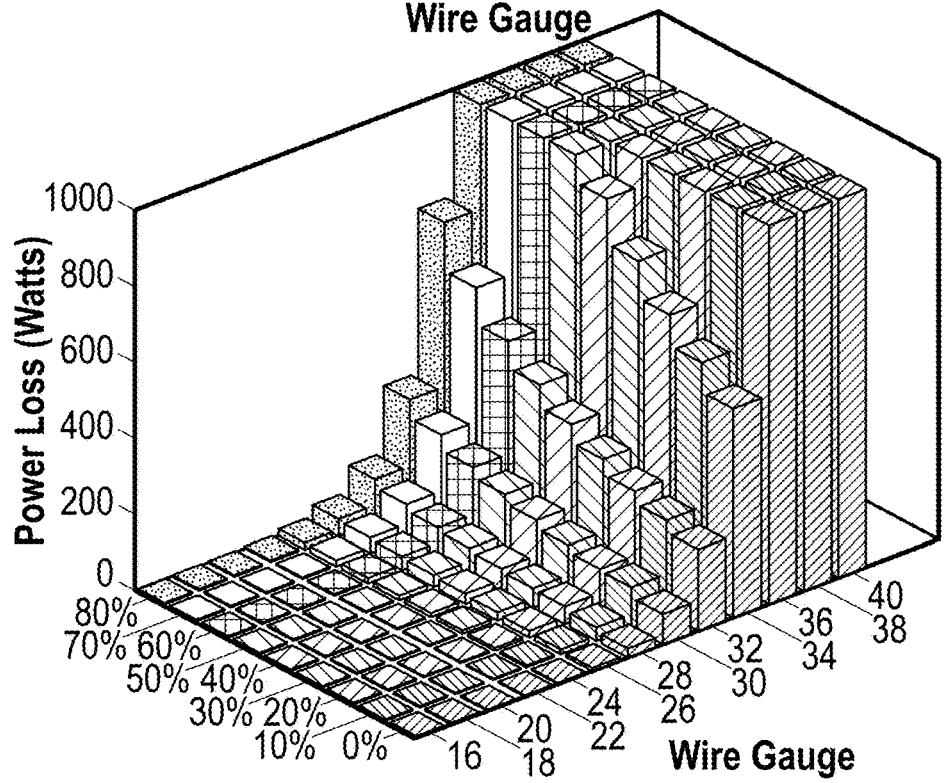
Figure 21A:
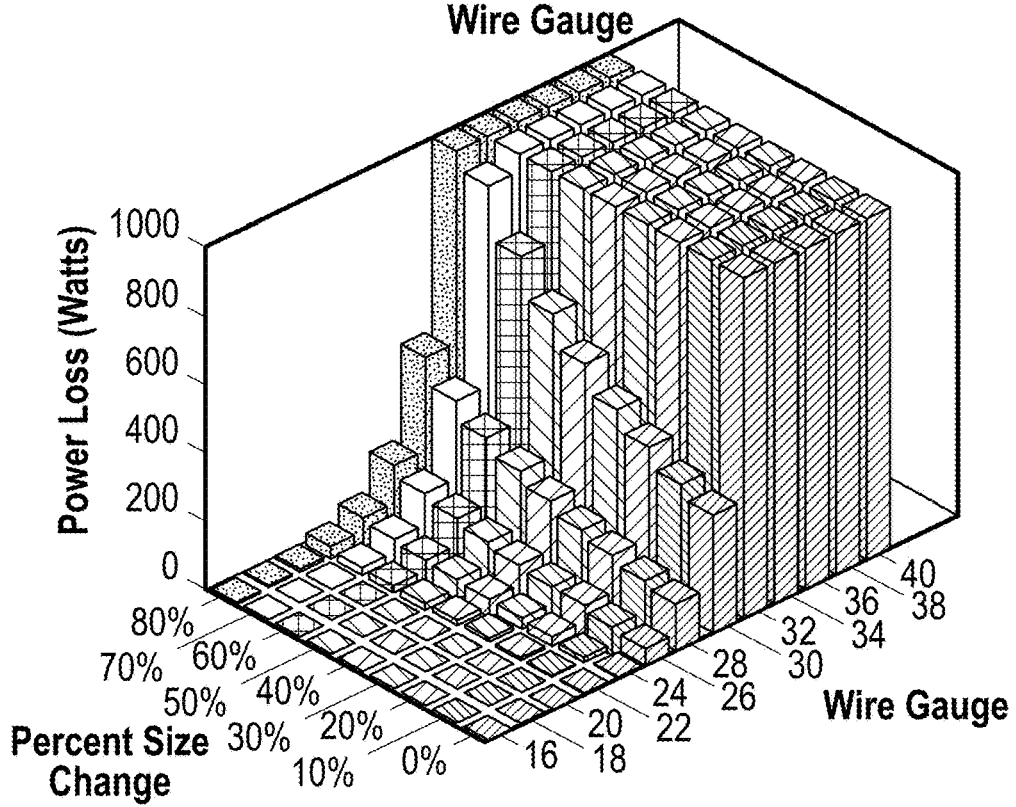
FIGS. 21A-21I depict power losses with different wire gauge size and different excitation voltages in accordance with one or more embodiments of the disclosure.
Figure 21B:
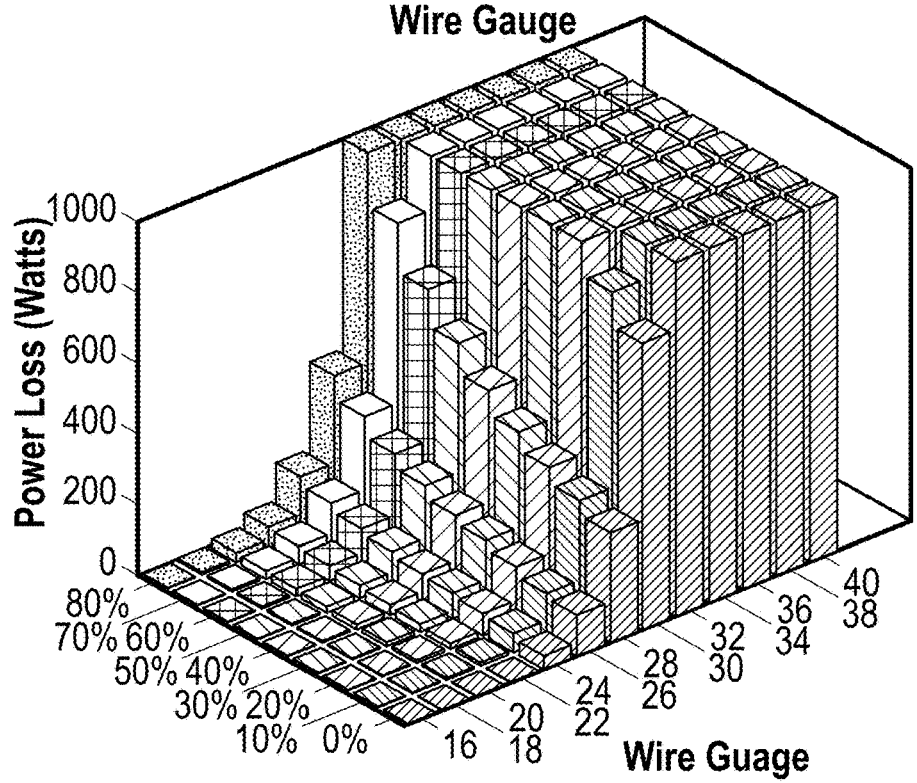
Figure 21C:
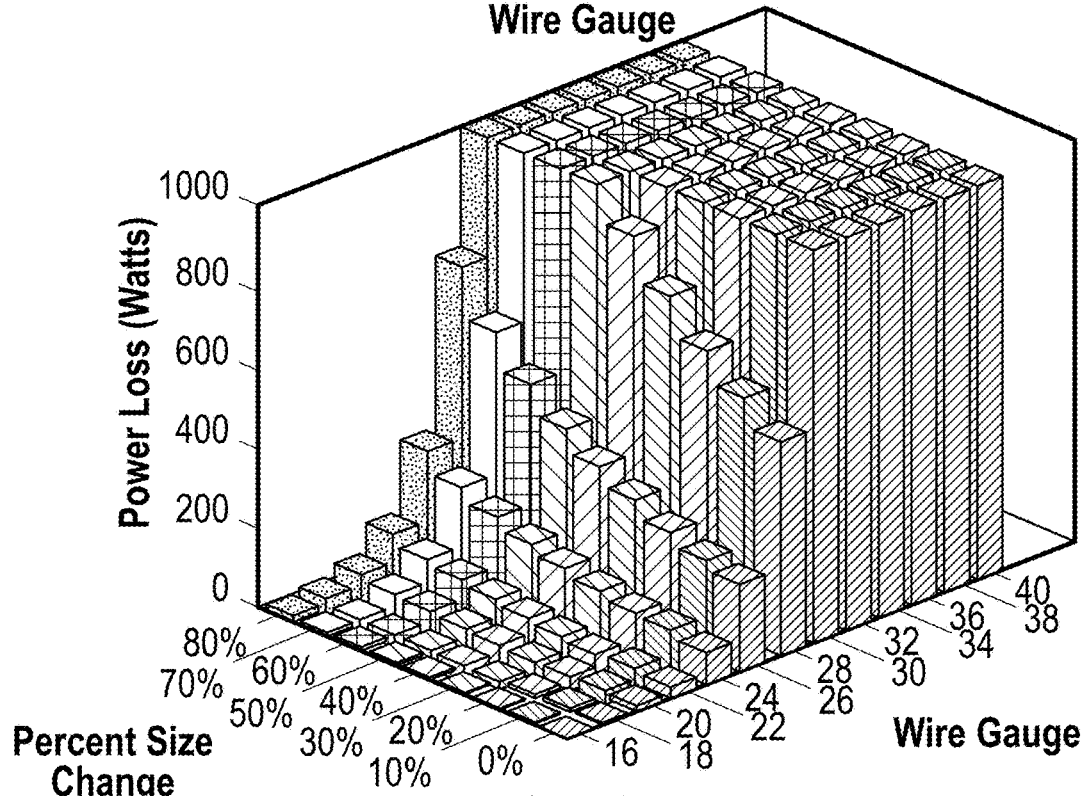
Figure 21D:
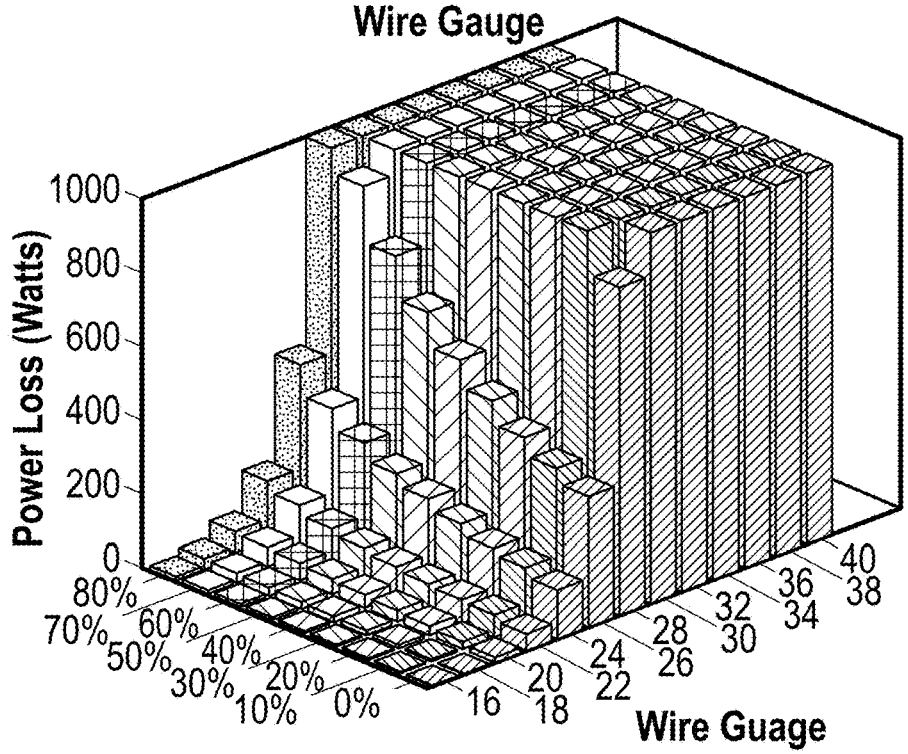
Figure 21E:
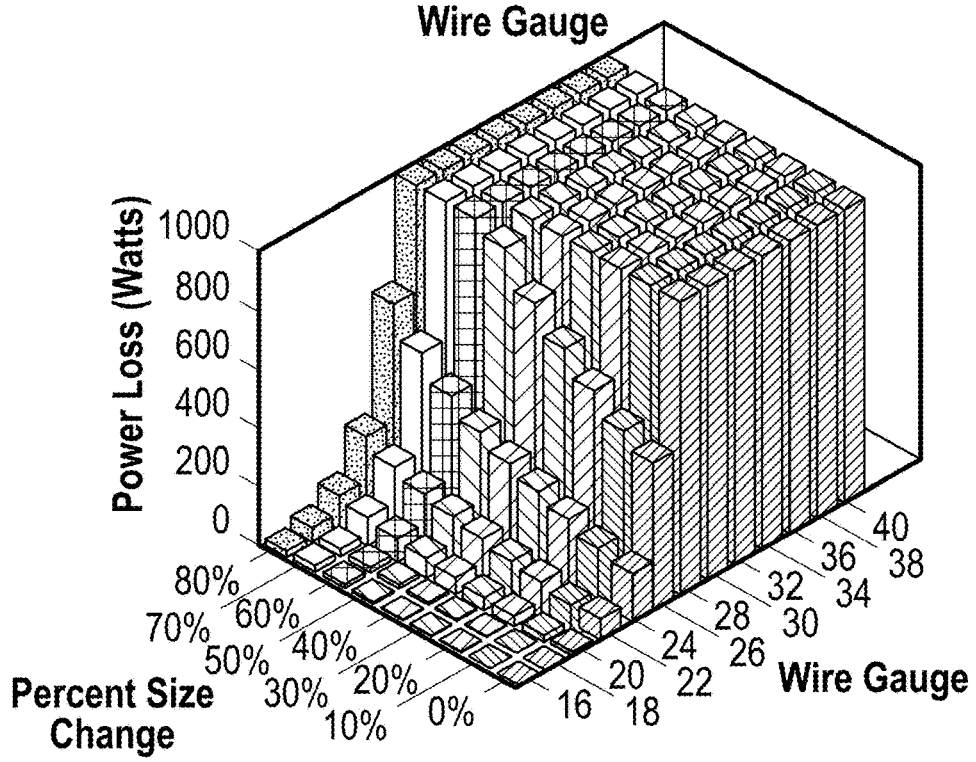
Figure 21F:
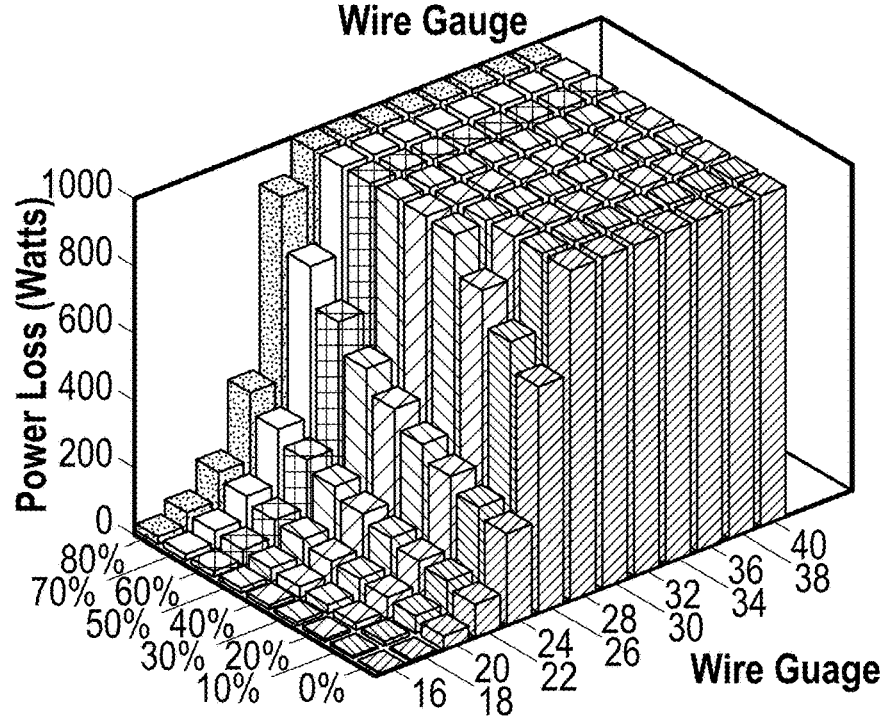
Figure 21G:
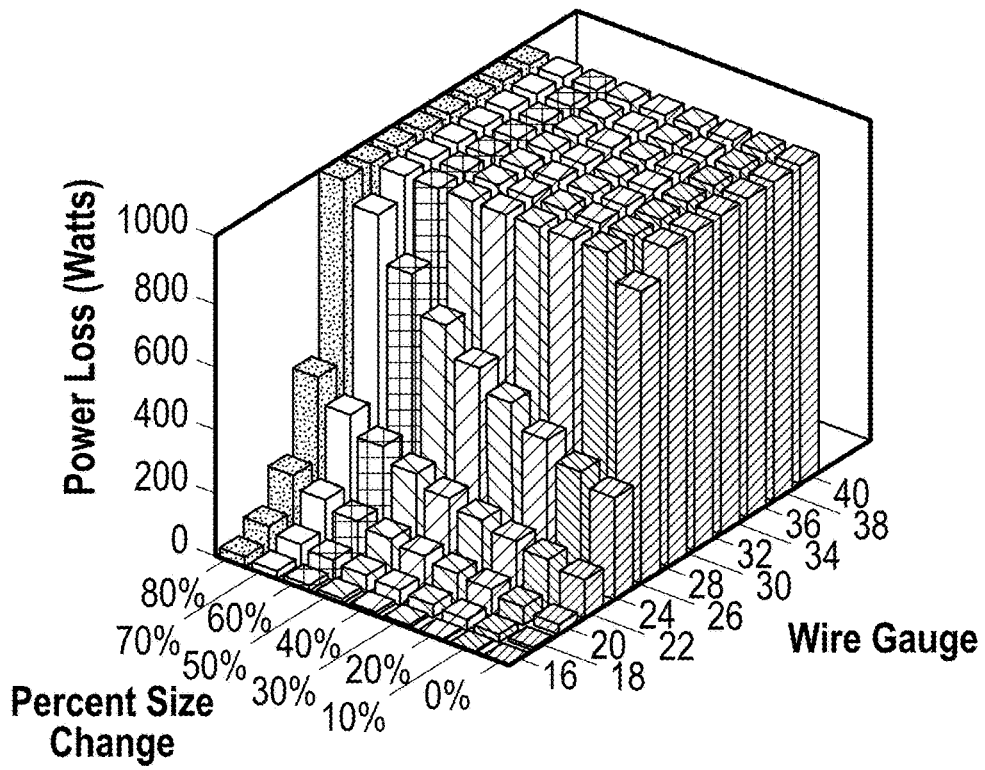
Figure 21H:
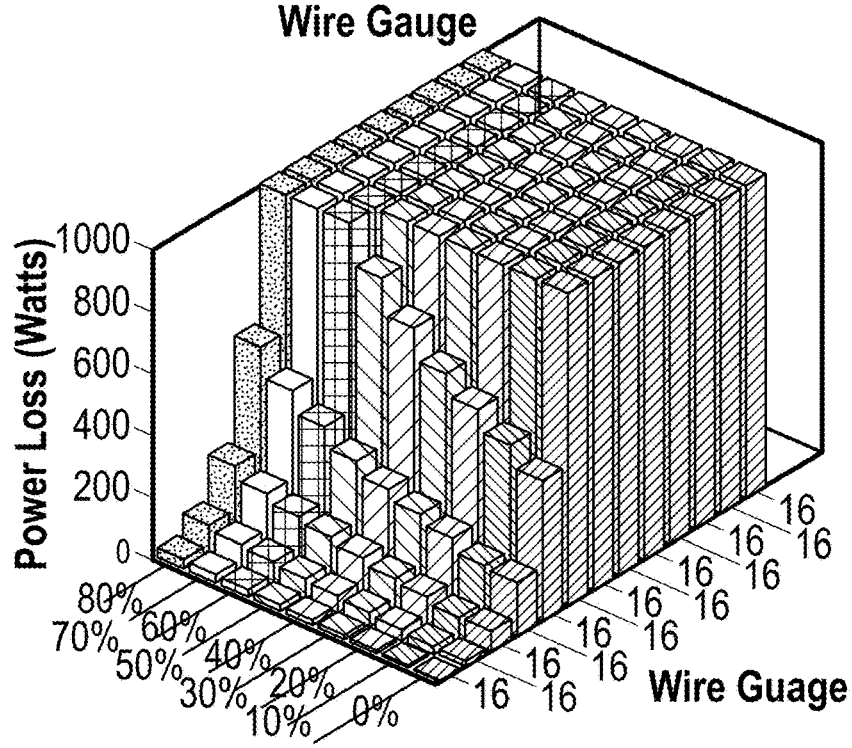
Figure 21I:
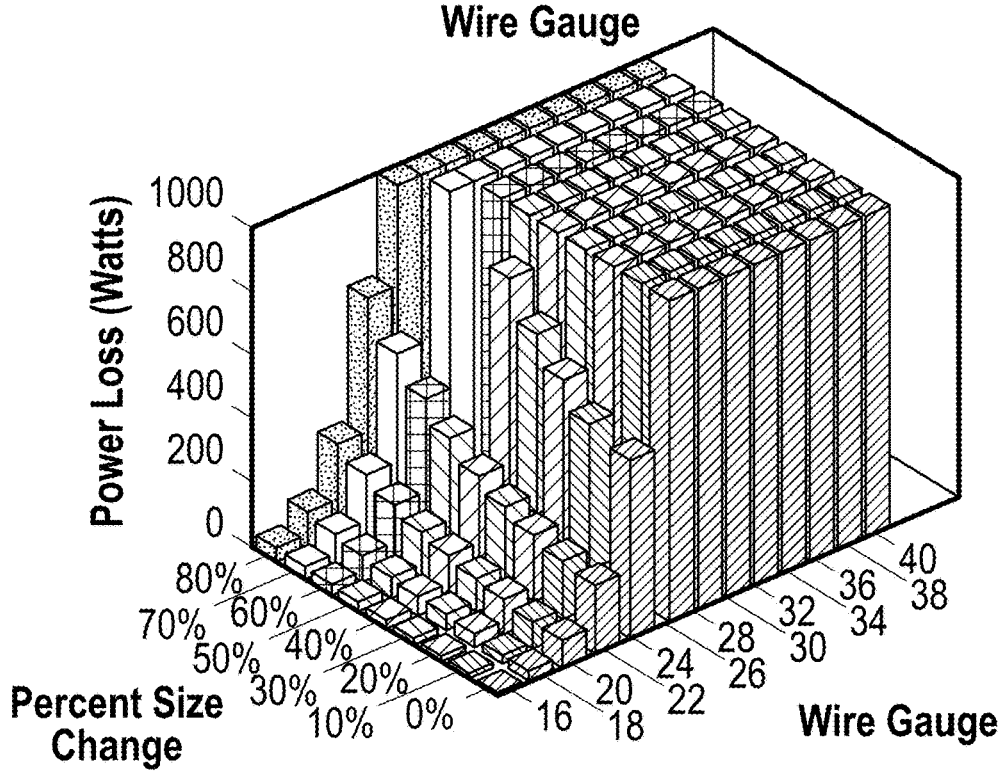

FIG. 19 depicts the flowchart 2400 used for testing of the system components to validate functionality of the system in the expected operation points. The testing begins with the Control Hardware-in-the-Loop (CHIL) method 2402, which determines whether the CHIL shows proper functionality of the controller at 2404. If not, proper adjustments are made at 2406. The testing then proceeds to the power electronic test method 2408, which determines if the H-Bridge and all current and/or voltage sensors work at 2410. If not, proper adjustments are made at 2412. Finally, the full system test method 2414 is utilized, which determines if the system as a whole functions properly at 2416. If not, proper adjustments are made at 2418.

In the CHIL method, the compiled object code ran in the object code on a real target hardware or an instruction set simulator to testing the sufficiency of the control. This was conducted on TMS320F2837xS Delfino™ Microcontrollers with the specifications of 200 MHz 32-Bit CPU with Single Precision FP, 4ADC and 24 PWM channels with the temperature Options of Q100 (Qualification for Automotive Applications). However, any other suitable microcontroller or similar device may be used.

Figure 35:
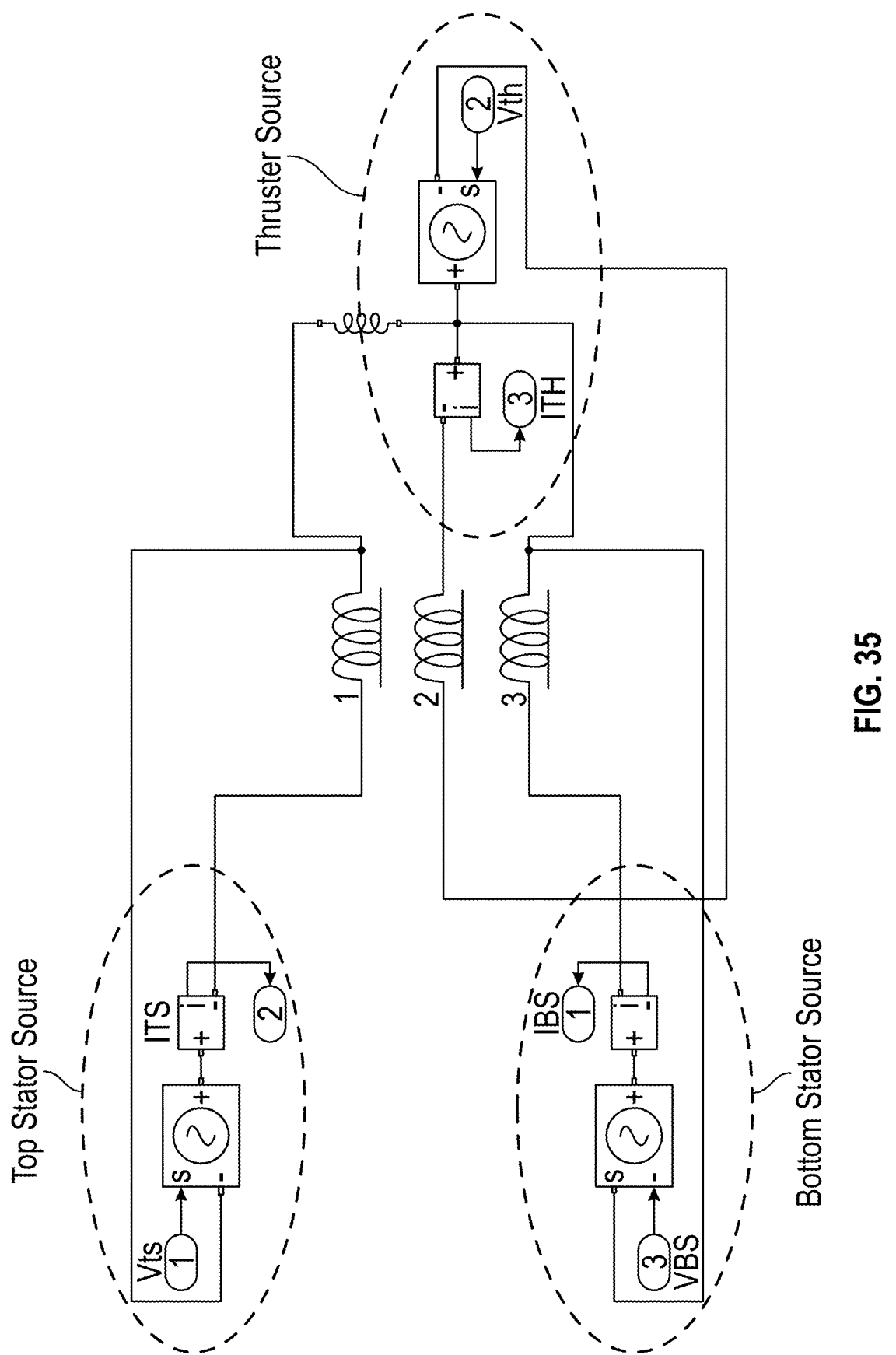
FIG. 35 depicts modeling of the windings with mutual in accordance with one or more embodiments of the disclosure.
Figure 36A:
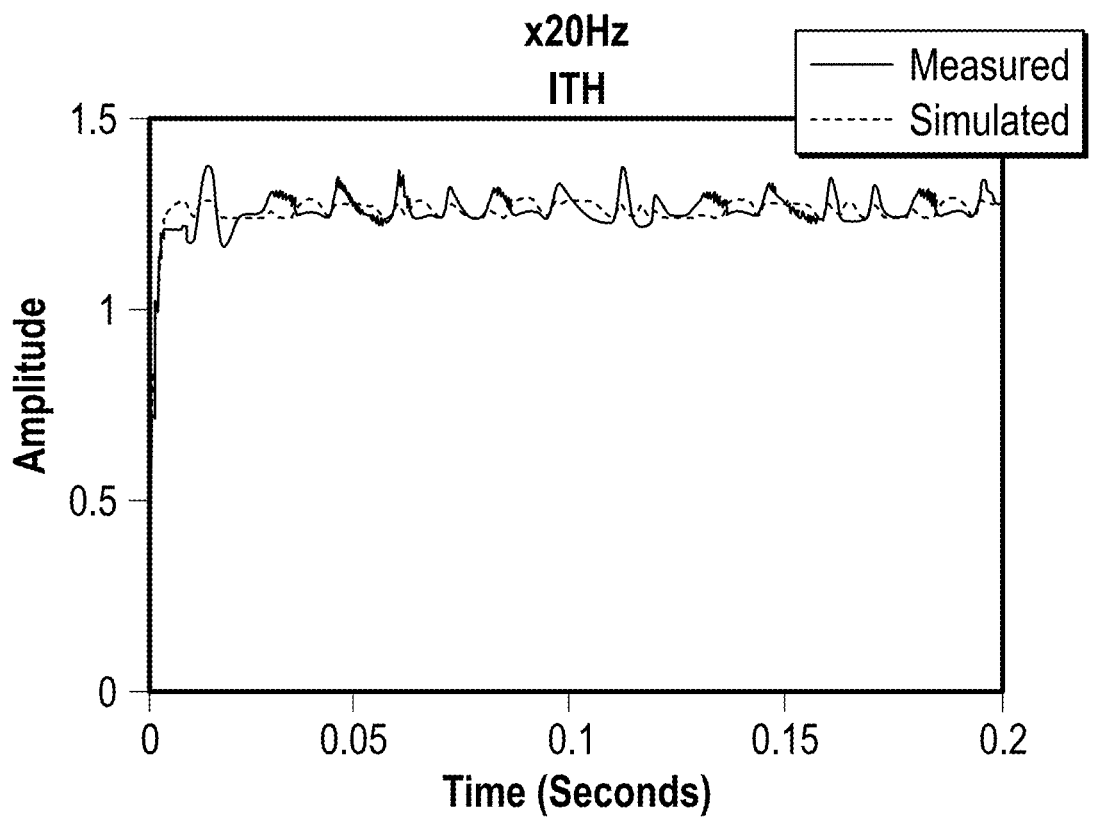
FIGS. 36A-36F depict parameter identification of the windings at 20 Hz and 50 Hz in accordance with one or more embodiments of the disclosure.
Figure 36A:
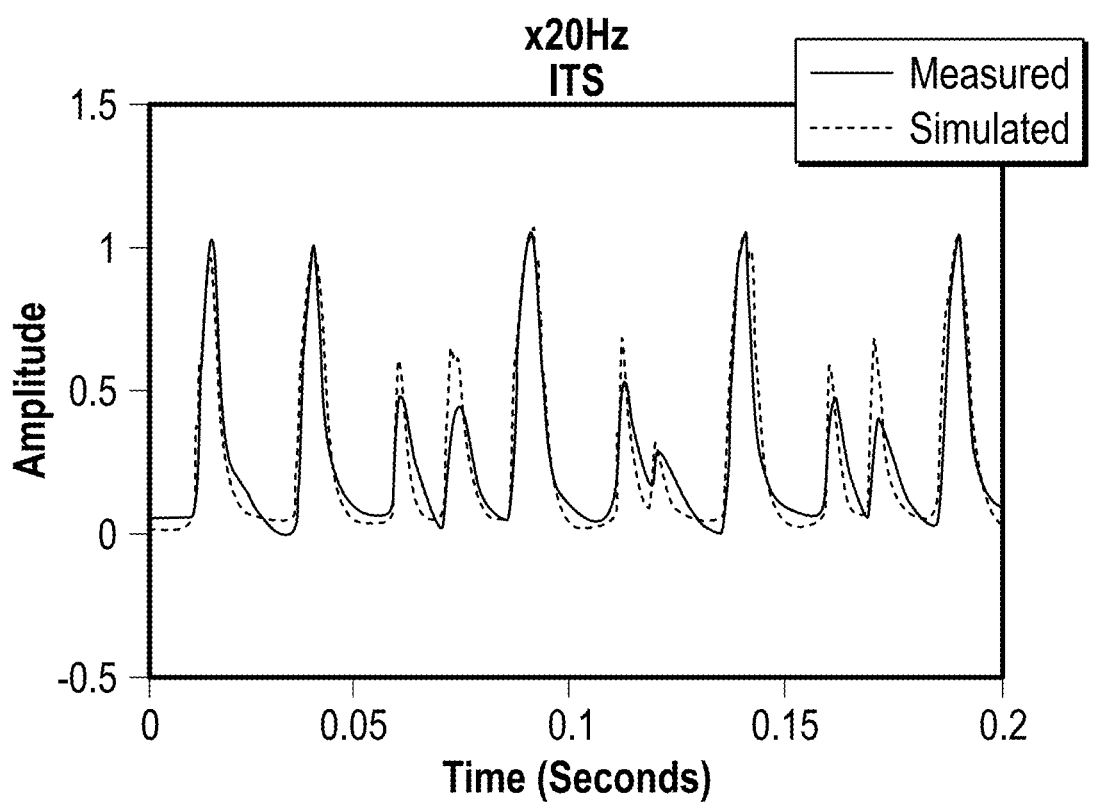
Figure 36B:
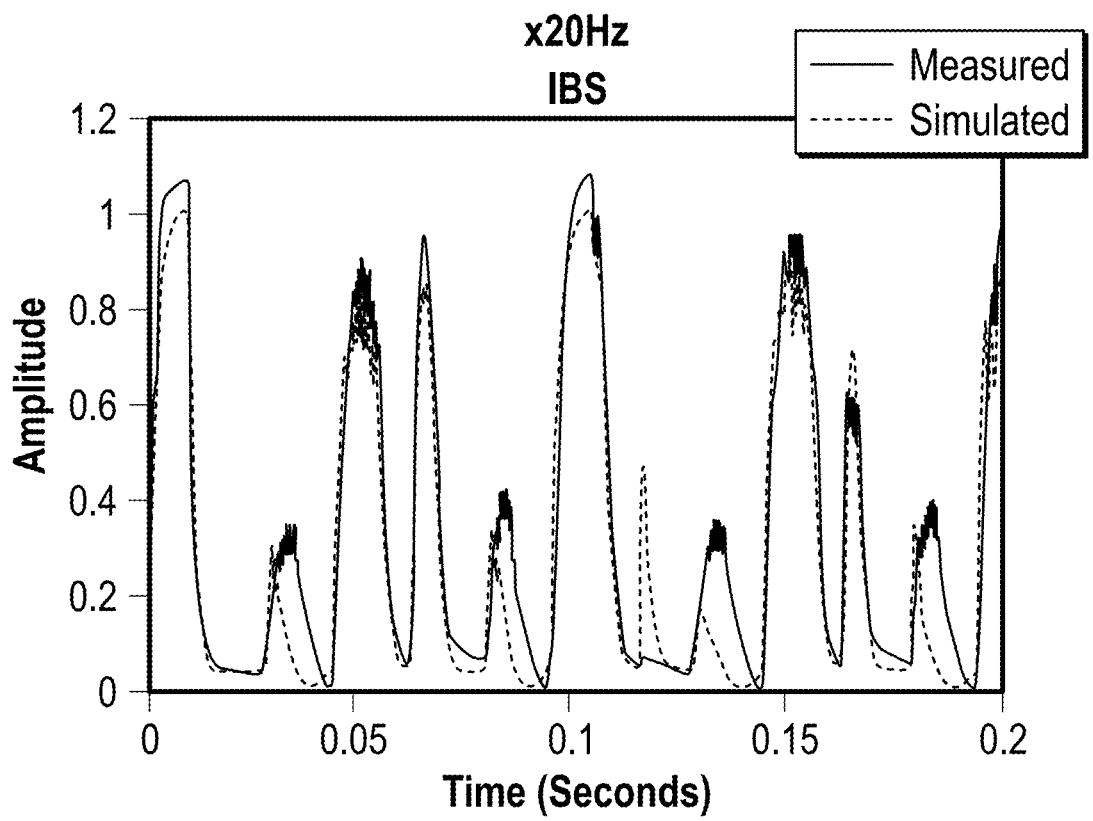
Figure 36B:
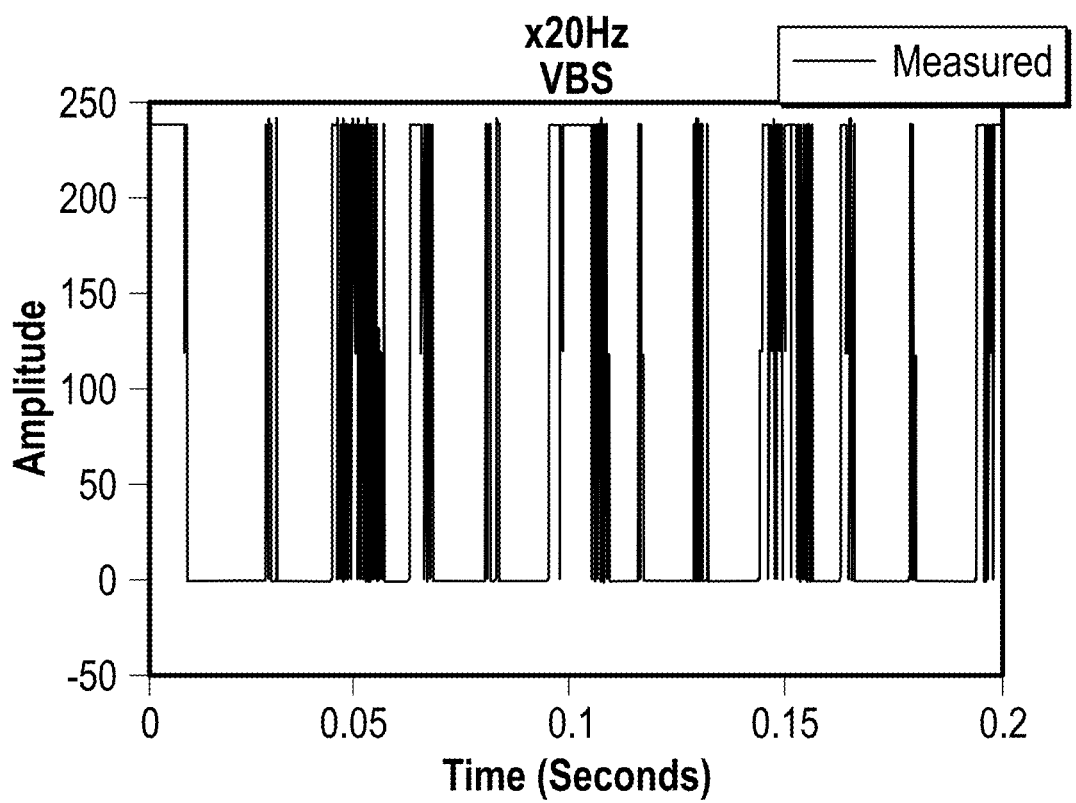
Figure 36C:
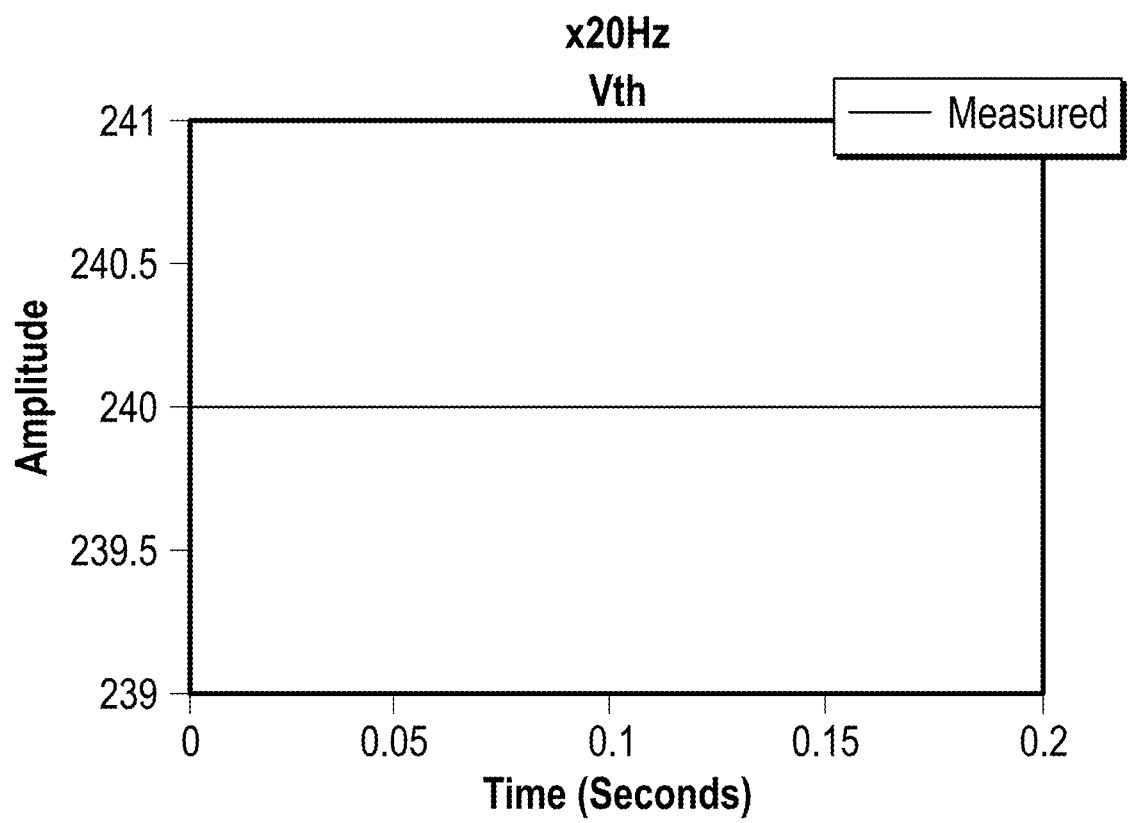
Figure 36C:
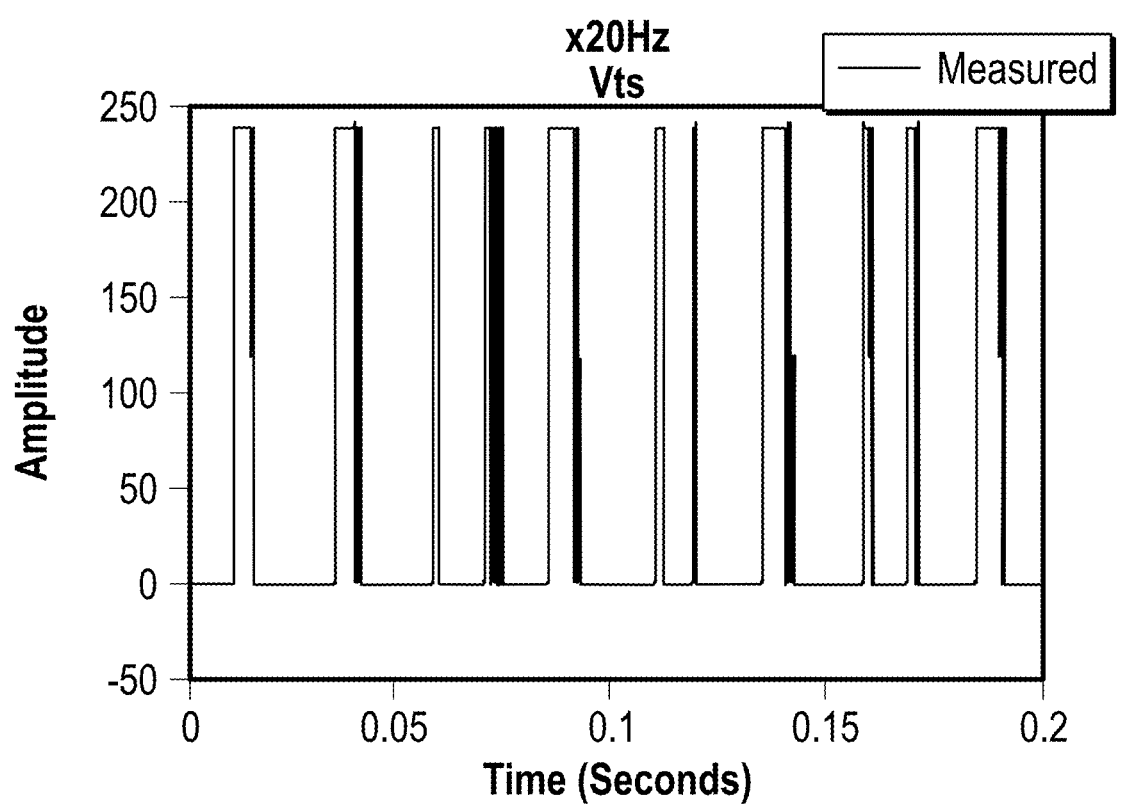
Figure 36D:
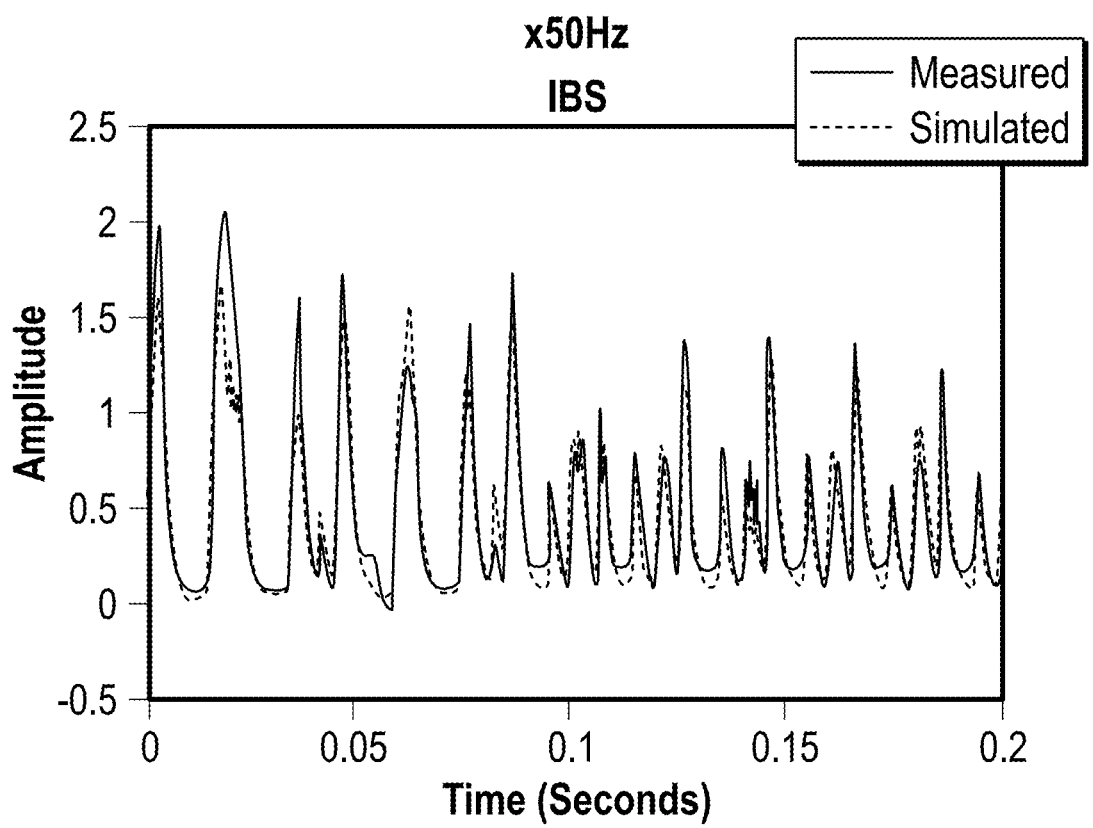
Figure 36D:
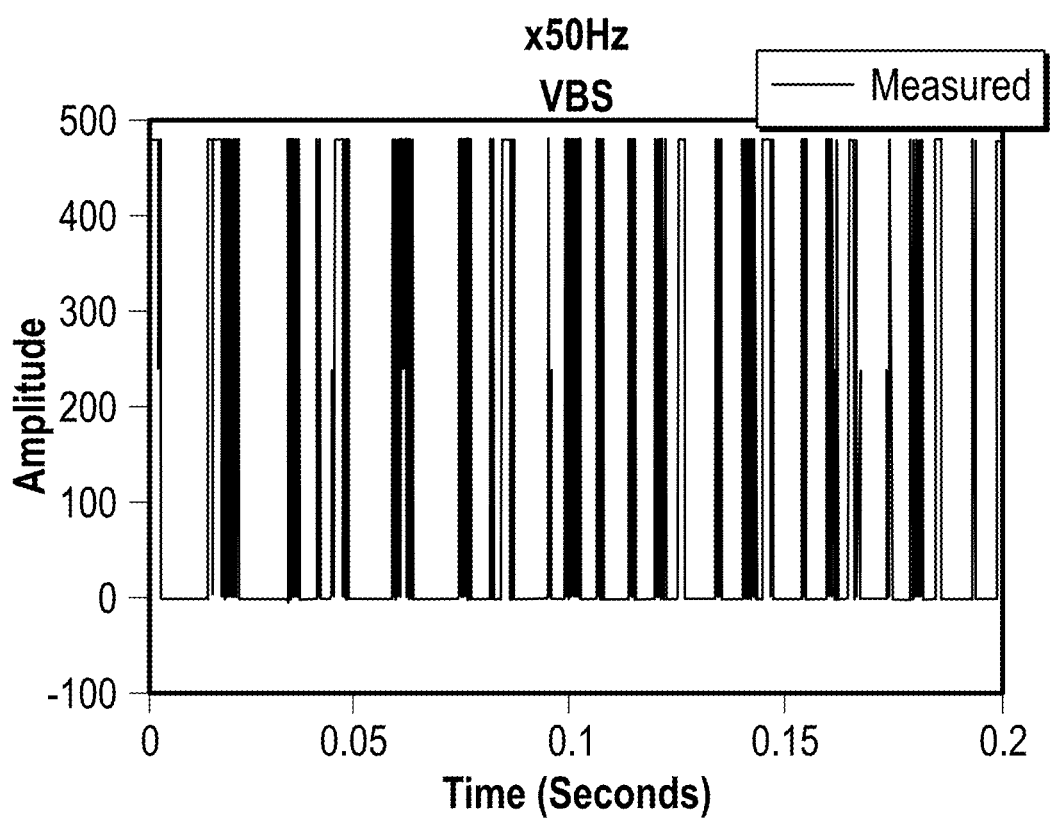
Figure 36E:
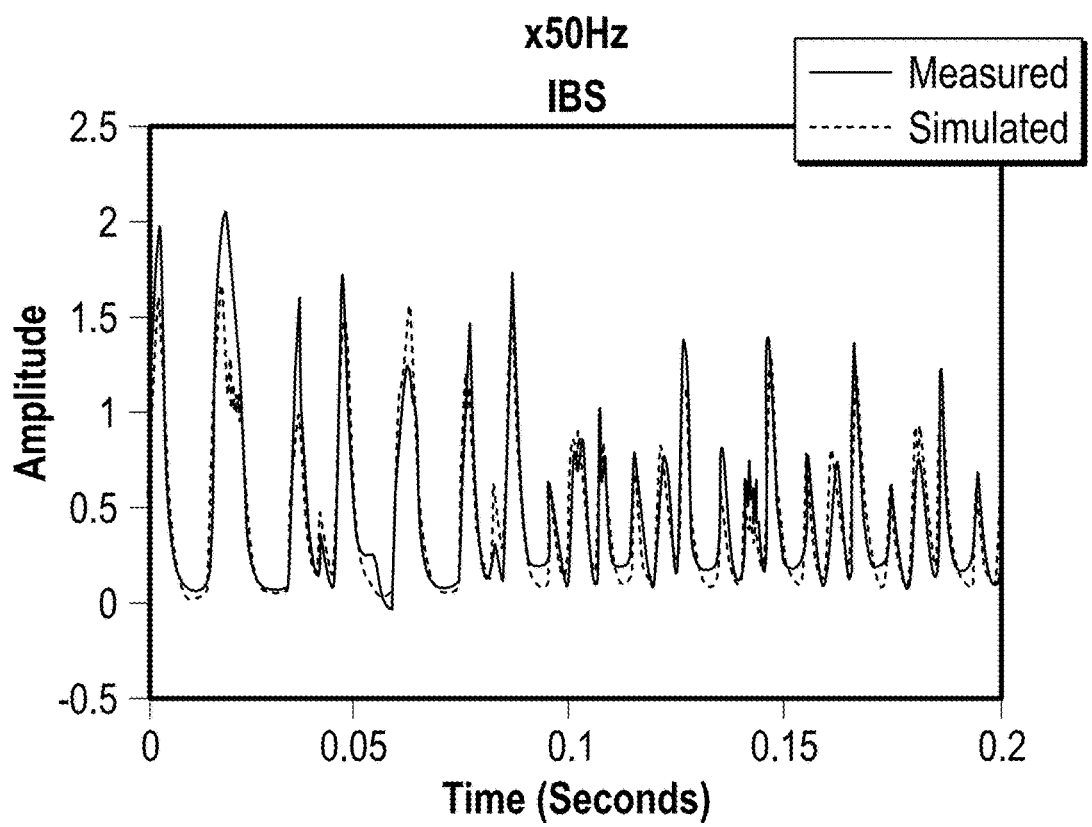
Figure 36E:
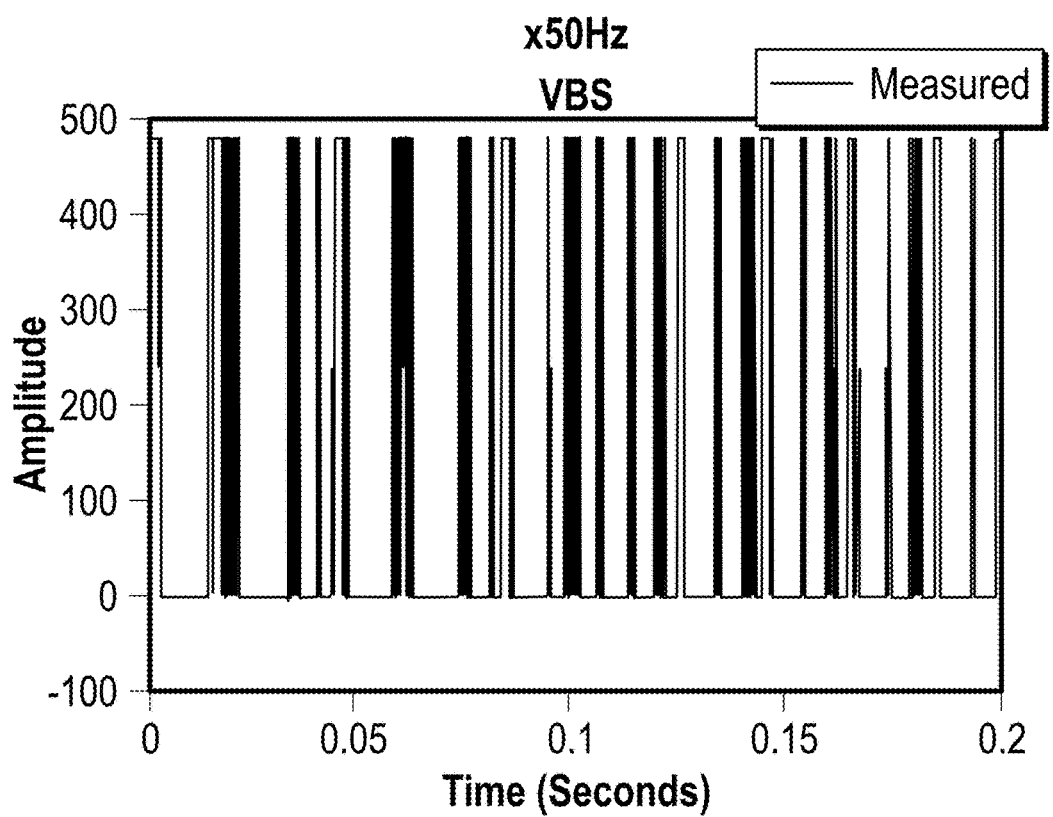
Figure 36F:
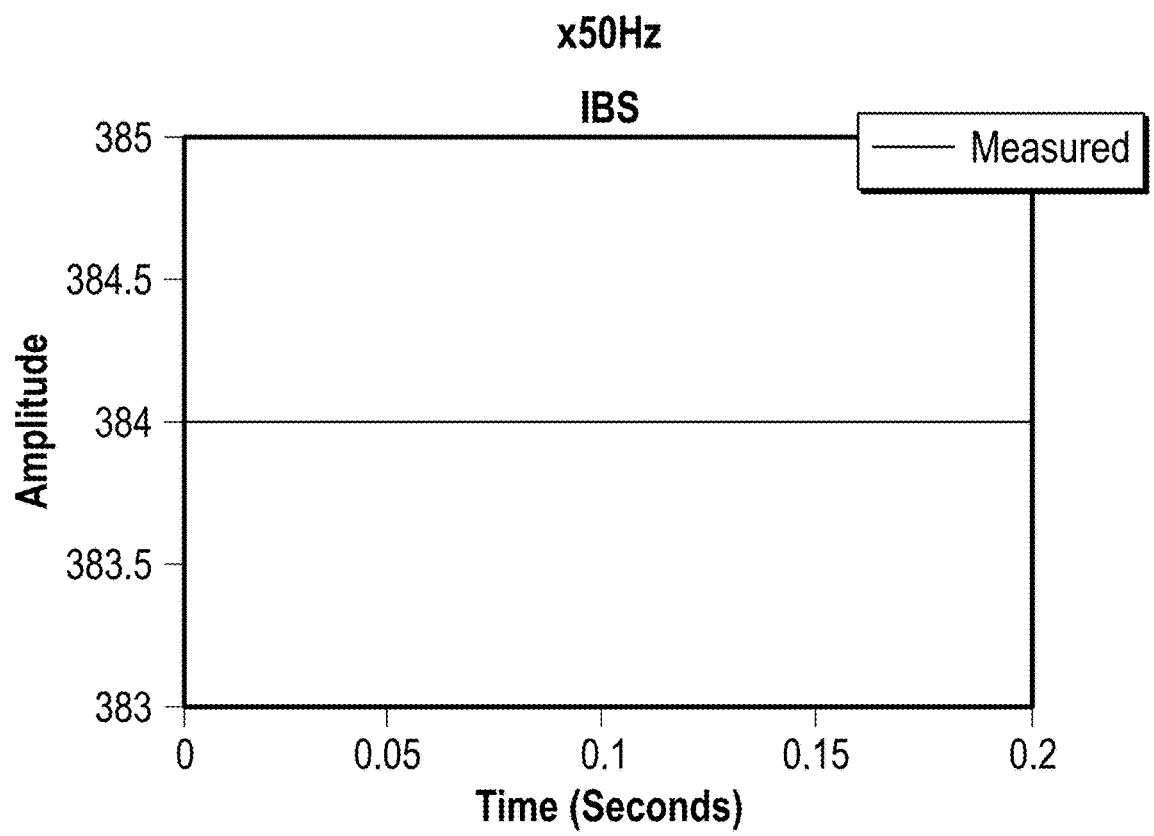
Figure 36F:
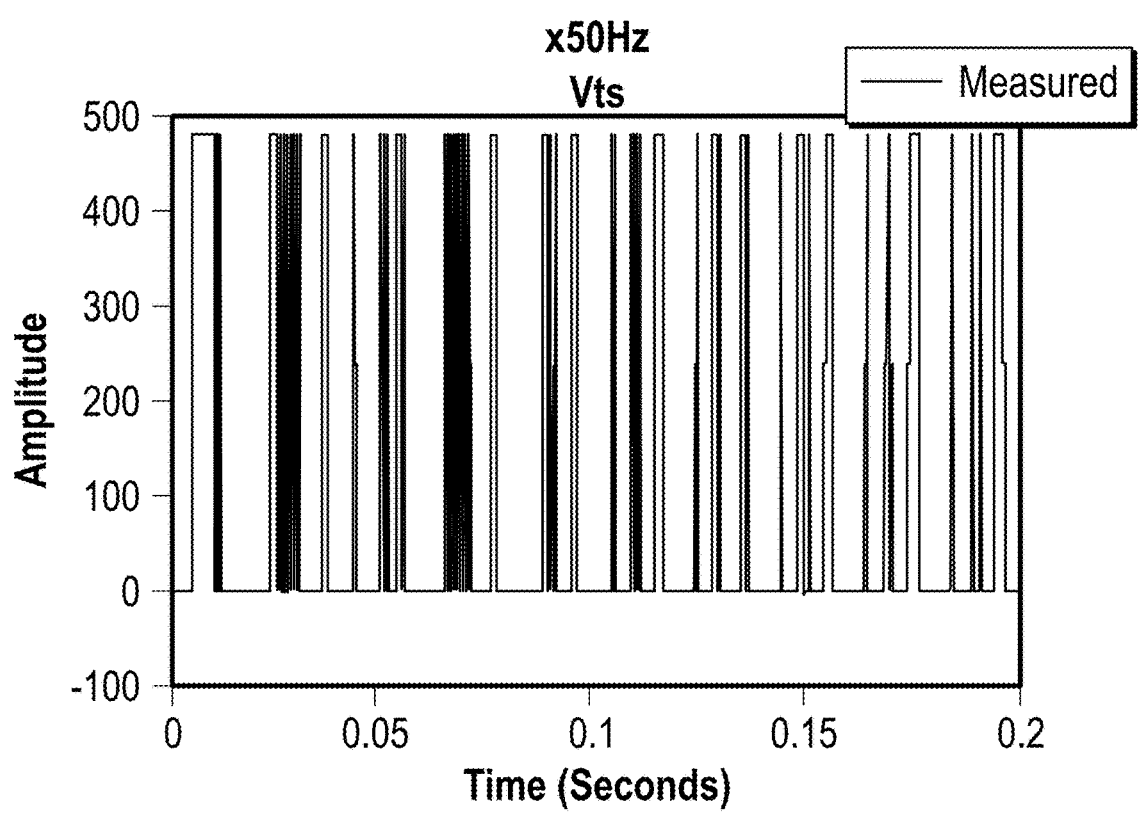

FIG. 35 depicts the proposed modeling of the three windings of an embodiment of the actuator. The mathematical model of the actuator was incorporated into the system. To this end, the controller accompanied by the power electronic drive was built as real hardware and tested against the mathematical model of the actuator that is coded in the local PC. For acquiring the mathematical model of the actuator, first, the electrical model of the three windings of the actuator with mutual effects is considered. Second, an accurate estimation of the reluctance and inductances of all connected and mutually induced paths is addressed. The very approximate descriptive model of the three winding actuator with the mutual effect could be found in the Matlab/Simulink under the name of "3 Solenoids model with Mutual inductance."

FIGS. 36A-36F depict the amplitudes over time of various parameters of the model when tested at 20 Hz and 50 Hz. The inputs to the model are the excitation voltages of the windings, and the outputs are windings currents. The "parameter estimation toolbox" of the Matlab is used to estimate parameters and initial states of a Simulink model using measured data. The tool increases model accuracy so that the model reflects the measured hardware behavior. For example, one can automatically estimate electric motor resistance, inductance, and inertia from measured voltage and motor speed data. Also, there is a possibility to generate MATLAB code from the tool, and accelerate parameter estimation using parallel computing and Simulink fast restart. The raw estimation error, e(t), is defined in Equation (9) as:

$$e(t) = y_{ref}(t) - y_{sim}(t) \qquad (9)$$

The Sum squared error cost function used to process e(t) is shown below in Equation (10):

$$F(x) = \Sigma_{t=0}^{N} e(t) * e(t) \qquad (10)$$

Figure 26:
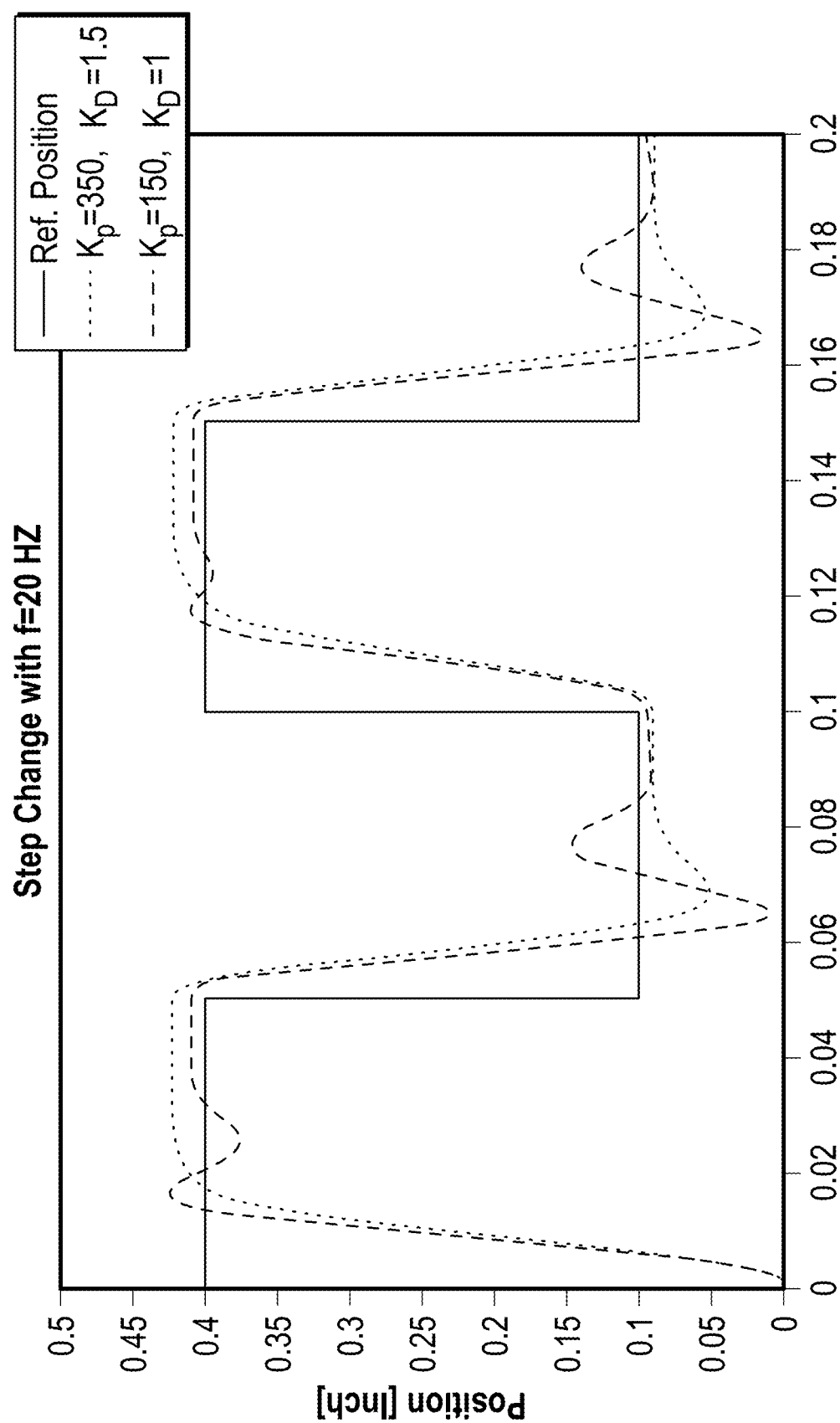
FIG. 26 depicts a step change response of the position controller in 20 Hz operation mode in accordance with one or more embodiments of the disclosure.

FIG. 26 shows the performance of the position controller 2302 in tracking the step changes in the 20 Hz simulation. The purpose of the position controller 2302 is to control the actuator via the power electronic drive 130 to position the actuator in the open/close position with respect to soft seating. For tuning and validating performance of the position controller 2302 along with the HCC block, different operation conditions and scenarios were considered. The first scenario for testing the accuracy of the position controller was the constant set point tracking test with the means of step change. In this test, the transient behavior of the controller accompanied by whole system dynamics was considered. Also, this test can be used for tuning parameters of the proposed controller 2302. The position tracking test helps to identifying the accuracy of the valve positioning with respect to the operation frequency of the system. As can be seen, the controller 2302 responds to the step in a timely manner (in average less than 30 milliseconds in 20 Hz operation frequency) and the accuracy of the positioning system is highly related to the dynamic response of the actuator windings (specifically R and L of the windings), time constant of the HCC, and the parameters of the controller 2302 ($k_p$ and $k_d$). There is a trade-off for tuning of the control parameters with regards to the amount of overshoot it will get and the bias error of the position controller 2302. The controller parameters were found by trial and error to be $k_p$=150 and $k_d$=1.

Figure 27A:
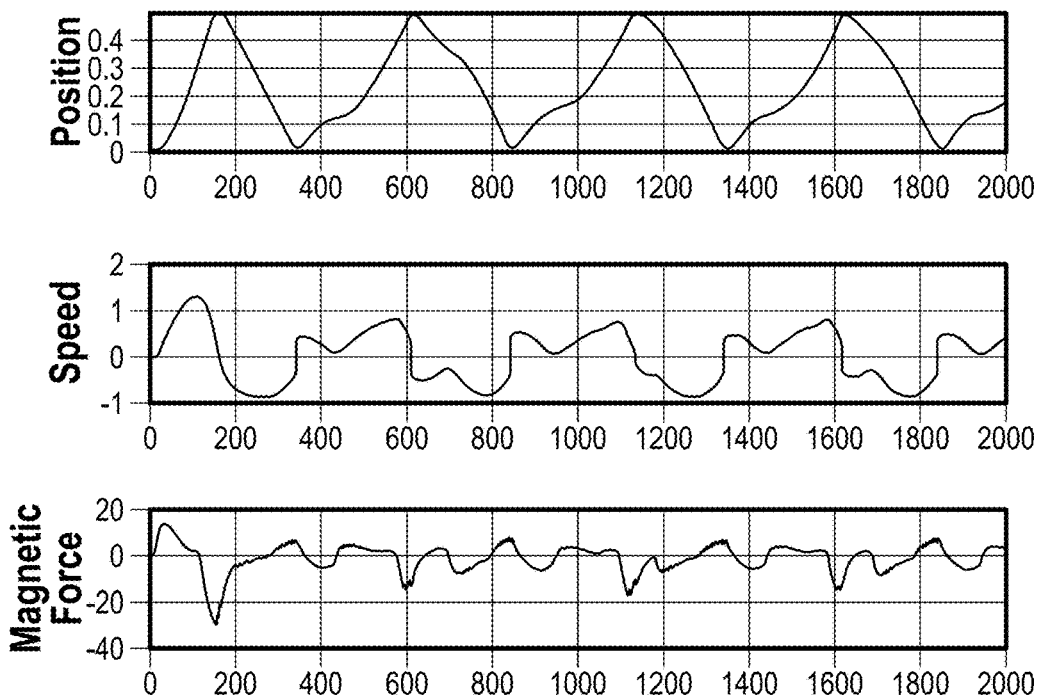
FIGS. 27A-27C depict a sinewave reference position with 20 Hz operation mode in accordance with one or more embodiments of the disclosure.
Figure 27B:
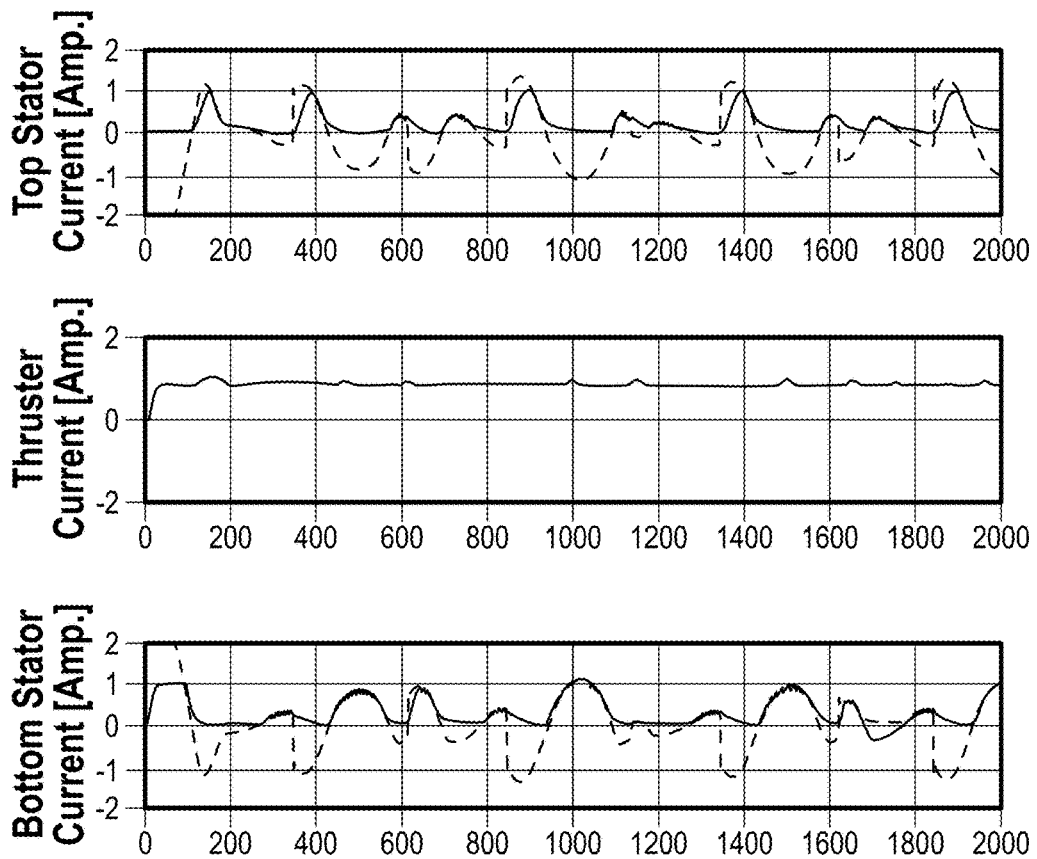
Figure 27C:
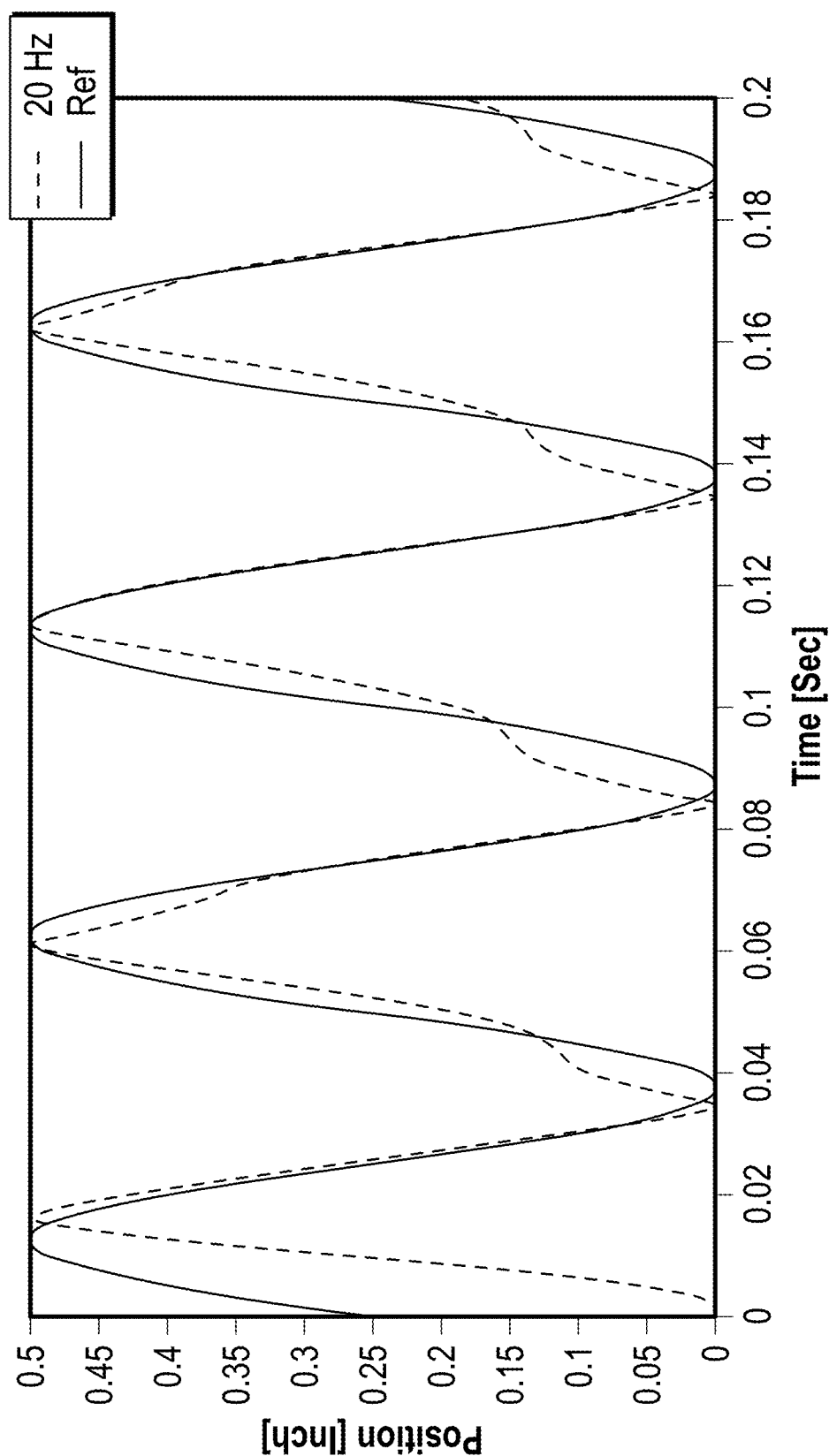
Figure 28A:
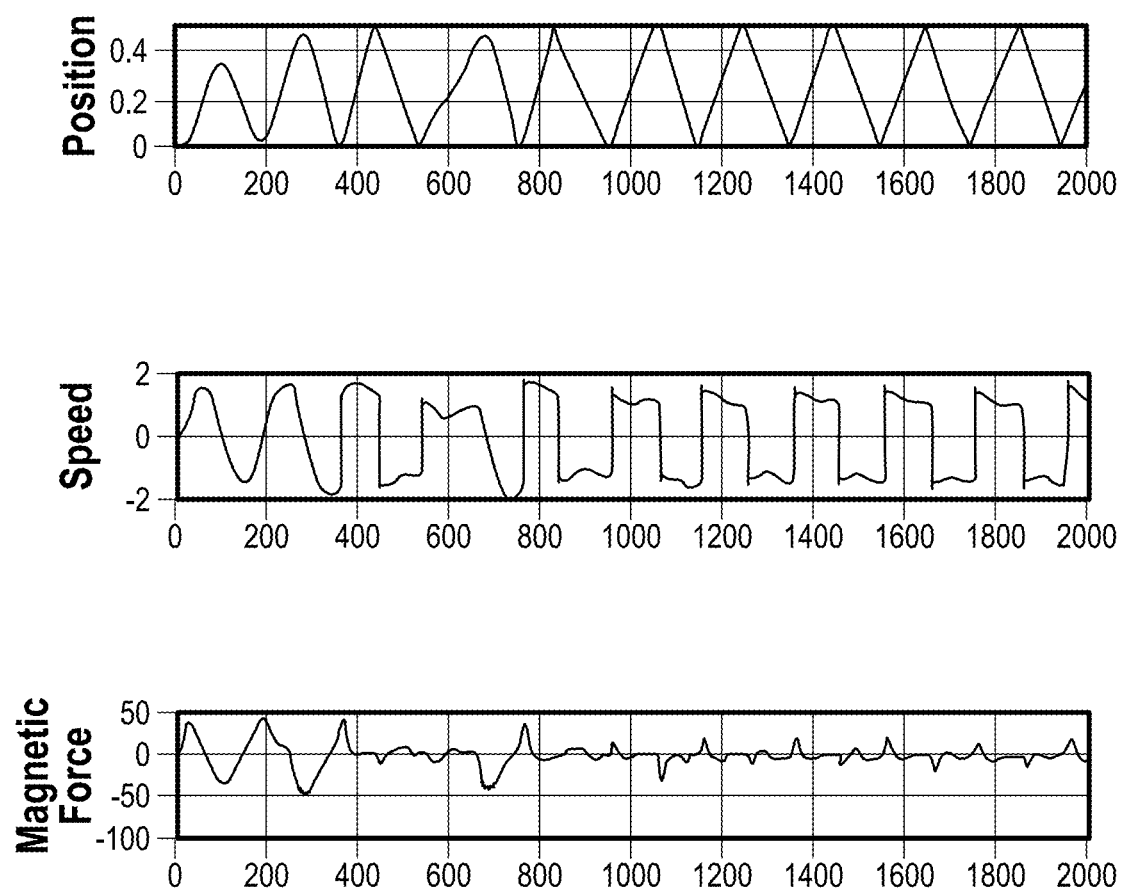
FIG. 28A-28C depict a sinewave reference position with 50 Hz operation mode in accordance with one or more embodiments of the disclosure.
Figure 28B:
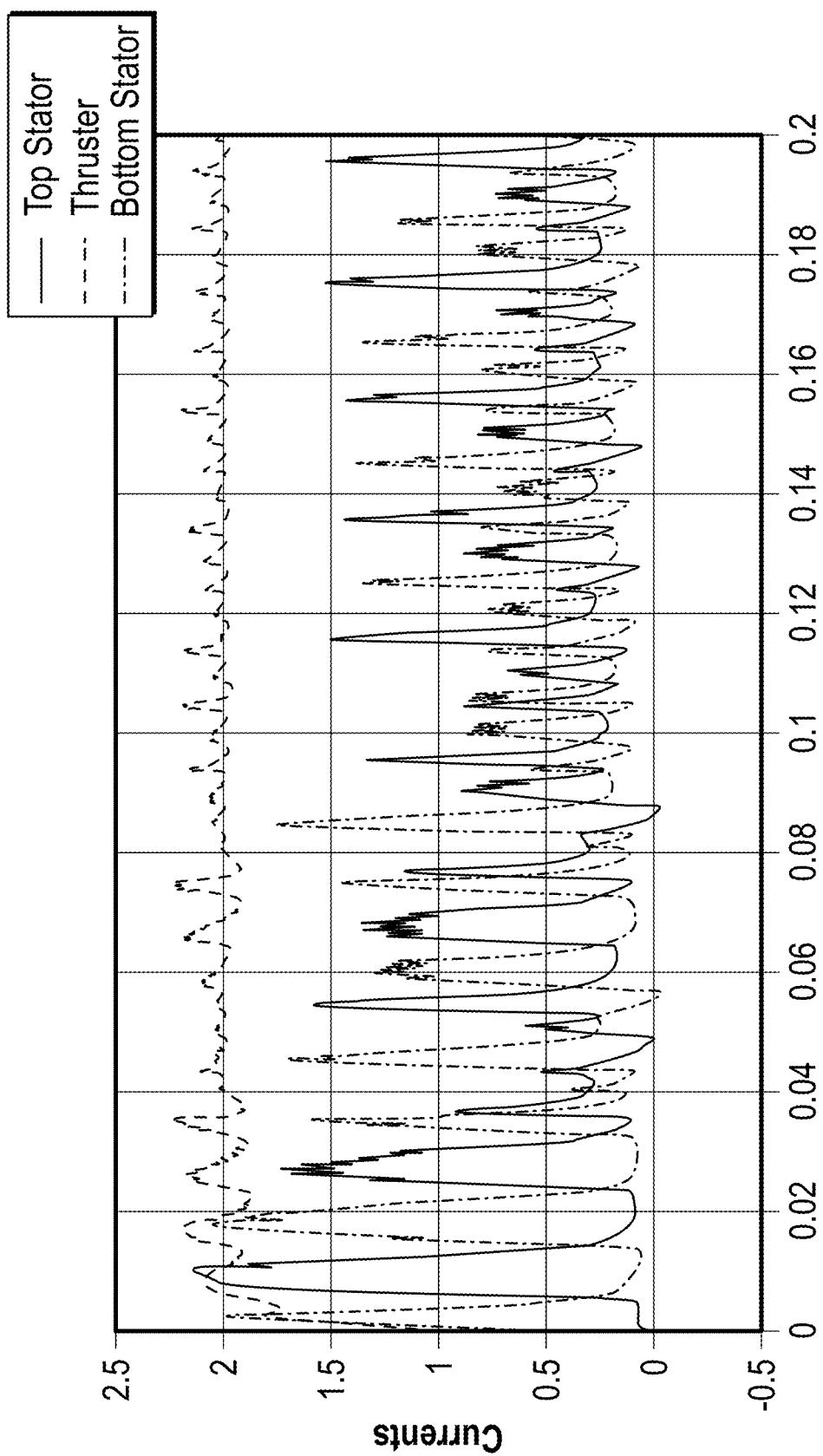
Figure 28C:
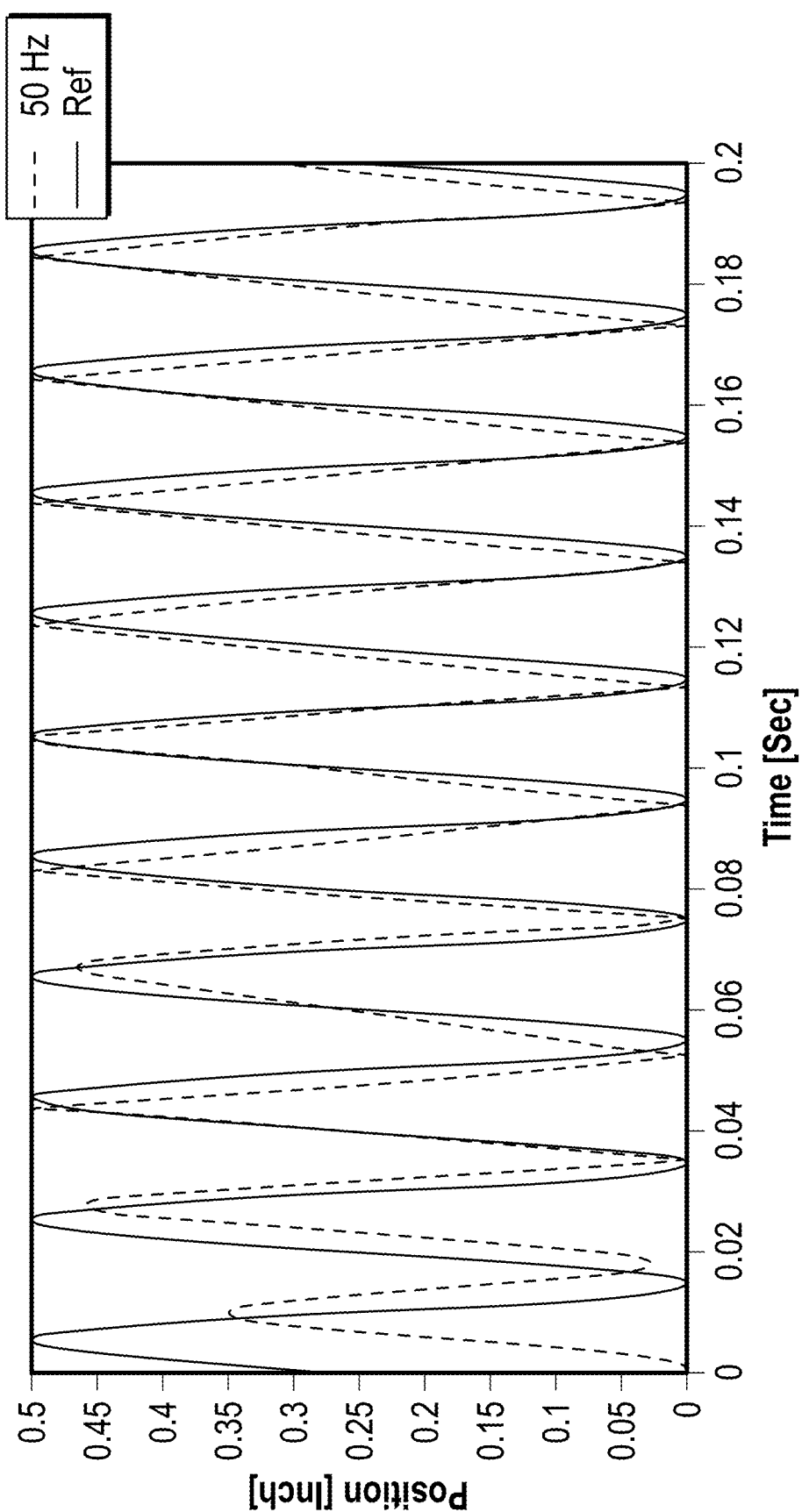

FIGS. 27A-27C and 28A-28C show the performance of the position controller 2302 against the rest of the system at 20 Hz and 50 Hz respectively. FIGS. 27A and 28A show the position, speed, and magnetic force of the thruster disk 110 over time at the given frequency. FIGS. 27B and 28B show the currents being provided to the thruster disk 110, first stator portion 104 and second stator portion 108 over time. The current provided to the thruster disk 110 is continuous, and the current provided to the stator 109 varies over time. Finally, FIGS. 27C and 28C show comparisons between the sinusoidal waveforms for the actual thruster position and the reference position over time.

For testing the controller 2302 against different open-close operations in multiple frequencies, the first run for the controller 2302 with the sinewave reference position was formed at operation frequency of 20 Hz. As can be seen from FIGS. 27A-27C, the controller is able to complete the position track in 20 Hz with respect to the soft seating constraints. Likewise, as can be seen in FIG. 28C, the controller is also able to complete the position tracking successfully in 50 Hz with respect to the soft seating constraints.

Figure 29:
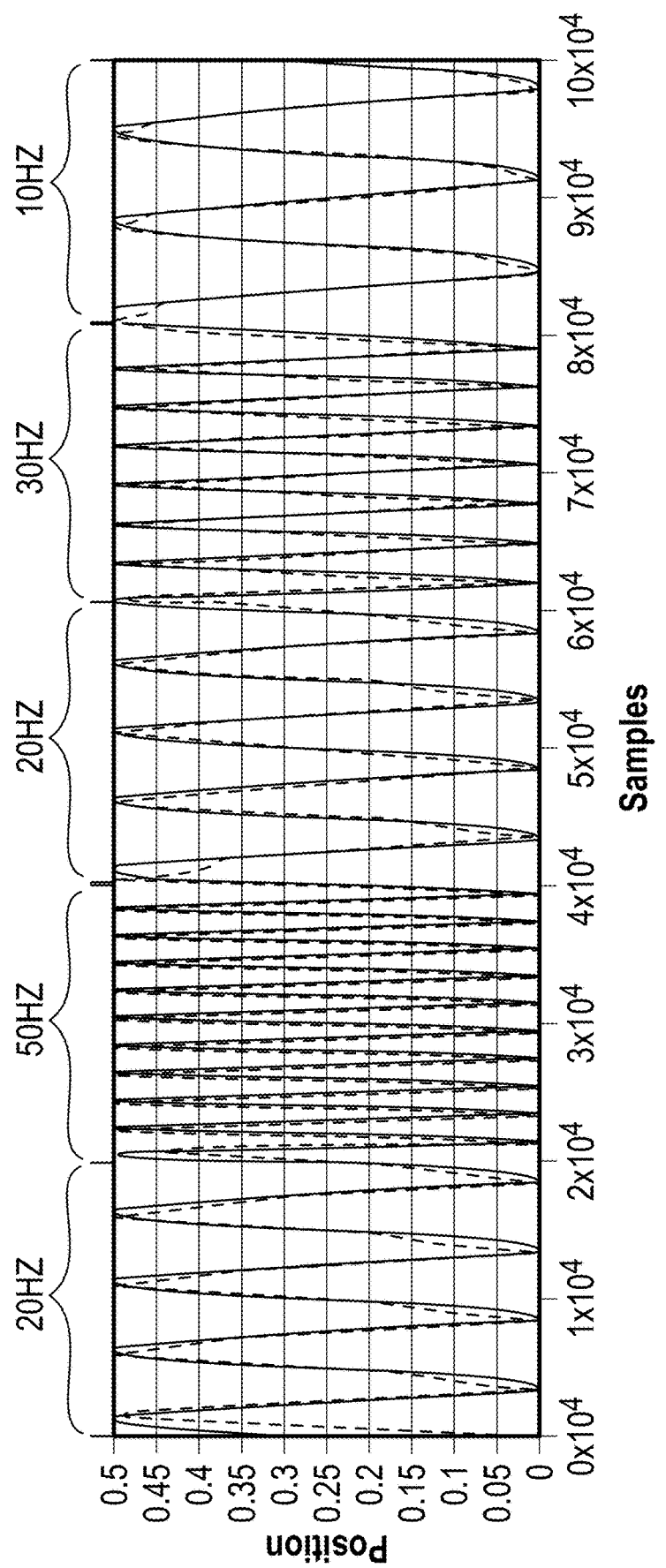
FIG. 29 depicts a sinewave reference position with 50 Hz operation mode in accordance with one or more embodiments of the disclosure.

FIG. 29 depicts the resultant actual position of the actuator versus the reference position of the intake valve while operating under various frequencies. The performance of the position controller was evaluated under different frequency of operation in a continuous manner. The reference signal remained as a sinewave but the frequency changed over time. The goal of this operation condition was to validate a real cycle of an actuator while the vehicle speeds up or down. To emulate such situations, the operation sequence was started with a frequency of 20 Hz for 0.2 seconds, and the frequency suddenly was sped up to 50 Hz for 0.2 seconds and then back down again to 20 Hz. After working for 0.2 seconds at 20 Hz, it was again sped up to 30 Hz for 0.2 seconds and back to 10 Hz for the rest of the simulation. The sequence of the operation was chosen to be in the range of 0.2 seconds since the continuous operation of the system in a constant frequency (e.g., 20 Hz) was validated previous and only the sudden changes are expected. Based-on the simulation results, the position controller is configured to handle different operation frequencies regarding abrupt changes.

Figure 31B:
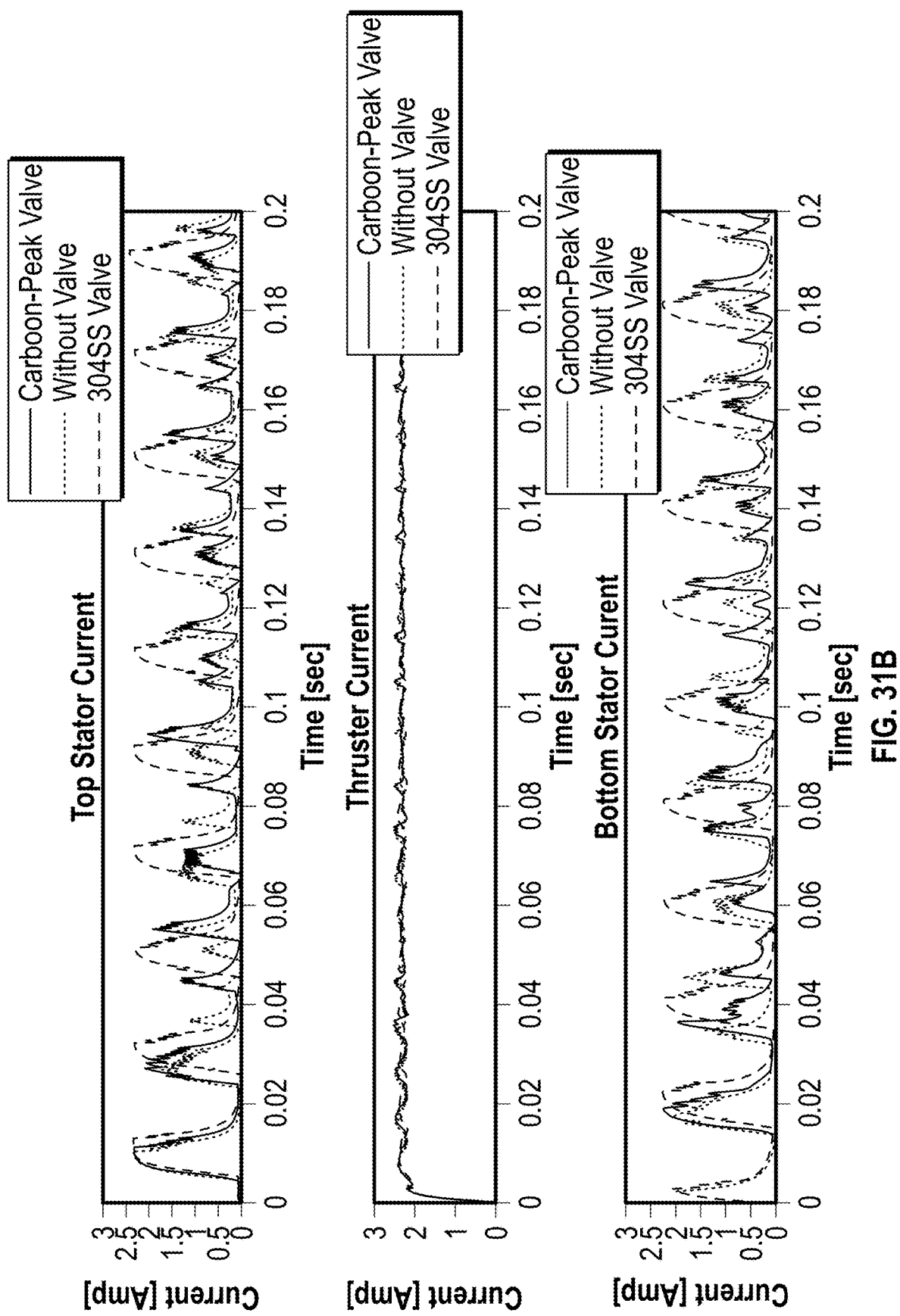
Figure 31C:
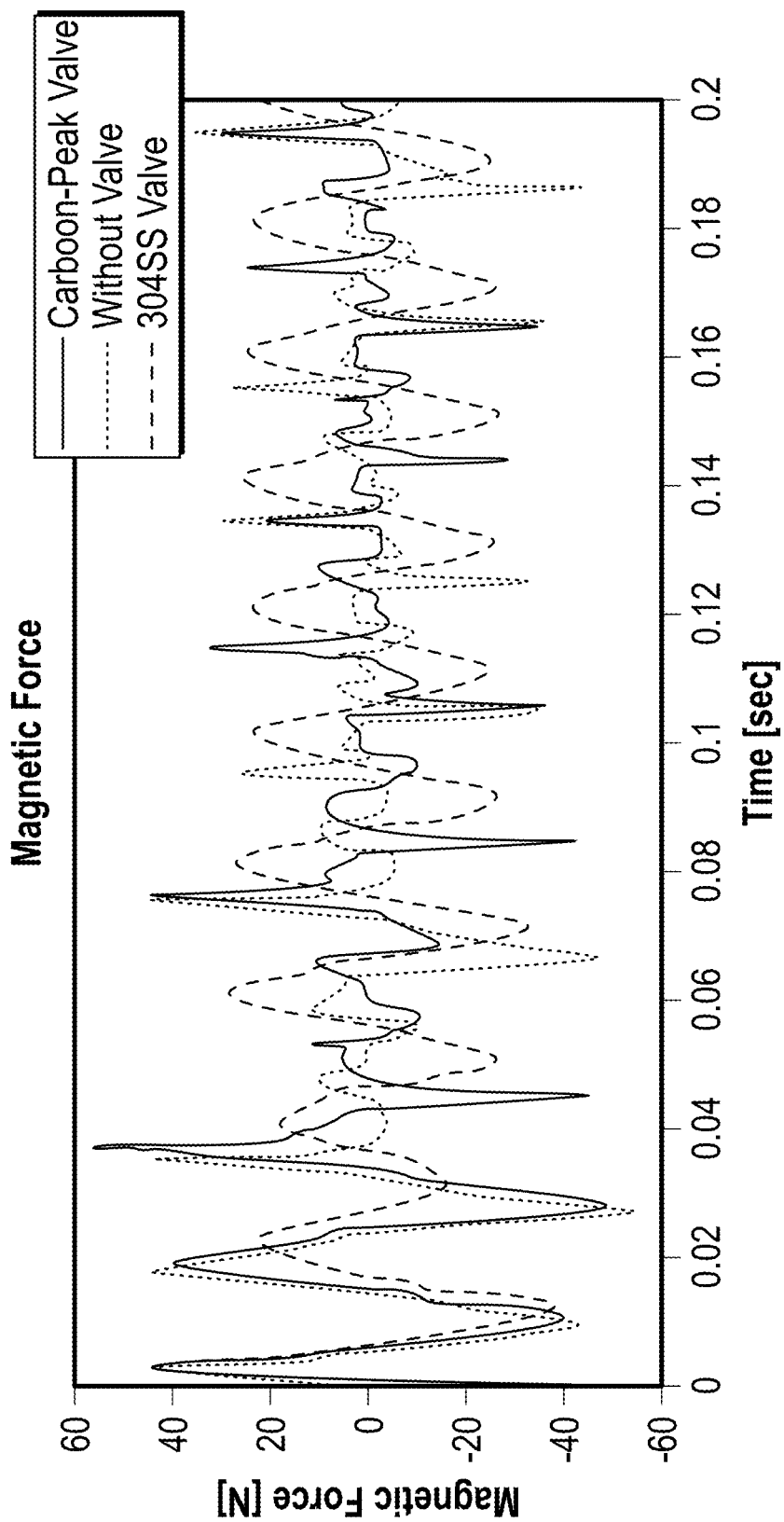

The results of the material selection for the intake valve and the stator and thruster parts of the actuator are depicted in FIGS. 31A-31C. Specifically, these figures depict the impact of material selection for the intake valve (304 stainless steel and carbon peak are used here as examples to show the impact using a ferromagnetic material has on performance). FIG. 31A shows a comparison between the sinusoidal waveforms of actual position references for various materials and the reference position. FIG. 31B shows the current at the thruster disk 110, first stator portion 104, and second stator portion 108 over time for various intake valve materials. FIG. 31C shows the magnetic force over time for various intake valve materials. The total mass of the intake valve was evaluated with regard to different materials. The simulation was conducted for the condition that the intake valve was 304 stainless steel or a carbon-peak materials to see the impact of the intake valve ferromagnetic path on the overall operation of the system. Using the MagNet software, the first result showed that using the 304 stainless steel the overall mass of valve was 97.2 grams, while the carbon-peak results in a lighter mass of 64.7 grams.

Based on the simulations performed, it appears the actuator can operate as desired within the desired characteristics. The co-simulation of the MagNet and the Simulink has been established to perform seamless control of the actuator using both features of the FEA analysis (MagNet) and the accurate modeling of the power electronic drive and the control method (Simulink) to verify the designed system. Mechanical refinements have been shown to be very effective and beneficial for reduction of the flux dissipation and the overall operation and control complexities.

The wiring calculations and selection of the material for the intake valve and main body of the actuator were taken into account for a better understanding of the system response to the transients and the reduction of the losses over the ferromagnetic paths. Also, the power electronic drive with the minimum number of the switches was evaluated.

Furthermore, the position control technique for tracking the position of the valve for the step and sinewave reference signals has been fully studied. The testing sequences and the efforts for realization of the test scenarios show that the first step for validation of the simulated control algorithm is the CHIL using the external targeted hardware. Also, the modeling and parameter identification of the actuator windings has shown a very effective and accurate result.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

We claim:

1. A linear actuator, comprising:
   a thruster comprising a thruster disk with a thruster winding;
   a stator disposed about the thruster, wherein the stator comprises a stator winding, wherein the stator comprises a first portion and a second portion spaced apart from each other on opposite sides of the thruster disk along a longitudinal axis, and wherein the stator winding comprises a first stator winding disposed within the first portion of the stator and a second stator winding disposed within the second portion of the stator; and
   a sheath disposed about the stator and the thruster, wherein the sheath comprises (i) a first inner diameter about the thruster disk along the longitudinal axis and (ii) a second inner diameter about the stator, and wherein the first inner diameter is greater than the second inner diameter,
   wherein the thruster is configured to translate within the sheath along the longitudinal axis relative to the stator upon application of an electrical current to the stator winding, the thruster winding, or a combination thereof,
   wherein the stator winding and the thruster winding each comprise a nonpermanent magnet.

2. The linear actuator of claim 1, wherein the first portion of the stator comprises a first stator connection and the second portion of the stator comprises a second stator connection.

3. The linear actuator of claim 1, wherein the thruster winding is disposed within the thruster disk.

4. The linear actuator of claim 3, wherein the thruster disk comprises a thruster connection.

5. The linear actuator of claim 1, wherein the thruster disk comprises a first portion and a second portion, and wherein the thruster winding comprises a first thruster winding disposed within the first portion of the thruster disk and a second thruster winding disposed within the second portion of the thruster disk.

6. The linear actuator of claim 1, wherein the thruster winding comprises a single thruster winding.

7. The linear actuator of claim 5, wherein the sheath comprises thruster connection grooves extending at least from the first portion of the stator to the second portion of the stator.

8. The linear actuator of claim 1, wherein the thruster windings and stator windings are disposed within pot core structures.

9. The linear actuator of claim 1, wherein the linear actuator is configured to reach an end position with minimal force at zero speed.

10. The linear actuator of claim 1, further comprising a controller configured to take in a position reference and ensure that the thruster reaches the position reference in a selected amount of time.

11. The linear actuator of claim 9, wherein the position reference is a sinusoidal waveform.

12. The linear actuator of claim 10, wherein the sinusoidal waveform fits a profile of the linear actuator's position because it oscillates back-and-forth and reaches the end position with the minimal force at zero speed.

13. The linear actuator of claim 1, wherein the stator winding comprises copper.

14. The linear actuator of claim 1, wherein the thruster winding comprises copper.

15. The linear actuator of claim 4, wherein the thruster winding is configured to continuously receive the electrical current via the thruster connection.

16. The linear actuator of claim 2, wherein the stator winding is configured to intermittently receive the electrical current via the first stator connection and the second stator connection.

17. The linear actuator of claim 1, wherein the stator winding is configured to receive the electrical current at regular intervals via the first stator connection and the second stator connection.

18. The linear actuator of claim 1, further comprising a valve fixed to the thruster.

19. The linear actuator of claim 17, wherein the valve is an operable part of an internal combustion engine.

20. The linear actuator of claim 18, wherein the internal combustion engine is an operable part of a vehicle.

21. The linear actuator of claim 1, wherein the thruster, stator, and sheath comprise ferromagnetic material.

22. A method for controlling a valve, the method comprising:

applying electric current to a first portion and a second portion of a stator winding of a first stator portion and a second stator portion at intervals, wherein the first stator portion and the second stator portion are spaced apart from each other along a longitudinal axis on opposite sides of a thruster disk of a thruster; and continuously applying electric current to a thruster winding of the thruster disk disposed between the first and second portions of the stator winding, wherein the stator winding and the thruster winding each comprise a nonpermanent magnet;

surrounding the stator winding and the thruster winding by a stator sheath, wherein the stator sheath comprises (i) a first inner diameter about the thruster disk along the longitudinal axis and (ii) a second inner diameter about the first stator portion and the second stator portion, and wherein the first inner diameter is greater than the second inner diameter.

23. The method of claim 22, further comprising:
acquiring a position reference of the thruster;
providing the position reference to a controller; and
analyzing, through the controller, the position reference to determine an electric current to supply to the stator and thruster windings.

24. The method of claim 22, wherein the thruster windings comprise a single winding.

25. The method of claim 22, wherein applying electric current to the stator windings and/or thruster windings induces magnetic fluxes in the stator and/or thruster windings that causes the stator windings and thruster windings to attract or repel.

26. The method of claim 25, wherein the attraction or repulsion causes the thruster disk attached to the thruster and comprising the thruster windings to move towards the first stator portion or the second stator portion.

27. The method of claim 26, wherein the thruster is attached to the valve, and the attraction or repulsion causes the valve to move with the thruster as the thruster disk moves towards to first stator portion or the second stator portion.

* * * * *